(12) United States Patent
Suzuki et al.

(10) Patent No.: US 7,379,189 B2
(45) Date of Patent: May 27, 2008

(54) TEMPERATURE/THICKNESS MEASURING APPARATUS, TEMPERATURE/THICKNESS MEASURING METHOD, TEMPERATURE/THICKNESS MEASURING SYSTEM, CONTROL SYSTEM AND CONTROL METHOD

(75) Inventors: Tomohiro Suzuki, Yamanashi (JP); Chishio Koshimizu, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 222 days.

(21) Appl. No.: 11/349,276

(22) Filed: Feb. 8, 2006

(65) Prior Publication Data

US 2006/0176490 A1    Aug. 10, 2006

Related U.S. Application Data

(60) Provisional application No. 60/655,973, filed on Feb. 24, 2005.

(30) Foreign Application Priority Data

Feb. 8, 2005    (JP)    ............................. 2005-032223

(51) Int. Cl.
*G01B 11/02*    (2006.01)
(52) U.S. Cl. .................................... 356/503
(58) Field of Classification Search ................ 356/450, 356/482, 503, 504; 438/14, 16
See application file for complete search history.

(56) References Cited

U.S. PATENT DOCUMENTS

| | | | | |
|---|---|---|---|---|
| 3,601,492 A | * | 8/1971 | Reichard | .................. 356/504 |
| 5,241,366 A | * | 8/1993 | Bevis et al. | ................ 356/632 |
| 5,322,361 A | * | 6/1994 | Cabib et al. | ................ 374/161 |
| 6,172,752 B1 | * | 1/2001 | Haruna et al. | .............. 356/503 |
| 6,406,924 B1 | * | 6/2002 | Grimbergen et al. | .......... 438/9 |
| 6,950,193 B1 | * | 9/2005 | Discenzo | ..................... 356/503 |

FOREIGN PATENT DOCUMENTS

WO    WO 03/087744    10/2003

OTHER PUBLICATIONS

"Temperature dependence of the near-infrared refractive index of silicon, gallium arsenide, and indium phosphide" (Phy. Rev. 849, 7408-7417, 1994) by J.A. McCaulley, et al.

* cited by examiner

*Primary Examiner*—Michael A Lyons
(74) *Attorney, Agent, or Firm*—Oblon, Spivak, McClelland, Maier & Neustadt, P.C.

(57) ABSTRACT

In the apparatus according to the present invention, light from a light source is split into measurement light and reference light, the optical path length of the reference light is altered and a plurality of measurement light interference waveforms resulting from the interference of measurement beams reflected at a measurement target and the reference light are measured. One of these interference waveforms is designated as a reference interference waveform, another interference waveform corresponding to a measurement beam reciprocally reflected at the two end surfaces of the measurement target twice more than the measurement beam corresponding to the reference interference waveform is designated as a selected interference waveform, the optical path length of the measurement light indicated by the distance between the two end surfaces of the measurement target is measured based upon these interference waveforms. The temperature of the measurement targets is determined in correspondence to the optical path length.

35 Claims, 28 Drawing Sheets

FIG.19

|  | OUTBOUND PATH | INBOUND PATH |
|---|---|---|
| OPTICAL PATH A | $U_1$ | $U_1$ |
| OPTICAL PATH B | $U_1$ | $U_2$ |
| OPTICAL PATH C | $U_2$ | $U_1$ |
| OPTICAL PATH D | $U_2$ | $U_2$ |

TEMPERATURE/THICKNESS MEASURING APPARATUS, TEMPERATURE/THICKNESS MEASURING METHOD, TEMPERATURE/THICKNESS MEASURING SYSTEM, CONTROL SYSTEM AND CONTROL METHOD

CROSS REFERENCE TO RELATED APPLICATIONS

This document claims priority to Japanese Patent Application No. 2005-032223, filed Feb. 8, 2005 and U.S. Provisional Application No. 60/655,973, filed Feb. 24, 2005, the entire contents of which are hereby incorporated by reference.

FIELD OF THE INVENTION

The present invention relates to a temperature/thickness measuring apparatus, a temperature/thickness measuring method, a temperature/thickness measuring system, a control system and a control method with which the temperature or thickness of a measurement target such as a semiconductor wafer or a liquid crystal substrate can be measured accurately.

BACKGROUND OF THE INVENTION

It is crucial that the temperature or the like of a substrate processed by, for instance, a substrate processing apparatus, such as a semiconductor wafer (hereafter may be simply referred to as a "wafer") be measured with a high degree of accuracy in order to accurately control the shapes, the physical characteristics and the like of films, holes and the like formed on the wafer by executing various types of processing such as film formation and etching. Accordingly, various wafer temperature measuring methods have been proposed in the related art, including the use of a resistance thermometer and the use of a fluorescence thermometer that measures the temperature at the rear surface of the base material.

In recent years, research into temperature measuring methods and temperature measuring apparatuses that enable direct measurement of the wafer temperature, which is difficult with the temperature measuring methods in the related art, has gained significant ground (see, for instance, International Publication No. 03/087744). A specific example of a temperature measuring apparatus is now explained in reference to FIGS. 32 and 33. FIG. 32 illustrates the principle of a temperature measuring apparatus in the related art, whereas FIG. 33 is a conceptual diagram of interference waveforms measured with the temperature measuring apparatus.

The temperature measuring apparatus 10 in FIG. 32 is constituted with a low coherence interferometer that may be achieved by adopting the basic principle of, for instance, a Michelson interferometer. The temperature measuring apparatus 10 includes a light source 12 constituted with, for instance, an SLD (super luminescent diode) having low coherence characteristics, a beam splitter 14 that splits the light originating from the light source 12 into two beams, i.e., reference light to be radiated onto a reference mirror 20 and measurement light to be radiated onto a measurement target (e.g., a wafer) 30, the reference mirror 20 drivable along a single direction, with which the optical path length of the reference light can be varied, and a light receiver 16 that receives the reference light reflected at the reference mirror 20 and the measurement light reflected at the measurement target 30 and measures the extent of interference.

In this temperature measuring apparatus 10, the light originating from the light source 12 is split at the beam splitter 14 into two beams, i.e., the reference light and the measurement light. The measurement light is radiated toward the measurement target 30 and is reflected at the two end surfaces (e.g., the front surface and the rear surface) of the measurement target, whereas the reference light is radiated toward the reference mirror 20 and is reflected at the mirror surface. Then, both the reflected measurement light and the reflected reference light reenter the beam splitter 14, and depending upon the optical path length of the reference light, the reflected light beams become superimposed upon each other, thereby inducing interference. The resulting interference wave is detected by the light receiver 16.

Accordingly, the reference mirror 20 is driven along the single direction to alter the optical path length of the reference light for the temperature measurement. Since the coherence length of the light from the light source 12 is small due to the low coherence characteristics of the light source 12, intense interference manifests at a position at which the optical path length of the measurement light and the optical path length of the reference light match and the extent of interference is substantially reduced at other positions under normal circumstances. As the reference mirror 20 is driven along, for instance, the forward/backward direction (the direction indicated by the arrows in FIG. 32) and the optical path length of the reference light is adjusted as described above, the measurement beams reflected from the front surface and the rear surface of the measurement target 30 with different refractive indices (e.g., a refractive index $n_a$ of the air and a refractive index n of the measurement target 30), and the reflected reference light interfere with each other and, as a result, interference waveforms such as those shown in FIG. 33A are detected.

The distance between the peaks in these interference waveforms is equivalent to the optical path length L, which is indicated by the thickness of the measurement target 30, i.e., the distance between the front surface and the rear surface of the measurement target. With d representing the thickness of the measurement target 30 and n representing the refractive index at the measurement target 30, the optical path length L can be expressed as $L=d \times n$. Since the thickness d and the refractive index n assume varying values as the temperature changes, the optical path length (optical thickness) L at the measurement target 30, too, changes as the temperature changes. Accordingly, based upon the change in the optical path length L at the measurement target 30, the temperature at the measurement target can be measured along the depthwise direction.

As the temperature of the measurement target 30 being heated with a heater or the like changes as shown in FIG. 33, the measurement target 30 expands, as indicated by the one-point chain line. At this time, the refractive index n of the measurement target 30, too, becomes altered and, as a result, the interference waveform position following the temperature change shifts relative to the position prior to the temperature change, which changes the interval between the peak positions, as shown in FIGS. 33A and 33B. The extent to which the peak interval of the interference waveform changes corresponds to the extent of the temperature change. In addition, the distance between the peak positions of the interference waveforms correspond to the distance by which the reference mirror 20 moves. Thus, by accurately measuring the intervals between the peaks in the interference waveforms based upon the distance by which the reference mirror 20 is displaced, the change in the temperature can be measured.

As explained earlier, the optical path length (optical thickness) L of the measurement target 30, which is expressed as thickness d×refractive index n, changes in proportion to the change in the temperature, since the thickness d and the refractive index n both change in proportion to the temperature change. This means that when the thickness d of the measurement target 30 is more significant, the optical path length (optical thickness) L changes by a greater extent relative to the extent of the temperature change and that when the thickness d of the measurement target 30 is less significant, the optical path length (optical thickness) L changes to a lesser extent relative to the extent of the temperature change.

For instance, while the extent of the change in the optical path length L occurring at a silicon wafer with a thickness of 10 mm is 2.7 μm/° C., the optical path length L of a thinner silicon wafer with a thickness of, for instance, 0.75 mm changes by a much smaller extent of 0.2 μm/° C.

When the thickness of the measurement target 30 small, the optical path length L at the measurement target 30 changes by a lesser extent relative to a specific extent of change in the temperature at the measurement target 30, as described above. This means that the length of the peak interval in the interference waveforms corresponding to the individual surfaces of the measurement target 30, which indicates the optical path lengths L, changes to a lesser degree as well, when the thickness d is smaller. In other words, when the measurement target 30 has a smaller thickness d, it is more difficult to accurately measure the extent of change in the peak interval in the interference waveforms corresponding to the individual surfaces of the measurement target 30, presenting a major obstacle to improving the temperature measurement accuracy with which the temperature of the measurement target is measured.

SUMMARY OF THE INVENTION

Accordingly, an object of the present invention, which has been completed by addressing the problem of the related art discussed above, is to provide a temperature/thickness measuring apparatus and the like with which the temperature/thickness of a measurement target can be measured accurately regardless of how small or large the measurement target thickness may be.

The object described above is achieved in an aspect of the present invention by providing a temperature/thickness measuring apparatus comprising a light source that emits light to be transmitted through and reflected at two end surfaces of a measurement target, which can be reflected reciprocally at least twice at the two end surfaces of the measurement target, a splitter that splits the light from the light source into measurement light and reference light, a reference light reflecting means for reflecting the reference light from the splitter, an optical path length altering means for altering the optical path length of the reference light reflected at the reference light reflecting means, a reference light transmitting means for transmitting the reference light from the splitter to a reference light radiation position at which the reference light is radiated toward the reference light reflecting means, a measurement light transmitting means for transmitting the measurement light from the splitter to a measurement light radiation position at which the measurement light is radiated toward the measurement target, a light receiving means for measuring a plurality of measurement light interference waveforms obtained as interference of measurement beams each transmitted through or reflected at the measurement target and the reference light reflected from the reference light reflecting means occurs, and a measuring means for measuring the optical path length of the measurement light indicated as the distance between the two end surfaces of the measurement target based upon a reference interference waveform which is one of the plurality of measurement light interference waveforms having been measured by the light receiving means and a selected interference waveform selected from the plurality of measurement light interference waveforms, which corresponds to a measurement beam reciprocally reflected at the two end surfaces of the measurement target at least twice more than the number of times the measurement beam corresponding to the reference interference waveform is reciprocally reflected at the two end surfaces, and measuring the temperature/thickness of the measurement target based upon the optical path length thus measured.

The object described above is achieved in another aspect of the present invention by providing a temperature/thickness measuring method, comprising a step for radiating measurement light and reference light obtained by splitting light emitted from a light source, which emits light transmitted through and reflected at two end surfaces of a measurement target, respectively toward the measurement target and toward a reference light reflecting means, a step for measuring a plurality of measurement light interference waveforms obtained as interference of measurement beams each transmitted through or reflected at the measurement target and the reference light reflected from the reference light reflecting means occurs while the optical path length of the reference light reflected from the reference light reflecting means is altered by scanning the reference light reflecting means along a single direction and a step for measuring the optical path length of measurement light indicated by the distance between the two end surfaces of the measurement target based upon a reference interference waveform selected from the plurality of measurement light interference waveforms measured at the light receiving means and a selected interference waveform selected from the plurality of measurement light interference waveforms, which corresponds to a measurement beam reciprocally reflected at the two end surfaces of the measurement target at least twice more than the number of times the measurement beam corresponding to the reference interference waveform is reciprocally reflected at the two end surfaces, and measuring the temperature/thickness of the measurement target based upon the optical path length thus measured.

In the apparatus or the method according to the present invention described above, as the measurement light obtained by splitting the light from the light source is radiated toward the measurement target, interference waveforms corresponding to measurement beams each transmitted through or reflected at the measurement target after being reciprocally reflected at least once at the two end surfaces of the measurement target, as well as interference waveforms corresponding to a measurement beam directly transmitted through the two end surfaces (e.g., the front surface and the rear surface) of the measurement target and measurement beams reflected at the individual end surfaces of the measurement target, can be measured.

If the interference waveform corresponding to, for instance, the measurement beam reflected at the front surface of the measurement target, among the plurality of interference waveforms having been obtained through the measurement, is designated as the reference interference waveform, the peak interval between the peak in the interference waveform corresponding to a measurement beam reciprocally reflected at the two end surfaces of the measurement target twice or more and the peak in the reference interference waveform is bound to be equal to or greater than double the optical path length of the measurement light between the two end surfaces at the measurement target, since the peak interval between the peak in the interference waveform corresponding to a measurement beam reflected at the rear surface of the measurement target while it travels reciprocally between the two end surfaces of the measurement target once and the peak in the reference interference waveform is equivalent to the optical path length of the measurement light indicated as the distance between the two end surfaces of the measurement target.

Accordingly, by designating the interference waveform corresponding to a measurement beam reciprocally reflected at the two end surfaces of the measurement target at least twice as the selected interference waveform, the peak interval between the reference interference waveform and the selected interference waveform can be lengthened and thus, the extent of change in the peak interval attributable to a change in the temperature at the measurement target can be amplified. As a result, an improvement in the accuracy with which the peak interval in the interference waveforms is measured is achieved.

It is effective to have a significant interval between the reference interference waveform and the selected interference waveform, particularly when the measurement target has a small thickness and the optical path length of the measurement light indicated by the distance between the two end surfaces of the measurement target is small (e.g., when a semiconductor wafer or the like with a very small thickness is the measurement target) as the accuracy with which the peak interval between the peaks in these interference waveforms is measured is greatly improved. Since this ultimately improves the measurement accuracy with which the optical path length of the measurement light indicated by the distance between the two end surfaces of the measurement target is measured, the measurement accuracy of the temperature/thickness is also improved.

In addition, in the apparatus or the method described above, the selected interference waveform may be selected based upon the extent of interference waveform deformation indicated by the extent of offset manifesting between a reference approximate curve obtained through curvilinear approximation of the entire wave series constituting the interference waveform (e.g., the normal distribution curve representing the reference approximate curve of the entire wave series constituting the interference waveform) and an approximate curve obtained through curvilinear approximation of the individual waveform reiterations constituting the interference wave series (e.g., an envelope obtained based upon the individual waveform reiterations constituting the interference wave series).

As explained earlier, the interval between the reference interference waveform and the selected interference waveform can be lengthened by selecting the interference waveform corresponding to a measurement beam reciprocally reflected at the two end surfaces of the measurement target a greater number of times as the selected interference waveform, thereby making it possible to improve the accuracy with which the interval between the peaks in these interference waveforms is measured. At the same time, the intensity of the measurement beam reciprocally reflected at the two end surfaces a greater number of times is bound to become lowered to a greater extent and thus, the extent of the interference waveform deformation, too, is bound to be greater. As the interference waveform deformation exceeds a specific extent, the interference waveform peak interval measurement accuracy may be adversely affected. Accordingly, in optimal interference waveform that allows a greater interval to be taken between the reference interference waveform and the selected interference waveform within a range over which the interference waveform deformation does not lower the accuracy of the interference waveform peak interval measurement can easily be selected to be used as the selected interference waveform based upon the extent of the interference waveform deformation.

In the apparatus or the method, the measurement light interference waveforms (patterns) can be diversified by connecting a detour optical path in parallel to the optical path of the measurement light at a mid point of the measurement light optical path and radiating measurement beams traveling through these optical paths onto the measurement target. For instance, the interference waveform corresponding to a measurement beam that does not travel via the detour optical path and is reciprocally reflected at the two end surfaces of the measurement target a given number of times and the interference waveform corresponding to a measurement beam that travels through the detour optical path at least once and is reciprocally reflected at the two end surfaces of the measurement target the same number of times, can both be measured. These interference waveforms are bound to be offset relative to each other and the extent of the offset can be adjusted by adjusting the optical path length of the measurement light detour optical path.

Accordingly, by adjusting the optical path length of the measurement light detour optical path, it is possible to measure the reference interference waveform, corresponding to a measurement beam that travels with an optical path pattern that does not include the detour optical path or with an optical path pattern through which the measurement beam travels via the detour optical path at least once and the selected interference waveform corresponding to a measurement beam that travels with the optical path pattern other than that of the measurement beam corresponding to the reference interference waveform in close proximity to each other. This means that the reference light reflecting means (e.g., a reference mirror) only needs to move through a range large enough to allow these interference waveforms at least to be measured. Since the distance over which the reference light reflecting means (e.g., a reference mirror) needs to travel can be thus reduced, the length of time required for the measurement of the temperature/thickness, too, can be reduced.

In the apparatus or the method, the reference light reflecting means may include a plurality of reflecting surfaces and, in such a case, by radiating the reference light from the splitter onto the reference light reflecting means and reflecting the reference light at the individual reflecting surfaces as a plurality of reference beams with varying optical path lengths, the interference waveforms of the interference between the reference light and the measurement light (interference waveform patterns) can be diversified. For instance, in correspondence to measurement light reciprocally reflected at the two end surfaces of the measurement target a given number of times, interference waveforms of the interference between the measurement light and a plurality of reference beams with varying optical path lengths can be measured. While these interference waveforms manifest an offset relative to one another, the extent of the offset can be adjusted by adjusting the positions of the plurality of reflecting surfaces at the reference light reflecting means.

Accordingly, by adjusting the positions of the plurality of reflecting surfaces at the reference light reflecting means, it is possible to measure the reference interference waveform corresponding to the measurement light and a reference beam reflected at one of the plurality of reflecting surfaces among the plurality of reference beams reflected at the individual reflecting surfaces, and the selected interference waveform, corresponding to the measurement light and a reference beam reflected at another reflecting surface, in close proximity to each other. This means that the reference light reflecting means (e.g., a reference mirror) only needs to move through a range large enough to allow these interference waveforms at least to be measured. Since the distance over which the reference light reflecting means (e.g., a reference mirror) needs to travel can be thus reduced, the length of time required for the measurement of the temperature/thickness, too, can be reduced.

Alternatively, in the apparatus or the method described above, a reference light splitter may be disposed to split the reference light from the splitter further into a plurality of reference beams and, in such a case, the interference waveforms of interference caused by the reference light and the measurement light (interference waveform patterns) can be diversified by allowing the reference light reflecting means to reflect the plurality of reference beams from the reference light splitter radiated toward the reference light reflecting means with varying optical path lengths. For instance, in correspondence to measurement light reciprocally reflected at the two end surfaces of the measurement target a given number of times, interference waveforms attributable to the measurement light and the plurality of reference beams with varying optical path lengths can be individually measured. While these interference waveforms manifest an offset relative to one another, the extent of the offset can be adjusted by adjusting the optical path lengths of the plurality of reference beams from the reference light splitter.

Accordingly, by adjusting the optical path lengths of the plurality of reference beams from the reference light splitter, it is possible to measure the reference interference waveform, corresponding to the measurement light and one of the plurality of reference beams from the reference light splitter and the selected interference waveform corresponding to the measurement light and another reference beam in close proximity to each other. This means that the reference light reflecting means (e.g., a reference mirror) only needs to move through a range large enough to allow these interference waveforms at least to be measured. Since the distance over which the reference light reflecting means (e.g., a reference mirror) needs to travel can be thus reduced, the length of time required for the measurement of the temperature/thickness, too, can be reduced.

In the apparatus or the method, the measurement light interference waveforms (patterns) can be diversified by connecting a detour optical path in parallel to the optical path of the reference light at a mid point of the reference light optical path and radiating reference beams traveling through these optical paths onto the reference light reflecting means where they are reflected as a plurality of reference beams with varying optical path lengths. For instance, the in correspondence to measurement light reciprocally reflected at the two end surfaces of the measurement target a given number of times, the interference waveform attributable to the measurement light and a reference beam that does not travel via the detour optical path and the interference waveform attributable to the measurement light and a reference beam that travels via the detour optical path at least once, can be measured. These interference waveforms are bound to be offset relative to each other and the extent of the offset can be adjusted by adjusting the optical path length of the reference light detour optical path.

Accordingly, by adjusting the optical path length of the reference light detour optical path, it is possible to measure the reference interference waveform corresponding to the measurement light and a reference beam that travels with an optical path pattern that does not include the detour optical path or with an optical path pattern through which the reference beam travels via the detour optical path at least once, and the selected interference waveform corresponding to the measurement light and a reference beam that travels with the optical path pattern other than that of the reference beam corresponding to the reference interference waveform, in close proximity to each other. This means that the reference light reflecting means (e.g., a reference mirror) only needs to move through a range large enough to allow these interference waveforms at least to be measured. Since the distance over which the reference light reflecting means (e.g., a reference mirror) needs to travel can be thus reduced, the length of time required for the measurement of the temperature/thickness, too, can be reduced.

In addition, the various light beams (including the light originating from the light source, the measurement light, the reference light, etc.), used in the apparatus or the method described above, may each be transmitted through the air In this case, light can be transmitted without using an optical fiber or a collimate fiber and, as a result, a light source that emits light with a wavelength (e.g., equal to or greater than 2.5 μm) that does not allow the light to pass through optical fibers or collimate fibers can be utilized.

The measurement target undergoing the measurement in the apparatus or through the method described above should be constituted of, for instance, silicon or a silicon oxide film, and the light source should be capable of emitting light with a wavelength within a range of, for instance, 1.0 to 2.5 μm. Since light with a wavelength of 1.0 to 2.5 μm is transmitted through and reflected at silicon or a silicon oxide film constituting the measurement target, interference waveforms of measurement beams reciprocally reflected at the two end surfaces of the measurement target two or more times can be measured.

The measurement target undergoing the measurement in the apparatus or through the method described above may be a substrate (e.g., a semiconductor wafer or a glass substrate) undergoing processing in a substrate processing apparatus (such as a plasma processing apparatus), or it may be an electrode plate (e.g., an electrode plate of an upper electrode or an electrode plate of a lower electrode) disposed so as to face opposite the substrate. The present invention improves the accuracy of the measurement of the temperature/thickness of such a measurement target with a small thickness.

The measurement light transmitting means in the apparatus may be disposed on one side of the measurement target so as to transmit the measurement light from the light source and radiate it toward an end surface of the measurement target on one side and also to receive returning measurement light having been reciprocally reflected at the two end surfaces of the measurement targets or having been reflected at only one end surface of the measurement target and transmit the received returning measurement light toward the light receiving means. Alternatively, the measurement light transmitting means in the apparatus may be constituted with two separate means, i.e., a radiating light transmitting means disposed on one side of the measurement target to transmit the measurement light from the light source and radiate it toward one end surface of the measurement target and an exiting light transmitting means disposed on the other side of the measurement target to receive the measurement light exiting through the end surface of the measurement target on the other side after having been reciprocally reflected at the two end surfaces of the measurement target or having been transmitted through the end surface on the one side without being reciprocally reflected and transmit the received measurement light toward the light receiving means.

In the method described above, the intensity of the light from the light source may be adjusted while measuring the interference of the measurement light and the reference light. For instance, the light intensity at the light source may be gradually increased in correspondence to the distance traveled by the reference light reflecting means, the intensity of the light from the light source may be raised when measuring an interference waveform corresponding to a measurement beam reciprocally reflected at the two end surfaces of the measurement target a greater number of times, or the light intensity at the light source may be adjusted in correspondence to the intensity with which the measurement light received at the light receiving means is reflected, that can be measured in advance. Such an adjustment of the intensity of the light from the light source ensures that the intensity level of the measurement light reciprocally reflected at the measurement target is sustained at a desired level and ultimately ensures that the interference waveform attributable to the measurement light remains intact by preventing any decrease of the light intensity (S/N ratio) relative to the noise. As a result, the accuracy with which the peak position in the interference waveform is detected is improved and thus, the accuracy with which the temperature/thickness of the measurement target is measured based upon the width of the interval between the peaks in interference waveforms is also improved.

The object described above is achieved in yet another aspect of the present invention by providing a temperature/thickness measuring system comprising a substrate processing apparatus that executes a specific type of processing on a substrate placed inside a processing chamber, a temperature/thickness measuring apparatus mounted at the substrate processing apparatus and a control device that controls the temperature/thickness measuring apparatus. The temperature/thickness measuring apparatus in this system comprises a light source that emits light to be transmitted through and reflected at two end surfaces of the substrate designated as a measurement target, which can be reflected reciprocally at least twice at the two end surfaces of the substrate, a splitter that splits the light from the light source into measurement light and reference light, a reference light reflecting means for reflecting the reference light originating from the splitter, an optical path length altering means for altering the optical path length of the reference light reflected at the reference light reflecting means, a reference light transmitting means for transmitting the reference light from the splitter to a reference light radiation position at which the reference light is radiated toward the reference light reflecting means, a measurement light transmitting means for transmitting the measurement light from the splitter to a measurement light radiation position at which the measurement light is radiated toward the substrate and a light receiving means for measuring a plurality of measurement light interference waveforms obtained as interference of the measurement beams transmitted through or reflected at the measurement target and the reference light reflected from the reference light reflecting means occurs. The control device measures the optical path length of the measurement light indicating the distance between the two end surfaces of the substrate based upon a reference interference waveform which is one of the plurality of measurement light interference waveforms having been measured by the light receiving means of the temperature/thickness measuring apparatus and a selected interference waveform selected from the plurality of measurement light interference waveforms, which corresponds to a measurement beam reciprocally reflected at the two end surfaces of the substrate at least twice more than the number of times the measurement beam corresponding to the reference interference waveform is reciprocally reflected at the two end surfaces and then measures the temperature/thickness of the substrate based upon the optical path length thus measured.

In the temperature/thickness measuring system according to the present invention described above, a significant interval can be taken between the reference interference waveform and the selected interference waveform when the measurement target has a small thickness and the optical path length of the measurement light indicated by the distance between the two end surfaces of the measurement target is short (such as a substrate or an electrode plate with a very small thickness) and thus, the accuracy with which the peak interval between the peaks in these interference waveforms is measured can be greatly improved. Since this ultimately improves the measurement accuracy with which the optical path length of the measurement light extending between the two end surfaces of the measurement target is measured, the measurement accuracy of the temperature/thickness is also improved.

The object described above is achieved in yet another aspect of the present invention by providing a control system comprising a substrate processing apparatus that executes a specific type of processing on a substrate placed inside a processing chamber, a temperature/thickness measuring apparatus mounted at the substrate processing apparatus and a control device that controls the temperature/thickness measuring apparatus and the substrate processing apparatus, and also executes at least either substrate temperature control or substrate process control. The temperature/thickness measuring apparatus comprises a light source that emits light to be transmitted through and reflected at two end surfaces of the substrate designated as a measurement target, which can be reflected reciprocally at least twice at the two end surfaces of the substrate, a splitter that splits the light from the light source into measurement light and reference light, a reference light reflecting means for reflecting the reference light originating from the splitter, an optical path length altering means for altering the optical path length of the reference light reflected at the reference light reflecting means, a reference light transmitting means for transmitting the reference light from the splitter to a reference light radiation position at which the reference light is radiated toward the reference light reflecting means, a measurement light transmitting means for transmitting the measurement light from the splitter to a measurement light radiation position at which the measurement light is radiated toward the substrate and a light receiving means for measuring a plurality of measurement light interference waveforms obtained as interference of measurement beams each transmitted through or reflected at the substrate and the reference light reflected from the reference light reflecting means occurs. The control device measures the optical path length of the measurement light indicated by the distance between the two end surfaces of the substrate based upon a reference interference waveform which is one of the plurality of measurement light interference waveforms having been measured by the light receiving means of the temperature/thickness measurement apparatus and a selected interference waveform selected from the plurality of measurement light interference waveforms, which corresponds to a measurement beam reciprocally reflected at the two end surfaces of the measurement target at least twice more than the number of times the measurement beam corresponding to the reference interference waveform is reciprocally reflected at the two end surfaces, measures the temperature or the thickness of the substrate based upon the optical path length thus measured, and executes at least either substrate temperature control or substrate process control for the substrate placed inside the processing chamber of the substrate processing apparatus based upon the temperature or the thickness thus measured.

In the control system according to the present invention described above, a significant interval can be taken between the reference interference waveform and the selected interference waveform when the measurement target has a small thickness and the optical path length of the measurement light indicated by the distance between the two end surfaces of the measurement target is short (such as a substrate or an electrode plate with a very small thickness) and thus, the accuracy with which the peak interval between the peaks in these interference waveforms is measured can be greatly improved. Since this ultimately improves the measurement accuracy with which the optical path length of the measurement light indicated by the distance between the two end surfaces of the measurement target is measured, the measurement accuracy of the temperature/thickness is also improved. The substrate temperature control or the substrate process control can then be executed based upon the temperature or the thickness having been measured with a high level of accuracy, which enables accurate control of the substrate process characteristics and improves the stability of the substrate processing apparatus.

The object described above is achieved in yet another aspect of the present invention by providing a control method to be adopted in a control system for a substrate processing apparatus that executes a specific type of processing on a substrate placed inside a processing chamber, comprising a step for radiating measurement light and reference light obtained by splitting light emitted from a light source, which emits light transmitted through and reflected at two end surfaces of a measurement target, respectively toward the measurement target and toward a reference light reflecting means, a step for measuring a plurality of measurement light interference waveforms obtained as interference of measurement beams each transmitted through or reflected at the measurement target and the reference light reflected from the reference light reflecting means occurs while the optical path length of the reference light reflected from the reference light reflecting means is altered by scanning the reference light reflecting means along a single direction, a step for measuring the optical path length of measurement light indicated by the distance between the two end surfaces of the measurement target based upon a reference interference waveform selected from the plurality of measurement light interference waveforms measured at the light receiving means and a selected interference waveform selected from the plurality of measurement light interference waveforms, which corresponds to a measurement beam reciprocally reflected at the two end surfaces of the measurement target at least twice more than the number of times the measurement beam corresponding to the reference interference waveform is reciprocally reflected at the two end surfaces and measuring the temperature/thickness of the measurement target based upon the optical path length thus measured, and a step for executing at least either substrate temperature control or substrate process control for the substrate in the substrate processing apparatus based upon the temperature or the thickness of the measurement target having been measured.

By adopting the control method according to the present invention described above, a significant interval can be taken between the reference interference waveform and the selected interference waveform when the measurement target has a small thickness and the optical path length of the measurement light indicated by the distance between the two end surfaces of the measurement target is short, such as a substrate or an electrode plate with a very small thickness, and thus, as the accuracy with which the peak intervals between the peaks in these interference waveforms is measured can be greatly improved. Since this ultimately improves the measurement accuracy with which the optical path length of the measurement light indicated by the distance between the two end surfaces of the measurement target is measured, the measurement accuracy of the temperature/thickness is also improved. The substrate temperature control or the substrate process control can then be executed based upon the temperature or the thickness having been measured with a high level of accuracy, which enables accurate control of the substrate process characteristics and improves the stability of the substrate processing apparatus.

According to the present invention described above, a significant interval can be taken between the reference interference waveform and the selected interference waveform when the measurement target has a small thickness and the optical path length of the measurement light indicated by the distance between the two end surfaces of the measurement target is short, and thus, the accuracy with which the peak interval between the peaks in these interference waveforms is measured can be greatly improved. Since this ultimately improves the measurement accuracy with which the optical path length of the measurement light indicated by the distance between the two end surfaces of the measurement target is measured, the measurement accuracy of the temperature/thickness is also improved.

It is to be noted that the measurement target may be a measurement target layer such as an inner layer of a substrate, which constitutes part of an object, instead of an entire object such as a substrate.

BRIEF DESCRIPTION OF THE DRAWINGS

FIG. 19 shows different types of measurement light optical paths achieved by the temperature measuring apparatus in the embodiment;

DETAILED DESCRIPTION OF THE PREFERRED EMBODIMENTS

Figure 1:
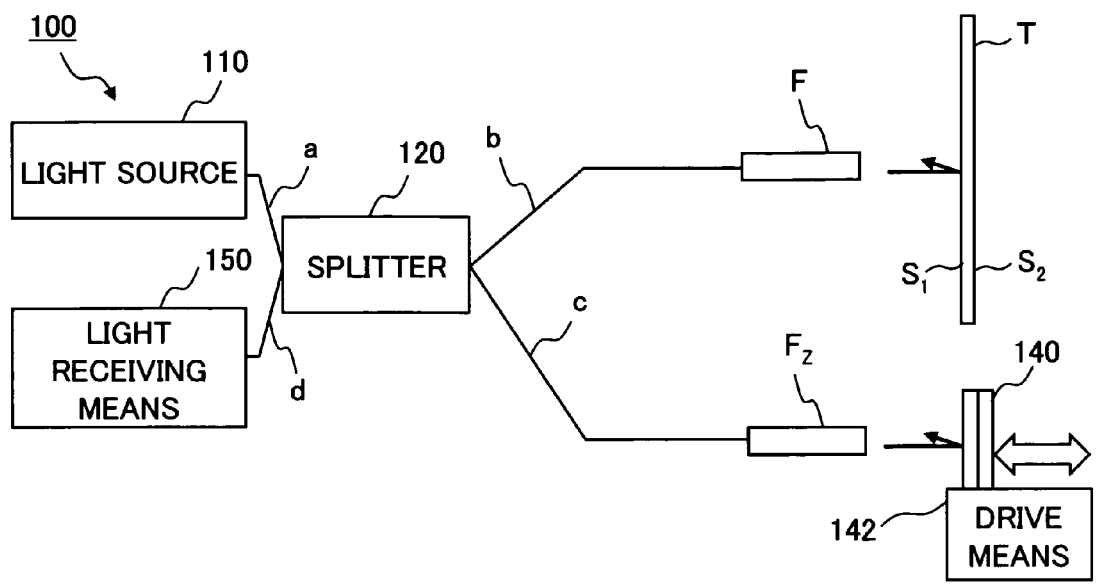
FIG. 1 is a block diagram schematically illustrating the structure adopted in the temperature measuring apparatus achieved in a first embodiment of the present invention.

The following is a detailed explanation of the preferred embodiments of the present invention, given in reference to the attached drawings. It is to be noted that in the specification and the drawings, the same reference numerals are assigned to components having substantially identical functions and structural features to preclude the necessity for a repeated explanation thereof.

(Temperature Measuring Apparatus Achieved in the First Embodiment)

Figure 32:
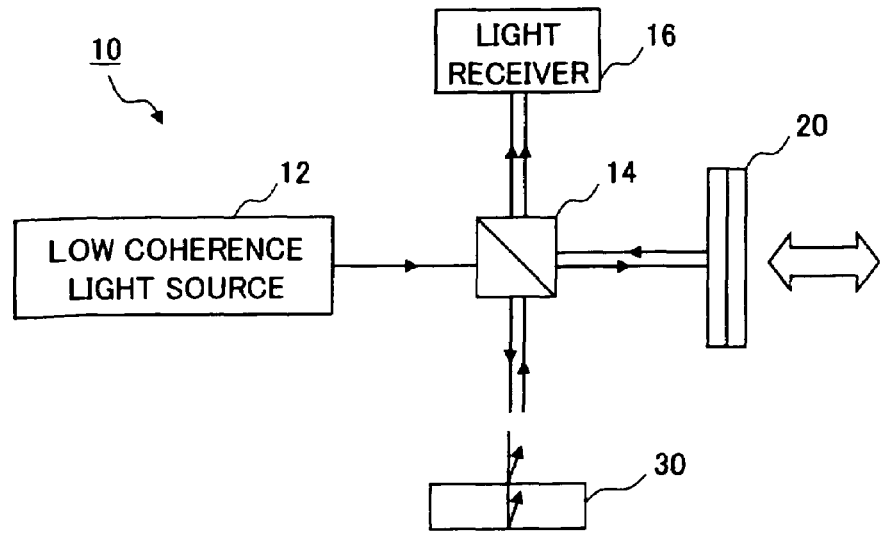
FIG. 32 illustrates the principle of a temperature measuring apparatus in the related art.
Figure 33:
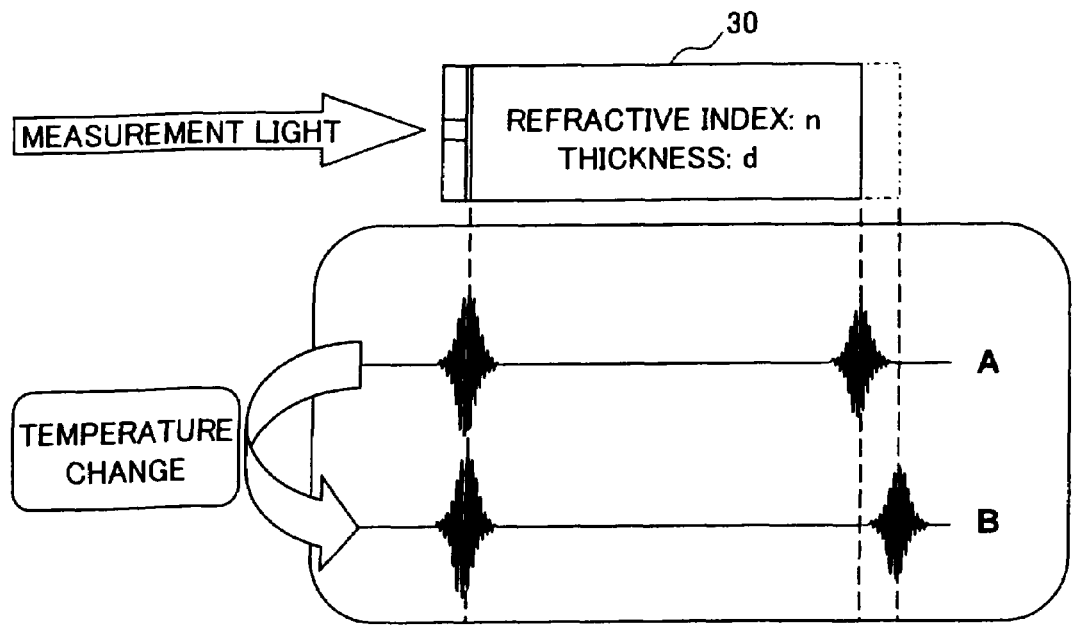
FIG. 33 conceptually illustrates interference waveforms measured with the temperature measuring apparatus shown in FIG. 32.

The temperature measuring apparatus achieved in the first embodiment of the present invention is now explained in reference to drawings. FIG. 1 is a block diagram schematically illustrating the structure adopted in the temperature measuring apparatus achieved in the first embodiment of the present invention. The temperature measuring apparatus 100 in the first embodiment achieves an improvement in the measurement accuracy with which the temperature/thickness of a measurement target T with a small thickness such as a semiconductor wafer (hereafter may be simply referred to as a "wafer") is measured based upon the principle explained earlier in reference to FIG. 32. The specific structure assumed in this temperature measuring apparatus 100 is described below.

As shown in FIG. 1, the temperature measuring apparatus 100 comprises a light source 110, a splitter 120 at which light originating from the light source 110 is split into measurement light and reference light, a reference light reflecting means 140 for reflecting the reference light from the splitter 120 and an optical path length altering means for altering the optical path length of the reference light reflected from the reference light reflecting means 140. The optical path length altering means is constituted with a drive means 142 such as a motor that drives the reference light reflecting means 140, which may be constituted with, for instance, a reference mirror, along a single direction parallel to the direction in which the reference light enters. By driving the reference mirror along a single direction in this manner, the optical path length of the reference light reflected from the reference mirror can be altered.

The temperature measuring apparatus 100 also includes a light receiving means 150 for measuring a plurality of interference waveforms (the plurality of interference waveforms may be collectively referred to as "light interference") of interference manifested by measurement beams reflected at the measurement target T (e.g., returning measurement beams having been reciprocally reflected at two end surfaces $S_1$ and $S_2$ of the measurement target T or having been reflected at the end surface $S_1$ on one side only) as the measurement light from the splitter 120 is radiated onto the end surface $S_1$ on one side of the measurement target T and the reference light reflected from the reference light reflecting means 140 as the reference light from the splitter 120 is radiated toward the reference light reflecting means 140.

(Different Measurement Beams used in the Temperature Measuring Apparatus in the First Embodiment)

Primary examples of measurement beams reflected at the measurement target 1 as the measurement light from the light source 110 is radiated toward the measurement target T in the temperature measuring apparatus shown in FIG. 1 are now explained in reference to a drawing. FIG. 2 is a conceptual diagram of different measurement beams, with the arrows in FIG. 2 indicating measurement beams reflected from the measurement target T. It is to be noted that while FIG. 2 shows measurement beams reflected at the two end surfaces of the measurement target T at positions offset from one another to clearly indicate the number of times each beam is reciprocally reflected at the two end surfaces, the angle of reflection changes in correspondence to the angle at which the measurement light is radiated onto the measurement target T in reality. For instance, if the measurement light is radiated along a direction substantially perpendicular to the measurement target T, the reflecting positions at the end surfaces $S_1$ and $S_2$, too, are set substantially on the optical axis of the measurement light.

Figure 2A:
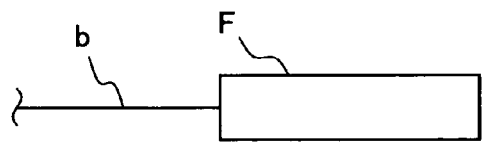
FIG. 2 is a conceptual diagram showing different path patterns of the measurement light radiated onto the measurement target, which may be observed in the embodiment.
Figure 2A:
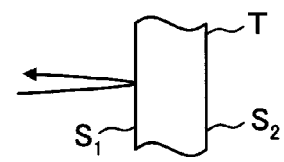
Figure 2B:
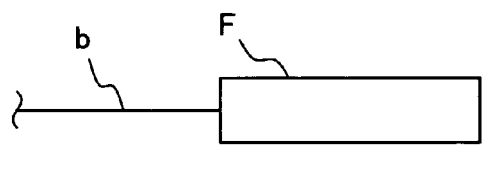
Figure 2B:
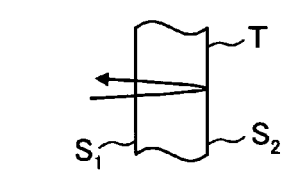

The measurement beams reflected from the measurement target T include a measurement beam that travels back after being reflected at the end surface $S_1$ (a first surface located on the side where the measurement light is radiated) of the measurement target T (a first surface/single reflection measurement beam or a nonreciprocal reflection measurement beam) as shown in FIG. 2A without traveling through the measurement target T reciprocally even once, and a measurement beam that is transmitted through the first surface $S_1$ of the measurement target T and is reflected once at the other end surface (the second surface $S_2$ on the side opposite from the first surface $S_1$), i.e., a measurement beam that is reciprocally reflected at the two end surfaces $S_1$ and $S_2$ of the measurement target T once (second surface/single reflection measurement beam or a single reciprocal reflection measurement beam), as shown in FIG. 2B.

Figure 2C:
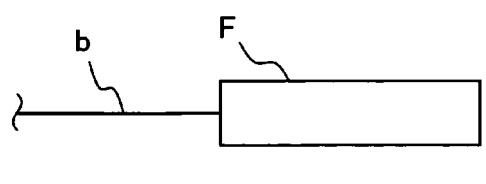
Figure 2C:
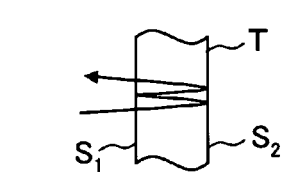
Figure 2D:
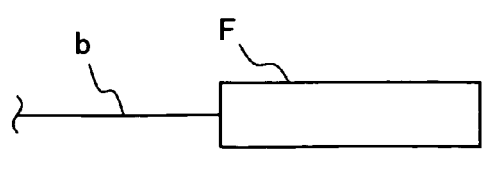
Figure 2D:
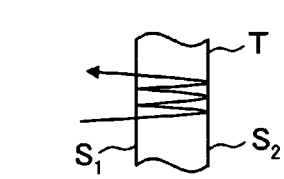

The measurement beams used in the apparatus according to the present invention further includes measurement beams reciprocally reflected at the two end surfaces $S_1$ and $S_2$ of the measurement target T multiple times (second surface/multiple reflection measurement beams or multiple reciprocal reflection measurement beams), such as a measurement beam that, after being transmitted through the first surface $S_1$ and reflected at the second surface $S_2$, is reflected at the first surface $S_1$ and is then reflected again at the second surface $S_2$ at the measurement target T, i.e., a measurement beam that is reciprocally reflected at the two end surfaces $S_1$ and $S_2$ of the measurement target T twice (a second surface/ double reflection measurement beam or a double reciprocal reflection measurement beam) as shown in FIG. 2C, and a measurement beam that, after being transmitted through the first surface $S_1$ of the measurement target T, is reflected three times at the second surface $S_2$ and is reflected twice at the first surface $S_1$, i.e., a measurement beam that is reciprocally reflected three times at the two end surfaces $S_1$ and $S_2$ of the measurement target T (a second surface triple reflection measurement beam or a triple reciprocal reflection measurement beam), as shown in FIG. 2D. Accordingly, the interference waveforms attributable to these measurement beams and the reference light are individually measured at the light receiving means 150.

While the temperature is measured in the related art by determining the optical path length L of the measurement light within the measurement target T with a nonreciprocal reflection measurement beam such as that shown in FIG. 2A and a single reciprocal reflection measurement beam such as that shown in FIG. 2B, the temperature is measured with a multiple reciprocal reflection measurement beam such as that shown in FIG. 2C or 2D instead of a single reciprocal reflection measurement beam such as that shown in FIG. 2B so as to improve the accuracy of the temperature measurement on a measurement target T with a small thickness according to the present invention. It is to be noted that specific examples of interference waveforms of interference attributable to the measurement beams described above and the reference light are to be described in detail later.

The light source 110 included in such a temperature measuring apparatus 100 should be capable of emitting light that is transmitted through and also reflected at the two end surfaces $S_1$ and $S_2$ of the measurement target T, can be reciprocally reflected at the two end surfaces of the measurement target at least twice and enables measurement of interference of the measurement light and the reference light obtained by splitting the light from the light source 110, since the temperature of the measurement target T is measured by using an interference waveform attributable to a measurement beam reciprocally reflected at the two end surfaces $S_1$ and $S_2$ of the measurement target T at least twice and the reference light.

If the temperature measurement target is a wafer, for instance, the light from the light source 110 should be such that no interference is induced at least with reflected light beams from points set apart by the distance between the front surface and the rear surface of the wafer (approximately 800 to 1500 μm under normal circumstances). More specifically, it is desirable to use, for instance, low coherence light. The term "low coherence light" refers to light with a small coherence length. It is desirable that the central wavelength of the low coherence light be 0.3 to 20 μm and it is even more desirable that the central wavelength be 0.5 to 5 μm. In addition, it is desirable that the coherence length be, for instance, 0.1 to 100 μm and it is even more desirable to use light with a coherence length equal to or less than 3 μm. By using the light source 110 that emits such low coherence light, any problems attributable to unnecessary interference can be avoided and the interference of the measurement light reflected from the two end surfaces $S_1$ and $S_2$ of the wafer with the reference light as well as the interference attributable to the measurement light reflected from an interface with an inner layer of the wafer with a different refractive index and the reference light, can be measured with ease.

Light sources that generate the desirable type of low coherence light described above include, for instance, an SLD (super luminescent diode), an LED, a high brightness lamp (such as a tungsten lamp or a xenon lamp) and a super wideband wavelength light source. It is particularly desirable to use an SLD with its high brightness performance as the light source 110, among these low coherence light sources.

An optical fiber coupler, for instance, may be used as the splitter 120. However, the present invention does not limit the splitter 120 to an optical fiber coupler, and any type of splitter may be used as long as it is capable of splitting light into reference light and measurement light. The splitter 120 may be constituted with, for instance, a light waveguide channel-type wave splitter, a semi-transparent mirror (half mirror) or the like, instead.

The reference light reflecting means 140 may be constituted with, for instance, a reference mirror. The reference mirror may be, for instance, a corner cube prism or a plane mirror. It is particularly desirable to use a corner cube prism, which assures the desired parallelism between the reflected light and the incident light. However, as long as the reference light reflecting means is capable of reflecting the reference light, it may be constituted with, for instance, a delay line (as in the case of the optical path altering means constituted with a piezotube delay line, which is to be detailed later), instead of a corner cube prism.

It is desirable to constitute the drive means 142 for driving the reference light reflecting means 140 with a stepping motor that drives the reference light reflecting means 140 along a direction (the direction indicated by the arrows in FIG. 1) parallel to the direction in which the reference light enters. By employing a stepping motor, the distance over which the reference light reflecting means 140 is displaced can be detected with ease based upon the motor drive pulses. However, as long as it is capable of altering the optical path length of the light reflected from the reference light reflecting means, a piezotube delay line, a rectilinear displacement stage type delay line or a multilayer piezo delay line as well as a voice coil motor delay line, which employs a voice coil motor, may be used instead of the motor described above to constitute the optical path length altering means.

It is desirable to constitute the light receiving means 150 with, for instance, an inexpensive and compact photodiode. More specifically, the light receiving means 150 may be constituted with a PD (photo detector) achieved by using, for instance, an Si photodiode, an InGaAs photodiode or a Ge photodiode. However, the present invention is not limited to the examples listed above, and the light receiving means 150 may instead be constituted with an avalanche photodiode, a photomultiplier or the like, as long as the interference manifested by the measurement light from a measurement target T and the reference light reflected from the reference light reflecting means 140 can be measured.

The reference light from the splitter 120 is transmitted via a reference light transmitting means (e.g., an optical fiber $F_Z$ equipped with a collimator mounted at the front tip of an optical fiber c) to a reference light radiation position at which it is radiated onto the reference light reflecting means 140. In addition, the measurement light from the splitter 120 is transmitted via a measurement light transmitting means (e.g., an optical fiber F equipped with a collimator mounted at the front tip of an optical fiber b) to a measurement light radiation position at which the measurement light is radiated toward the measurement target T. In other words, the measurement light transmitting means in the temperature measuring apparatus 100 in FIG. 1, which is disposed on one side of the measurement target T, transmits the measurement light from the light source 110 and radiates the measurement light toward an end surface (first surface) $S_1$ on one side of the measurement target T. In addition, the measurement light transmitting means receives returning measurement beams having been reciprocally reflected at the two end surfaces $S_1$ and $S_2$ of the measurement target T or having been reflected only at one end surface (the first surface) $S_1$ and transmits the received measurement beams toward the light receiving means 150. It is to be noted that the reference light transmitting means or the measurement light transmitting means may be a collimate fiber instead of an optical fiber equipped with a collimator.

The intensity ratio of the measurement light and the reference light obtained by splitting the light from the light source at the splitter 120 should be, for instance, 1:1. Since this substantially equalizes the intensity of the measurement light to the intensity of the reference light, interference waveforms which facilitate measurement of, for instance, the peak interval or the like are achieved. However, the intensity levels of the measurement light and the reference light are not limited to this example.

Operation of the Temperature Measuring Apparatus Achieved in the First Embodiment In the temperature measuring apparatus 100 structured as described above, the light originating from the light source 110 enters one of the input terminals (input ports) at the splitter 120 via, for instance, an optical fiber a and the light having entered the input terminal is split at the splitter 120 into two beams each directed to one of the two output terminals (output ports), as shown in FIG. 1. The light directed to one of the output terminals (output ports) is radiated as measurement light onto one side of the measurement targets T via the measurement light transmitting means which may be the optical fiber F equipped with a collimator disposed at the front tip of the optical fiber b. As the measurement light is radiated onto the measurement target T, measurement beams that travel back to the same side after being reflected at the measurement target T, as shown in FIG. 2, are received at the light receiving means 150 in the embodiment.

The other beam from the splitter 120, which is directed to the other output terminal (output port), is radiated as reference light via the reference light transmitting means such as the optical fiber $F_Z$ equipped with a collimator disposed at the front tip of the optical fiber c and is then reflected by the reference light reflecting means (e.g., a reference mirror) 140. The measurement beams reflected from the various measurement target T subsequently enter the splitter 120 via the optical fiber F equipped with a collimator, and the reference light reflected from the reference light reflecting means (e.g., a reference mirror) 140, too, enters the splitter 120 via the optical fiber $F_Z$ equipped with a collimator. The measurement beams then become reintegrated with the reference light and the reintegrated beams then enter via, for instance, an optical fiber d the light receiving means 150 constituted with a PD which may be an Si photodiode, an InGaAs photodiode or a Ge photodiode, where the interference waveforms attributable to the first through nth measurement beams and the reference light are detected.

(Specific Examples of Interference Waveforms Attributable to Measurement Beams and Reference Light)

Figure 3A:
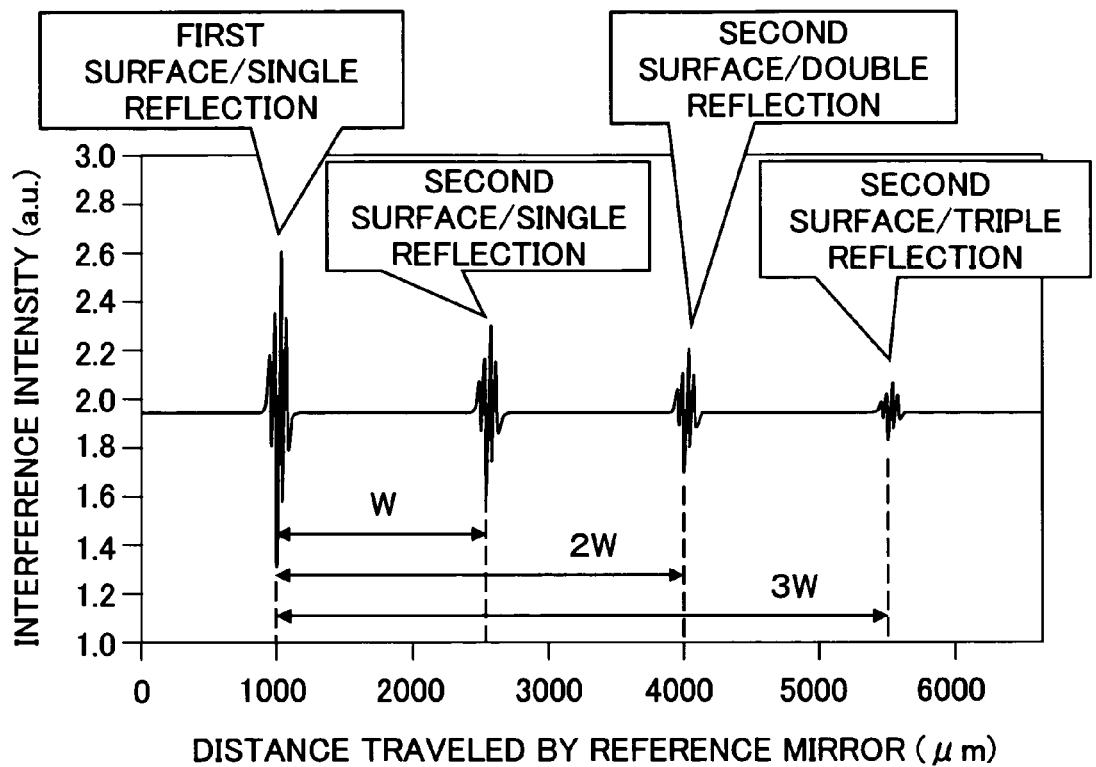
FIG. 3 presents specific examples of interference waves induced by measurement light and reference light in the temperature measuring apparatus achieved in the embodiment, with FIG. 3A presenting an example of interference waves manifesting before the temperature at the temperature measurement target changes and FIG. 3B presenting an example of interference waves manifesting after the temperature at the temperature measurement target changes.
Figure 3B:
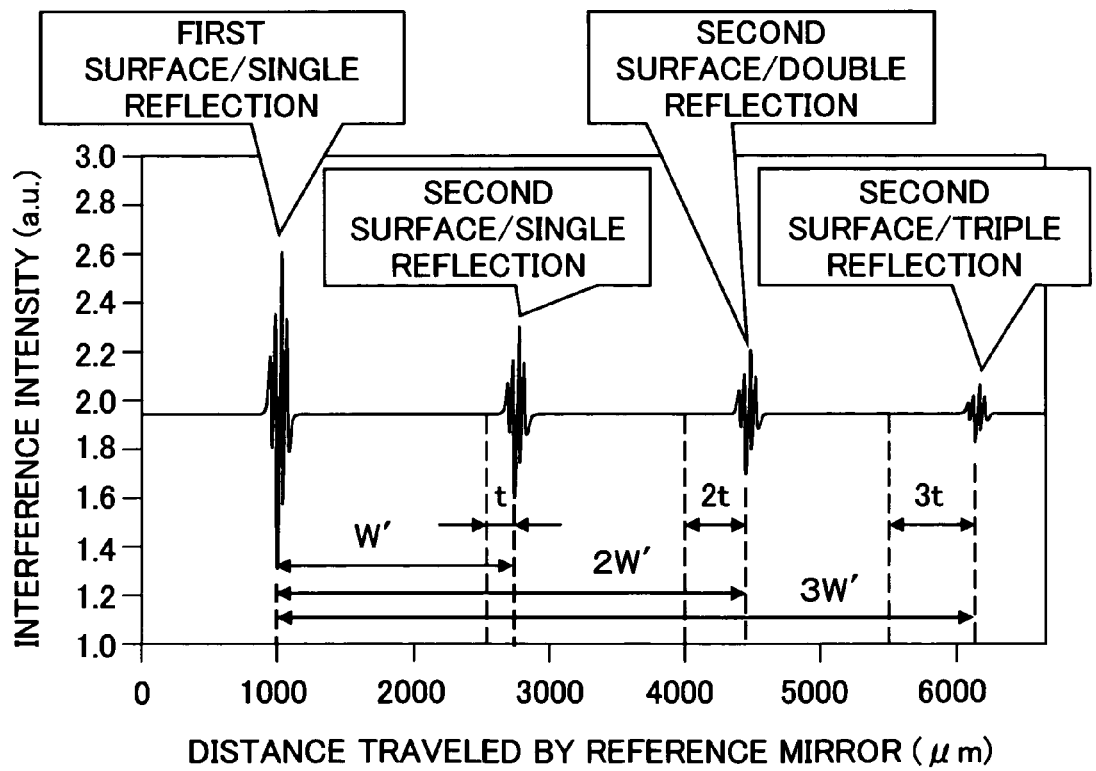

FIG. 3 shows interference waveforms attributable to measurement light and reference light that may be obtained in the temperature measuring apparatus 100. FIG. 3 shows the waveforms of the interference of various measurement beams such as those shown in FIG. 2 reflected at the measurement target T, with the reference light. FIG. 3A shows the interference waveforms detected prior to a temperature change, whereas FIG. 3B shows the interference waveforms detected after the temperature change. The vertical axis in FIG. 3 represents the interference intensity and the horizontal axis represents the distance by which the reference mirror is moved.

The light source 110 is a low coherence light source as described earlier. When a low coherence light source 110 which emits light with a small coherence length is used, intense interference occurs where the optical path length of the measurement light and the optical path length of the reference light match but the intensity of interference is substantially lowered elsewhere under normal circumstances. Accordingly, by driving the reference light reflecting means (such as a reference mirror) 140 forward/backward along, for instance, the direction in which the reference light is radiated so as to alter the optical path length of the reference light, interference of the various measurement beams such as those shown in FIG. 2A through 2D and the reference light is induced.

As FIG. 3A and 3B indicate, an interference waveform of the interference between a first surface/single reflection measurement beam (nonreciprocal reflection measurement beam) such as that shown in FIG. 2A and the reference light manifests, and then an interference waveform of the interference between a second surface/single reflection measurement beam (single reciprocal reflection measurement beam) such as that shown in FIG. 2B and the reference light manifests, as the reference light reflecting means (such as a reference mirror) 140 is scanned along the specific direction. As the reference light reflecting means 140 is further scanned, an interference waveform of the interference between a second surface/double reflection measurement beam (double reciprocal reflection measurement beam) such as that shown in FIG. 2C and the reference light manifests and then an interference waveform of the interference between a second surface/triple reflection measurement beam (triple reciprocal reflection measurement beam) such as that shown in FIG. 2D and the reference light manifests. Subsequently, as the reference light reflecting means 140 is scanned further, interference waveforms corresponding to various measurement beams such as a second surface/quadruple reflection measurement beam (quadruple reciprocal reflection measurement beam), a second surface/quintuple reflection measurement beam (quintuple reciprocal reflection measurement beam) and the like appear continuously over equal intervals (not shown).

(Interference Wave-Based Measurement of Temperature)

Next, an explanation is given on a method that may be adopted to measure a temperature based upon interference waves induced by the measurement light and the reference light. Methods that may be adopted to measure temperatures based upon interference waves include the temperature conversion method that is achieved by detecting a change in the optical path length resulting from a temperature change. In reference to the embodiment, a temperature conversion method achieved by detecting positional changes of the interference waveforms caused by temperature changes is explained.

As the measurement target T is heated with a heater or the like, the measurement target T expands, resulting in changes in its thickness d and the refractive index n. Thus, the optical path length (optical thickness) L between the two end surfaces $S_1$ and $S_2$ (between the front surface and the rear surface) of the measurement target T is altered through the temperature change and the positions of the interference waveforms attributable to measurement beams and the reference light become offset, resulting in a change in the peak interval between the peaks in the interference waveforms. Accordingly, by measuring the peak interval between the peaks in the interference waveforms, the temperature change at the measurement target T can be detected. For instance, the optical path length L at the measurement target T is equivalent to the interval between the peak in the interference waveform corresponding to the first surface/single reflection measurement beam and the peak in the interference waveform corresponding to the second surface/single reflection measurement beam in FIG. 3A, and this peak interval corresponds to the distance traveled by the reference light reflecting means (e.g., a reference mirror) 140. Thus, the optical path lengths L at the measurement target T before and after the temperature change can be measured by measuring the distance traveled by the reference mirror during the interval between the peaks in these interference waveforms.

The following is a more specific explanation of the temperature measuring method given in reference to d representing the thickness of the measurement target T having been measured as shown in FIG. 3 and n representing the refractive index. As the measurement light is radiated onto the measurement target T and the reference mirror is scanned along one direction, the interference waveform corresponding to the first surface/single reflection measurement beam, the interference waveform corresponding to the second surface/single reflection measurement beam, the interference waveform corresponding to the second surface/double reflection measurement beam and the interference waveform corresponding to the third surface/triple reflection measurement beam are sequentially obtained as shown in FIG. 3A.

If the measurement target T is heated during this process by using, for instance, a heater, the temperature of the measurement target T rises and this temperature change causes an expansion of the measurement target T and a change in the refractive index n. As a result, the positions of the peaks in other interference waveforms become offset relative to the position of the peak in a given interference waveform measured for the measurement target T, thereby altering the intervals between the peaks in the interference waveforms. For instance, relative to the interference waveform corresponding to the first surface/single reflection measurement beam measured for the measurement target T, the positions of the other interference waveforms, i.e., the positions of the interference waveform corresponding to the second surface/single reflection measurement beam, the interference waveform corresponding to the second surface/double reflection measurement beam and the interference waveform corresponding to the third surface/triple reflection measurement beam in FIG. 3B are offset respectively by t, 2t and 3t from the positions shown in FIG. 3A. Consequently, the peak intervals between the reference interference waveform and the other interference waveforms change from W, 2W and 3W in FIG. 3A to W', 2W' and 3W' in FIG. 3B.

Generally speaking, the extent to which the peak position of such an interference waveform shifts is dependent upon the coefficient of linear expansion $\alpha$ inherent to each layer at the measurement target along the depth d and the extent of change in the refractive index n is primarily dependent upon the temperature coefficient of refractive index change $\beta$ inherent to each layer. It is to be noted that the temperature coefficient of refractive index change $\beta$ is known to be also dependent upon the wavelength.

Accordingly, the thickness d' of the measurement target T after the temperature change is expressed as in (1-1) below. It is to be noted that in expression (1-1) below, $\Delta T$ represent the temperature change at the measurement target T. α indicates the coefficient of linear expansion of the measurement target T, and β indicates the temperature coefficient of refractive index change for the measurement target T. In addition, d and n respectively indicate the thickness and the refractive index at the measurement target T prior to the temperature change.

$$d'=d\cdot(1+\alpha\Delta T), n'=n\cdot(1+\beta\Delta T) \quad (1\text{-}1)$$

As expression (1-1) provided above indicates, the optical path length of a measurement beam transmitted through and reflected from the measurement target T changes as the temperature changes. The optical path length is normally indicated as the product of the thickness d and the refractive index n. Accordingly, with L representing the optical path length of the measurement light transmitted through and reflected at the measurement target T prior to the temperature change and $L_1'$ representing the optical path length after the temperature at the measurement target T changes by ΔT, L and L' can be expressed as in (1-2).

$$L=d\cdot n, L'=d'\cdot n' \quad (1\text{-}2)$$

Accordingly, the difference (L'−L) between the optical path lengths before and after the temperature change can be expressed as in (1-3) below by incorporating and streamlining expressions (1-1) and (1-2) provided above. It is to be noted that expression (1-3) does not include any infinitesimal terms in consideration of $\alpha\cdot\beta<<\alpha$ and $\alpha\cdot\beta<<\beta$.

$$L'-L=d'\cdot n'-d\cdot n=d\cdot n\cdot(\alpha+\beta)\cdot\Delta T=L\cdot(\alpha+\beta)\cdot\Delta T \quad (1\text{-}3)$$

The optical path length of the measurement light at the measurement target is equivalent to the interval between the peaks in the waveforms of the interference attributable to the measurement light and the reference light at the measurement target. For instance, the optical path length L of the measurement light at the measurement target T prior to the temperature change is equivalent to the interval W between the peaks of the interference waveforms shown in FIG. 3A, and the optical path length L' of the measurement beam at the measurement target T following the temperature change are respectively equivalent to the interval W' between the peaks of the interference waveforms shown in FIG. 3B. Thus, the interval between the peaks of the waveforms of the interference attributable to the measurement light and the reference light at the measurement target T can be measured in correspondence to the distance by which the reference light reflecting means (e.g., reference mirror) is moved in the temperature measuring apparatus 100 shown in FIG. 1.

Accordingly, as long as the coefficient of linear expansion α and the temperature coefficient of refractive index change β of the measurement target T are ascertained in advance, the temperature at the measurement target T can be calculated through conversion by using expression (1-3) once the interval between the peaks in the interference waveforms of the interference attributable to the measurement light and the reference light at the measurement target T is measured.

When converting an interference waveform peak interval to a temperature as described above, it is necessary to ascertain in advance the coefficient of linear expansion α and the temperature coefficient of refractive index change β since the coefficient of linear expansion α and the temperature coefficient of refractive index change β affect the optical path length indicated by the interval between the interference waveform peaks. Generally speaking, the coefficient of linear expansion α and the temperature coefficient of refractive index change β of a potential measurement target such as a wafer may be dependent upon the temperature in certain temperature ranges. For instance, since the coefficient of linear expansion α does not normally change significantly as long as the temperature of the substance is in the range of approximately 0 through 100° C., the coefficient of linear expansion may be regarded to be constant in this range. However, once the temperature exceeds 100° C., the coefficients of linear expansion of some materials start to change by greater extents as the temperature becomes higher and, in such a case, the temperature dependency cannot be disregarded. Likewise, the temperature dependency of the temperature coefficient of refractive index change β cannot be disregarded in a certain temperature range, either.

For instance, it is known that the coefficient of linear expansion α and the temperature coefficient of refractive index change β of silicon (Si) used to constitute wafers can be approximated with quadratic curves in the temperature range of 0 through 500° C. Refer to, for instance, an article written by J. A. McCaulley, V. M. Donnelly et al. (J. A. McCaulley, V. M. Donnelly, M. Vernon and I. Taha, "Temperature dependence of the near-infrared refractive index of silicon, gallium arsenide and indium phosphide" Phy. Rev. B49, 7408, 1994) for details.

As described above, the coefficient of linear expansion α and the temperature coefficient of refractive index change β are dependent on the temperature and accordingly, by ascertaining the values of the coefficient of linear expansion α and the temperature coefficient of refractive index change β corresponding to specific temperatures in advance through testing or the like, storing the data obtained through the testing or the like as temperature conversion reference data in memory (e.g., a memory 440 in a control device 400 to be described later) and executing temperature conversion based upon the temperature conversion reference data the temperature can be calculated with an even higher level of accuracy.

It is to be noted that the temperature may be measured based upon the interference waveforms attributable to the measurement light and the reference light by adopting a method other than that described above. For instance, the relationship between the optical path length at the measurement target T and its temperature may be ascertained in advance through testing or the like, and the optical path lengths (the peak interval between the interference waveforms) measured for the measurement target T based upon the interference waves attributable to the measurement light and the reference light may be directly converted to a temperature value based upon the data obtained through the testing or the like, which may be stored in advance as temperature conversion reference data in memory (e.g., the memory 440 of the control device 400 to be detailed later). This alternative allows the results of the measurement of the interference waves attributable to the measurement light and the reference light to be converted to a temperature value with ease even when the coefficient of linear expansion α and the temperature coefficient of refractive index change β are not known.

More specifically, when $L_i$ represents the optical path length at a known temperature $t_i$, $L_t$ represents the optical path length at a given temperature t, α represents the coefficient of linear expansion and β represents the temperature coefficient of refractive index change, the given temperature t in a temperature range over which the temperature dependency of the coefficient of linear expansion α and the temperature dependency of the temperature coefficient of refractive index change β can be disregarded is expressed as in (2-1) below. Expressions (2-1) is identical to expression (1-5), provided that $L1'=L_t$, $L1=L_i$, $\Delta T1=t-t_i$, $\alpha_1=\alpha$ and $\beta_1 = \beta$. Expression (2-1) can be simplified so as to express the given temperature t as in (2-2) below. When the temperature dependencies of the coefficient of linear expansion $\alpha$ and the temperature coefficient of refractive index change $\beta$ can be disregarded, $\alpha + \beta$ in (2-2) can be regarded as constant. Accordingly, expression (2-2) can be rewritten as a linear expression (2-3) by substituting $A_1$ and $B_1$ for the constant coefficients.

$$L_t - L_i = L_i \cdot (\alpha + \beta) \cdot (t - t_i) \quad (2-1)$$

$$t = (1/(\alpha + \beta)) \cdot (L_t/L_i) - (1/(\alpha + \beta) + t_i) \quad (2-2)$$

$$t = A_1 \cdot (L_t/L_i) + B_1 \quad (2-3)$$

If, on the other hand, the temperature dependencies of the coefficient of linear expansion $\alpha$ and the temperature coefficient of the refractive index change $\beta$ cannot be disregarded, the temperature t may be indicated with quadratic expression (2-4). $A_2$, $B_2$ and $C_2$ each represent a coefficient.

$$t = A_2 \cdot (L_t/L_i)^2 + B_2 \cdot (L_t/L_i) + C_2 \quad (2-4)$$

Figure 4:
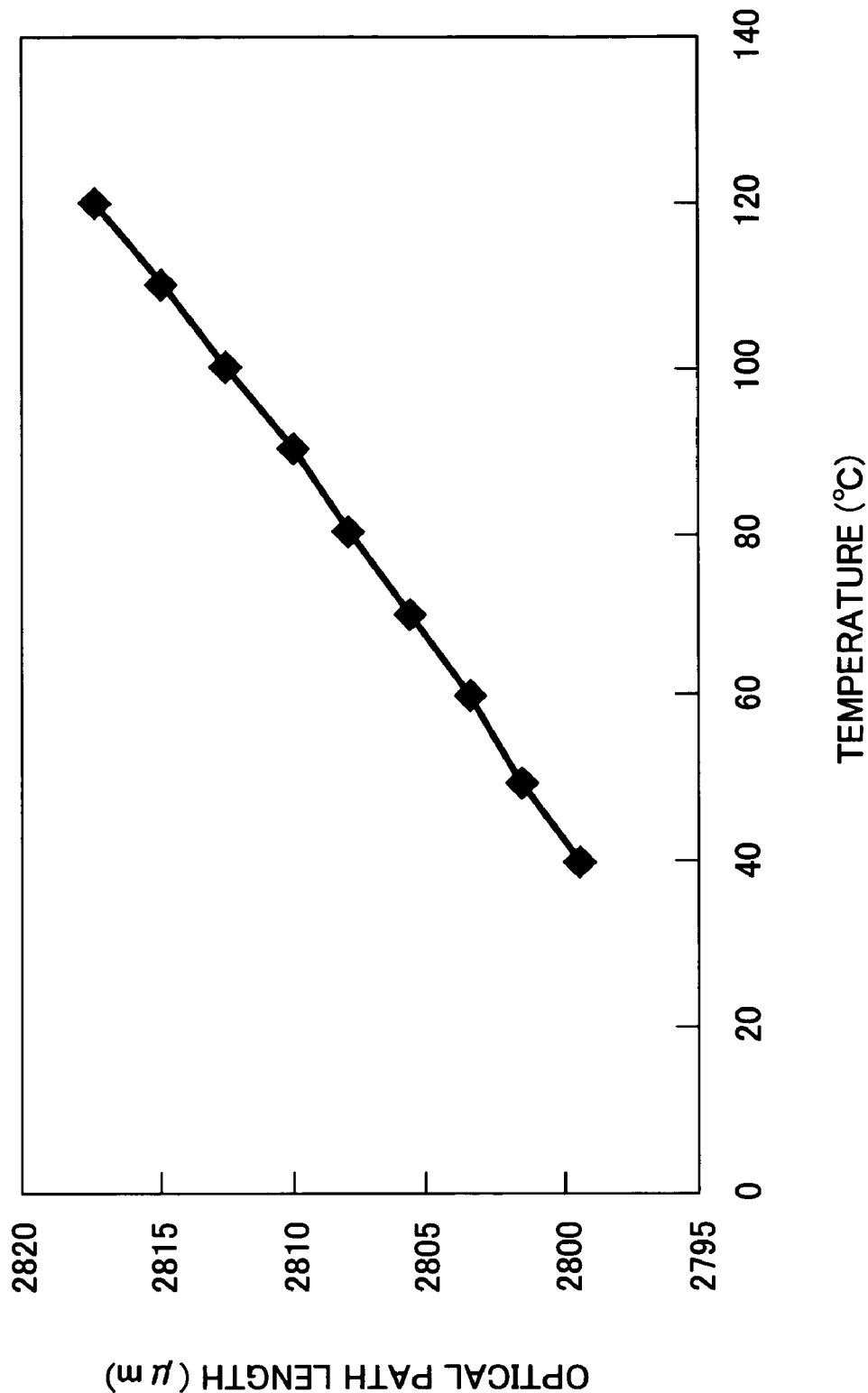
FIG. 4 shows test results representing a specific example of the relationship observed between the temperature of a measurement target and the optical path length.

The coefficients $A_1$ and $B_1$ in expression (2-3) and the coefficients $A_2$, $B_2$ and $C_2$ in expression (2-4) can be individually determined by actually measuring the optical path length at several different temperatures through testing. For instance, assuming that the test results such as those shown in FIG. 4 are obtained with regard to the relationship between the temperature and the optical path length, the coefficients in expression (2-4) are calculated to be; $A_2 = -1.2496 \times 10^5$, $B_2 = -2.6302 \times 10^5$ and $C_2 = -1.3802 \times 10^5$ when the known temperature $t_i$ is 40° C. and the corresponding optical path length is expressed as $L_i = L_{40}$.

By storing the coefficients in expression (2-4) thus ascertained through testing as temperature conversion reference data in memory in advance (e.g., the memory 440 or the like of the control device 400 to be detailed later), $L_t/L_{40}$ can be determined in correspondence to the optical path length $L_t$ measured based upon the interference waves attributable to the measurement light and the reference light. The optical path length $L_t$ can then be converted to the temperature t by substituting $L_t/L_{40}$ for $L_t/L_i$ in expression (2-4).

It is to be noted that the temperature may be measured based upon the interference waves attributable to the measurement light and the reference light by adopting a method other than that described above. For instance, the temperature may be determined in correspondence to the absorption intensity change resulting from a temperature change, or it may be determined based upon both the optical path length change resulting from a temperature change and the absorption intensity change resulting from the temperature change.

As explained earlier, the optical path length L' of the measurement light inside the measurement target T after the temperature change is equivalent to the peak interval W' between the peaks in the interference waveforms corresponding to, for instance, measurement beams reflected at the two sides surfaces $S_1$ and $S_2$ of the measurement target T (the interference waveforms corresponding to the first surface/single reflection measurement beam and the second surface/single reflection measurement beam in FIG. 3B), and thus, by converting the optical path length L' ascertained by measuring the peak interval W' to a temperature value, the temperature at the measurement target T can be measured.

However, expression (1-3) above indicates that the extent of change (L'−L) of the optical path length L of the measurement light inside the measurement target T relative to a unit of temperature change (e.g., 1° C.) is smaller when the measurement target T has a smaller thickness d. This means that when the measurement target T has a smaller thickness d, the extent t of change in the peak interval W between the peaks in the interference waveform corresponding to the first surface/single reflection measurement beam and the interference waveform corresponding to the second surface/single reflection measurement beam, which is equivalent to the optical length L, too, is smaller. As a result, it is more difficult to accurately measure the extent t of change in the peak interval W between the peaks in the interference waveforms measured for the measurement target T having a smaller thickness which presents an obstacle to improving the accuracy of the temperature measurement for the measurement target T.

Accordingly, in order to lengthen the peak intervals between the peaks in the interference waveforms, the interference waveform corresponding to a measurement beam reciprocally reflected at the two end surfaces $S_1$ and $S_2$ of the measurement target T at least twice (the interference waveform of a multiple reciprocal reflection measurement beam), such as the interference waveform of a second surface/double reflection measurement beam or a second surface/triple reflection measurement beam, is used for the temperature measurement.

For instance, the peak interval 2W between the peak in the interference waveform corresponding to the second surface/double reflection measurement beam reciprocally reflected at the two end surfaces $S_1$ and $S_2$ of the measurement target T twice, as shown in FIG. 2C and the peak in the interference waveform corresponding to the first surface/single reflection measurement beam is equivalent to 2L, i.e., twice the optical path length L of the measurement light inside the measurement target T, as shown in FIG. 3A. Accordingly, the optical path lengths L and L' of the measurement light at the measurement target T can be determined by measuring the peak intervals 2W and 2W' between the peaks in the interference waveforms before and after the temperature change and dividing the peak interval values 2W and 2W' thus obtained through the measurement by 2 which represents the number of times the measurement light is reciprocally reflected at the two end surfaces $S_1$ and $S_2$ of the measurement target T. Since the extent of change (2W'−2W) in the peak interval calculated by using the interference waveform corresponding to the second surface/double reflection measurement beam is 2t, which is twice the value obtained by using the interference waveform corresponding to the second surface/single reflection measurement beam, an improvement in the measurement accuracy is achieved.

In addition, the peak interval 3W between the peak in the interference waveform corresponding to the second surface/triple reflection measurement beam reciprocally reflected at the two end surfaces $S_1$ and $S_2$ of the measurement target T three times, as shown in FIG. 2D and the peak in the interference waveform corresponding to the first surface/single reflection measurement beam is equivalent to 3L, i.e., three times the optical path length L of the measurement light inside the measurement target T, as shown in FIG. 3A. Accordingly, the optical path lengths L and L' of the measurement light at the measurement target T can be determined by measuring the peak intervals 3W and 3W' between the peaks in the interference waveforms before and after the temperature change and dividing the peak interval values 3W and 3W' thus obtained through the measurement by 3 which represents the number of times the measurement light is reciprocally reflected at the two end surfaces $S_1$ and $S_2$ of the measurement target T. Since the extent of change (3W'−3W) in the peak interval calculated by using the interference waveform corresponding to the second surface/triple reflection measurement beam is 3t, which is three times the value obtained by using the interference waveform corresponding to the second surface/single reflection measurement beam, a further improvement in the measurement accuracy is achieved compared to the measurement accuracy realized by using the interference waveform corresponding to the second surface/double reflection measurement beam.

As described above, by using the interference waveform corresponding to, for instance, a measurement beam reflected once at the first surface $S_1$ of the measurement target T for reference, selecting the interference waveform of the measurement beam reciprocally reflected at the two end surfaces $S_1$ and $S_2$ of the measurement target T at least twice instead of the interference waveform corresponding to the measurement beam reflected at the second surface $S_2$ of the measurement target T only once and measuring the interval between the peaks in the reference interference waveform and the selected interference waveform, it is ensured that there will be a larger interval between the peaks in the interference waveforms undergoing the measurement. This means that the extent of change in the peak interval, too, is indicated by a greater value, thereby assuring an improvement in the accuracy with which the peak interval between the peaks in the interference waveforms is measured. In addition, since the peak interval between the peaks in the interference waveforms undergoing the measurement is lengthened by using an interference waveform corresponding to a measurement beam reciprocally reflected at the surfaces $S_1$ and $S_2$ of the measurement target T a greater number of times, the measurement accuracy in the interference waveform peak interval measurement can be improved. This, ultimately, leads to an improvement in the accuracy with which the temperature of the measurement target T is measured.

(Temperature Measuring System Achieved in the Second Embodiment)

Figure 5:
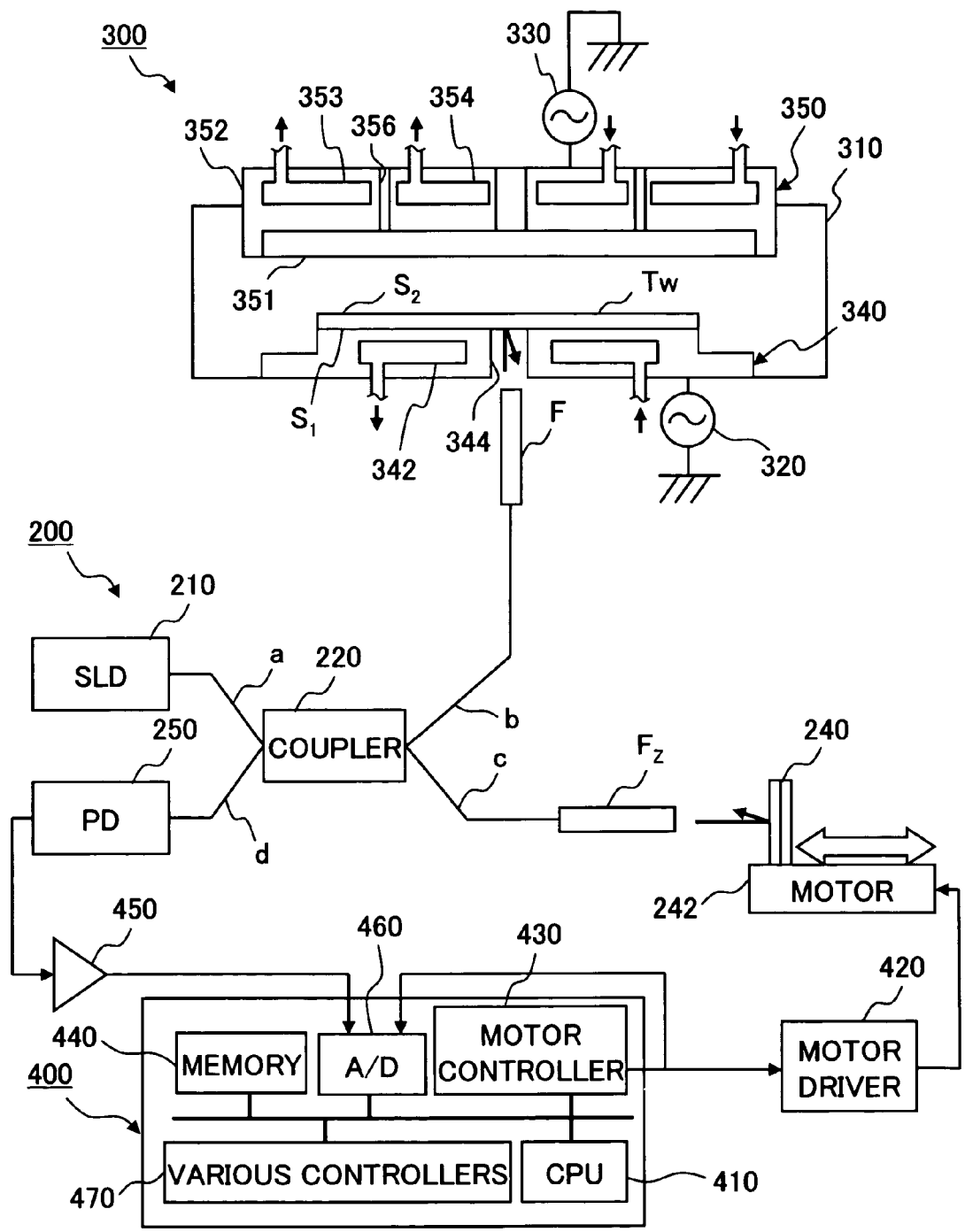
FIG. 5 is a schematic block diagram of the structure adopted in a specific example of the temperature measuring system for a substrate processing apparatus, achieved in a second embodiment of the present invention.

Next, the temperature measuring system for a substrate processing apparatus achieved in the second embodiment is explained in reference to drawings. The temperature measuring system for a substrate processing apparatus achieved in the second embodiment represents a specific example in which the temperature measuring apparatus in the first embodiment is adopted in conjunction with a substrate processing apparatus. FIG. 5 schematically shows the structure of the temperature measuring system achieved in the second embodiment. In reference to the second embodiment, the present invention adopted in the measurement of the temperature at a wafer Tw representing the temperature measurement target T in a substrate processing apparatus such as a plasma etching apparatus is explained.

The temperature measuring system in FIG. 5 is primarily constituted with a temperature measuring apparatus 200, a substrate processing apparatus 300 and a control device 400. A light source of the temperature measuring apparatus 200 in FIG. 5, corresponding to the light source 110 in FIG. 1, is a low coherence light source constituted with a low coherence SLD 210 capable of emitting low coherence light. In the temperature measuring apparatus 200, the splitter 120 for splitting the light originating from the light source 110 into measurement light and reference light is constituted with, for instance, a 2×2 optical fiber coupler 220, the light receiving means 150 is constituted with a PD 250 achieved by using, for instance, a Ge photodiode, the reference light reflecting means 140 is constituted with, for instance, a reference mirror 240 and the drive means 142 is constituted with a stepping motor 242 which drives the reference mirror 240.

The light source 110 that provides the measurement light, e.g., and SLD 210, should be capable of emitting light that is transmitted through and reflected at the two end surfaces $S_1$ and $S_2$ of the wafer Tw undergoing the measurement and can be reflected reciprocally at the two end surfaces $S_1$ and $S_2$ of the wafer Tw at least twice. For instance, the light source 110 should be capable of emitting light with a wavelength in a range of 1.0 to 2.5 μm which allows the light to be transmitted through a silicon material such as silicon or a silicon oxide film likely to be used to constitute the wafer Tw.

The substrate processing apparatus 300 includes a processing chamber 310 where a specific type of processing such as etching or film formation is executed on the wafer Tw, as shown in FIG. 5. Inside the processing chamber 310, an upper electrode 350 and a lower electrode 340 facing opposite the upper electrode 350 are disposed. The lower electrode 340 also functions as a stage on which the wafer Tw is placed. Above the lower electrode 340, an electrostatic chuck (not shown) for electrostatically holding the wafer Tw is disposed. In addition, a cooling means is disposed at the lower electrode 340. The cooling means circulates coolant through a coolant passage 342 formed in a substantially circular shape so as to enable control of the temperature at the lower electrode 340, and ultimately control the temperature at the wafer Tw. The wafer Tw is carried into the processing chamber 310 through a gate valve (not shown) that may be installed at a side surface of the processing chamber 310. High-frequency power sources 320 and 330 that apply predetermined levels of high-frequency power are respectively connected to the lower electrode 340 and the upper electrode 350.

The upper electrode 350 is structured so as to support the electrode plate 351 located at its lowermost position with an electrode support member 352. The electrode plate 351 may be formed by using, for instance, a silicon material (silicon, silicon oxide or the like), whereas the electrode support member 351 may be constituted of, for instance, aluminum. At the top of the upper electrode 350, an intake pipe (not shown) through which a specific type of processing gas is supplied is mounted. Numerous delivery holes (not shown) are formed at the electrode plate 351 so that the processing gas having been supplied through the intake pipe is let out evenly toward the wafer Tw placed on the lower electrode 340.

A cooling means is disposed at the upper electrode 350. The cooling means may be provided as a coolant passage formed inside the electrode support member 352 at the upper electrode 350, so as to control the temperature of the upper electrode 350 by circulating a coolant through the coolant passage. Such a coolant passage should be formed in a substantially circular shape. There may be two coolant passage systems, e.g., an outer coolant passage 353 through which the coolant is circulated to cool the outside area of the surface of the upper electrode 350 and an inner coolant passage 354 through which the coolant is circulated to cool the inside area of the surface. The coolant is supplied through a supply pipe into the outer coolant passage 353 and the inner coolant passage 354, as indicated by the arrows in FIG. 5. The coolant having circulated through the individual coolant passages 353 and 354 is discharged through a discharge pipe and the coolant is then allowed to return to an external refrigeration unit (not shown) for recirculation. A single type of coolant may be used to circulate through these two coolant passage systems, or two different types of coolant may be used for the circulation through the individual coolant passages. It is to be noted that the cooling means provided at the upper electrode 350 is not limited to the two coolant passage systems shown in FIG. 5. For instance, it may be achieved as a single coolant passage system, or it may be achieved as a single coolant passage system which splits into two passage branches.

At the electrode support member 352, a low heat transfer layer 356 is disposed between the outer area over which the outer coolant passage 353 is formed and the inner area over which the inner coolant passage 354 is formed. Since the low heat transfer layer 356 inhibits heat transfer between the outer area and the inner area at the electrode support member 352, it is possible to vary the temperature at the outer area from the temperature at the inner area through coolant control at the outer coolant passage 353 and the inner coolant passage 354. Thus, the temperature within the surface of the upper electrode 350 can be controlled efficiently and accurately.

The wafer Tw is carried into the substrate processing apparatus 300 described above through the gate valve on, for instance, a transfer arm. The wafer Tw having been transferred into the processing chamber 310 is then placed on the lower electrode 340, the high-frequency power is applied to the upper electrode 350 and the lower electrode 340, and a specific type of processing gas is supplied into the processing chamber 310 through the upper electrode 350. As a result, the processing gas having been supplied through the upper electrode 350 is raised to plasma with which a specific type of processing such as etching is executed at the surface of the wafer Tw.

The reference light from the optical fiber coupler 220 at the temperature measuring apparatus 200 described earlier is transmitted to a reference light radiation position at which it is radiated toward the reference mirror 240 via the reference light transmitting means, e.g., the optical fiber $F_Z$ equipped with a collimator. In addition, the measurement light departing the optical fiber coupler 220 is transmitted via the measurement light transmitting means, e.g., the optical fiber F equipped with a collimator, to a measurement light radiation position at which the measurement light is radiated from the lower electrode 340 toward the wafer Tw undergoing the measurement. More specifically, the optical fiber F equipped with a collimator is disposed so that the measurement light is radiated toward the wafer Tw through a through hole 344 formed at, for instance, the center of the lower electrode 340. It is to be noted that while an explanation is given above in reference to FIG. 5 on an example in which the in-plane position at which the measurement light is radiated, i.e., the position within the plane ranging along the surface of the wafer Tw, at which the measurement light is radiated, is set at the center, the present invention is not limited to this example and the measurement light may be radiated at any position as long as it is radiated onto the wafer Tw. For instance, the optical fiber F equipped with a collimator may be disposed so as to radiate the measurement light toward an end portion of the wafer Tw.

The control device 400 controls the various units constituting the temperature measuring apparatus 200 and the substrate processing apparatus 300. The control device 400 includes a CPU (central processing unit) 410 constituting the main unit of the control device, a motor controller 430 that controls the stepping motor 242 for driving the reference mirror 240 via a motor driver 420, a memory 440 constituting a ROM (read-only memory) in which program data and the like to be used by the CPU 410 to control the individual units and a RAM (random access memory) containing a memory area and the like to be used by the CPU 410 when it executes various types of data processing and the like, an A/D converter 460 that executes analog/digital conversion of output signals (indicating the results of interference wave measurement obtained by radiating the measurement light) input thereto from the PD 250 via a buffer 450 and a control signal (e.g., a drive pulse) provided by the motor controller 430 and inputs the results of the conversion and various controllers 470 that control the individual units constituting the substrate processing apparatus 300. The control device 400 may measure the position to which the reference mirror 240 is moved or the distance by which the reference mirror 240 is moved based upon the control signal (e.g., a drive pulse) for the stepping motor 242 output from the motor controller 430, or it may measure the position to which the reference mirror 240 is moved or the distance by which the reference mirror 240 is moved based upon an output signal provided by a linear encoder mounted at the motor 242. In addition, the motor 242 does not need to be a stepping motor and instead, a voice coil motor or the like may be used.

The control device 400 selects the reference interference waveform and the selected interference waveform to be used in the temperature measurement from the interference waveforms of the interference manifested by the reference light and the measurement light, which are detected at the PD 250 by controlling the movement of the reference mirror 240, measures the optical path length L at the wafer Tw based upon the reference interference waveform and the selected interference waveform and calculates the temperature at the wafer Tw based upon the measurement results through a temperature conversion such as that explained earlier. More specifically, it converts the optical path length L of the measurement light at the wafer Tw to a value representing the temperature based upon the temperature conversion reference data or the like that may be stored in advance in the memory 440. In this sense, the control device 440 constitutes a measuring means.

Figure 6:
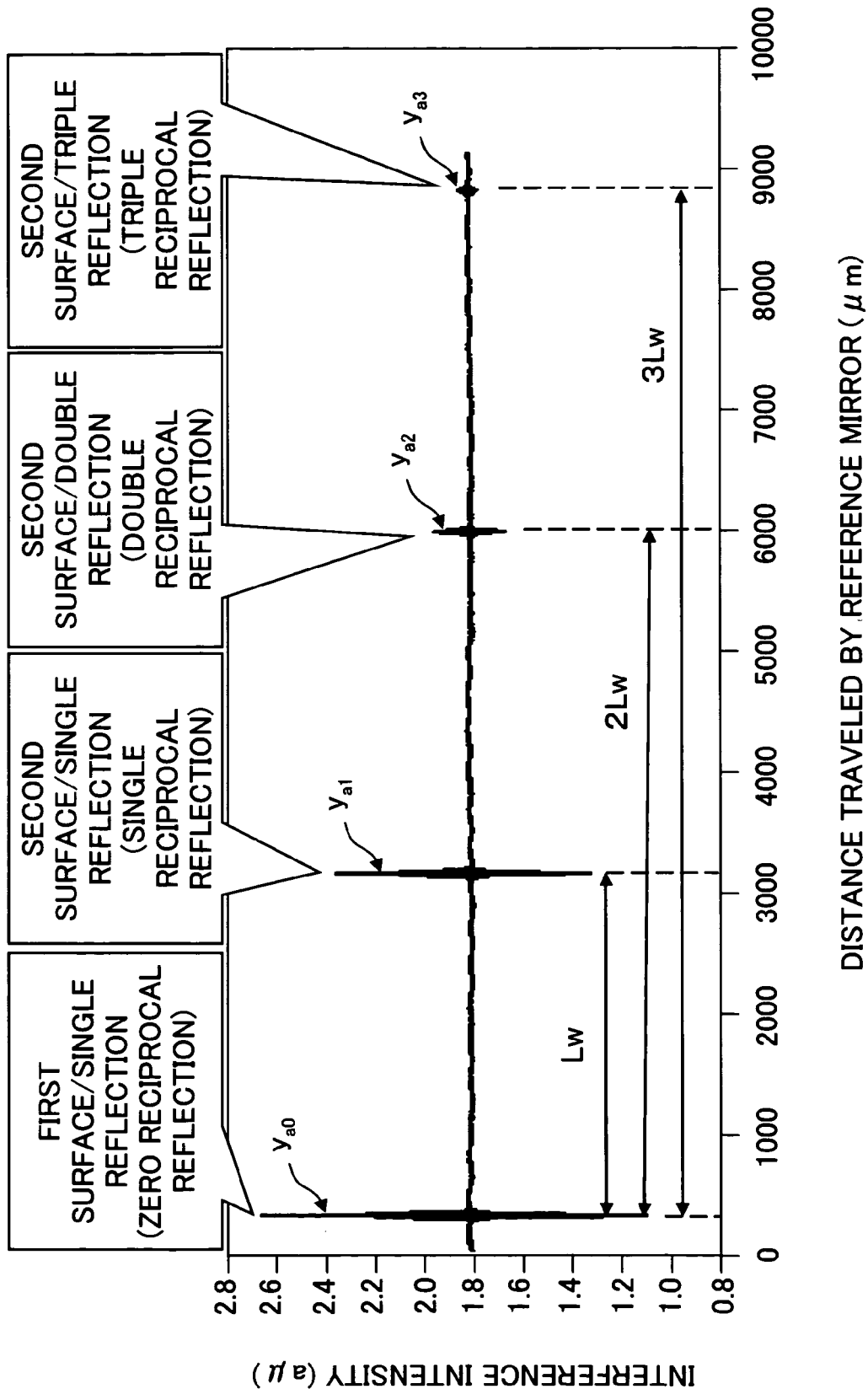
FIG. 6 presents a specific example of interference waves induced by measurement light and reference light in the temperature measuring apparatus achieved in the embodiment.

FIG. 6 presents a specific example of light interference between the measurement light and the reference light that may be detected in the temperature measuring system shown in FIG. 5. FIG. 6 shows the interference waveforms of the interference between various measurement beams reflected at the wafer Tw such as those shown in FIG. 2 and the reference light reflected at the reference light reflecting means 140. In FIG. 6, the vertical axis represents the interference intensity and the horizontal axis represents the distance traveled by the reference mirror.

FIG. 6 indicates that as the reference mirror 240 is scanned along a specific direction, the interference waveform attributable to a measurement beam reflected at the first surface $S_1$, i.e., the rear surface of the wafer Tw, and the reference light (the interference waveform corresponding to the first surface/single reflection measurement beam or nonreciprocal reflection measurement beam) $y_{a0}$ is detected, and then the interference waveform attributable to a measurement beam which is reflected at the second surface $S_2$ constituting the front surface of the wafer Toward and is then reciprocally reflected at the two end surfaces (the first surface $S_1$ and the second surface $S_2$) once, and the reference light (the interference waveform corresponding to the second surface/single reflection measurement beam or single reciprocal reflection measurement beam) $y_{a1}$ is detected. As the reference mirror 240 is further scanned, the interference waveform attributable to a measurement beam reciprocally reflected at the two end surfaces $S_1$ and $S_2$ of the wafer Tw twice and the reference light (the interference waveform corresponding to the second surface/double reflection measurement beam or double reciprocal reflection measurement beam) $y_{a2}$ is detected and then, the interference waveform attributable to a measurement beam reciprocally reflected at the two end surfaces $S_1$ and $S_2$ of the wafer Tw three times and the reference light (the interference waveform corresponding to the second surface/triple reflection measurement beam or triple reciprocal reflection measurement beam) $y_{a3}$ is detected.

Assuming that the interference waveform $y_{a0}$ corresponding to the first surface/single reflection measurement beam among these interference waveforms is used as the reference interference waveform, the peak intervals Lw, 2Lw and 3Lw between the peak in the reference interference waveform $y_{a0}$ and the peaks in the other interference waveforms $y_{a1}$ to $y_{a3}$ are equivalent to the optical path length (the optical path length at the wafer Tw) of the measurement light extending between the surfaces $S_1$ and $S_2$, indicating the thickness of the wafer Tw, twice the optical path length and three times the optical path length respectively, i.e., the peak intervals Lw, 2Lw and 3Lw respectively correspond to L, 2L and 3L. Accordingly, the optical path length L at the wafer Tw can be ascertained by measuring the peak interval between the peaks in the reference interference waveform $y_{a0}$ and any selected interference waveform selected from the other interference waveforms $y_{a1}$ to $y_{a3}$. The term "reference interference waveform" is used in this context to refer to an interference waveform used as a reference when determining the optical path length L of the measurement target such as the wafer Tw. The term "selected interference waveform" refers to an interference waveform used to ascertain the optical path length L at the wafer Tw based upon the peak interval between the peaks in the reference interference waveform and the selected interference waveform.

Figure 7:
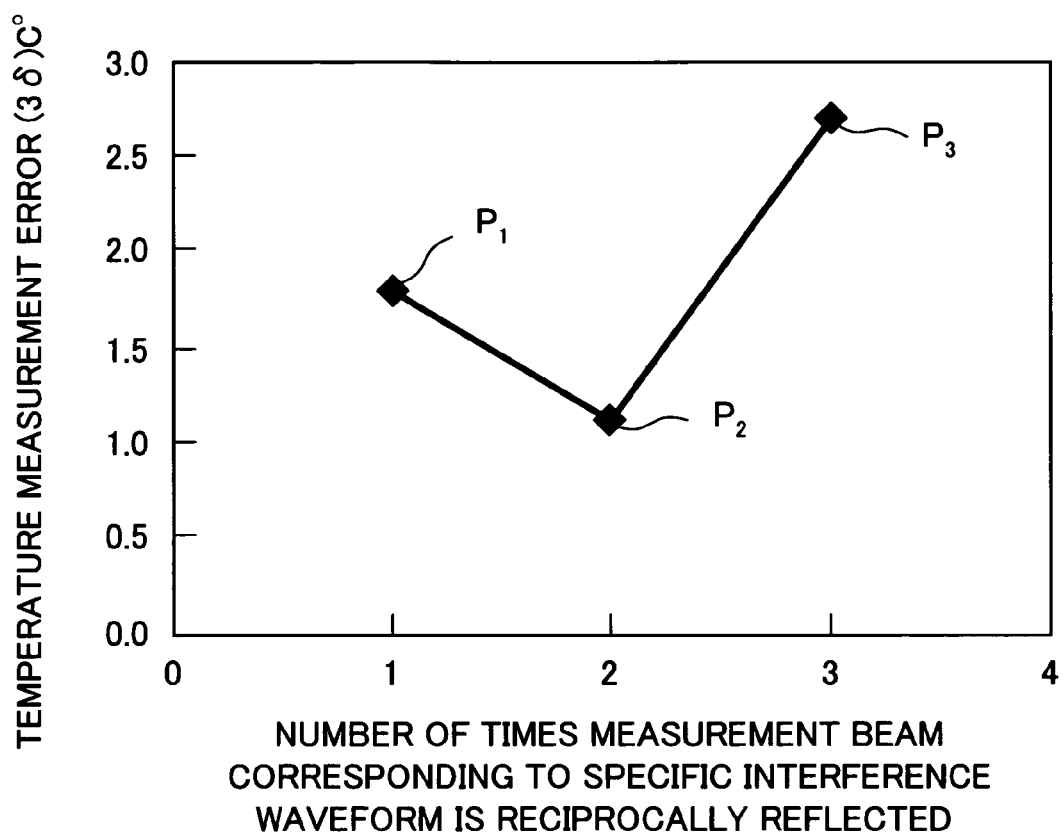
FIG. 7 presents the results of a test conducted to calculate the temperature measurement error in the temperature measurement executed by using the interference waveforms in FIG. 6.

FIG. 7 presents the results of tests conducted to calculate the temperature measurement error in temperature measurement executed by using interference waveforms such as those shown in FIG. 6. More specifically, FIG. 7 presents a graph obtained through tests conducted by designating the interference waveform $y_{a0}$, among the interference waveforms attributable to the measurement light and the reference light detected when the temperature of the wafer Tw was 40° C., as the reference interference waveform and each of the other interference waveforms $y_{a1}$ to $y_{a3}$ as a selected interference waveform, measuring the peak intervals between the peaks in the reference interference waveform $y_{a0}$ and the individual selected interference waveforms $y_{a1}$ to $y_{a3}$, executing 50 cycles of the temperature measurement processing sequence for converting the optical path length L at the wafer Tw to a value representing the temperature in correspondence to each of the peak intervals Lw, 2Lw and 3Lw having been measured and calculating the average of the temperature measurement errors manifesting when the temperature measurement was executed using the individual selected interference waveforms $y_{a1}$ to $y_{a3}$.

In FIG. 7, the number of times the measurement beam corresponding to each of the selected interference waveforms $y_{a1}$ to $y_{a3}$ was reciprocally reflected is indicated along the horizontal axis whereas the temperature measurement error is indicated along the vertical axis. In addition, the temperature measurement error is indicated in FIG. 7 as a value of 3δ obtained by tripling δ representing the standard deviation in the 50 sets of temperature data obtained based upon the interference waveforms $y_{a1}$ to $y_{a3}$. Accordingly, as the value 3δ used as the temperature measurement error index increases, the temperature value obtained through conversion deviates further from the actual temperature 40° C., i.e., a greater temperature measurement error manifests. In FIG. 7, $P_1$ indicates the temperature measurement error that manifested when the temperature measurement was executed by using the interference waveform $y_{a1}$ as the selected interference waveform, $P_2$ indicates the temperature measurement error that manifested when the temperature measurement was executed by using the interference waveform $y_{a2}$ as the selected interference waveform and $P_3$ indicates the temperature measurement error that manifested when the temperature measurement was executed by using the interference waveform $y_{a3}$ as the selected interference waveform.

The test results presented in FIG. 7 indicate that the extent of temperature measurement error corresponding to the interference waveform $y_{a2}$ used as the selected interference waveform ($P_2$) is smaller than that corresponding to the interference waveform $y_{a1}$ ($P_1$) used as the selected interference waveform. In other words, better measurement accuracy for the measurement of the peak interval between the peaks in the reference interference waveform and the selected interference waveform is assured when an interference waveform that allows for a greater peak interval relative to the reference interference waveform $y_{a0}$ is selected as the selected interference waveform.

Thus, it would be assumed that the peak interval measurement accuracy would be improved by a greater extent by selecting the interference waveform corresponding to a measurement beam reciprocally reflected at the two end surfaces of the wafer Tw a greater number of times as the selected interference waveform so as to lengthen the peak interval between the peaks in the reference interference waveform and the selected interference waveform as much as possible.

However, the results of the actual temperature measurement tests presented in FIG. 7 also indicate that when the interference waveform $y_{a3}$ was used as the selected interference waveform ($P_3$), a greater temperature measurement error occurred compared to the temperature measurement error that occurred when the interference waveform $y_{a2}$ was used as the selected interference waveform, i.e., the temperature measurement accuracy was adversely affected although the peak interval between the peaks in the reference interference waveform and the selected interference waveform was greater than the peak interval measured by designating the interference waveform $y_{a2}$ as the selected interference waveform.

The lower temperature measurement accuracy described above is attributable to the fact that the interference waveform corresponding to a measurement light reciprocally reflected at the two end surfaces of the wafer Tw a great number of times tends to become deformed (distorted) more readily due to the lowered light intensity relative to the noise (a lowered S/N ratio), giving rise to the likelihood of erroneous measurement of the peak position in the interference waveform. For this reason, a measurement error corresponding to the measurement error in the measurement of the peak position in such an interference waveform designated as the selected interference waveform is bound to manifest in the peak interval measured by using the selected interference waveform and the reference interference waveform. It is to be noted that the term "noise" in this context may refer to noise generated in the electronic circuit, noise originating in a surrounding electromagnetic environment when the high frequency power is applied to the upper electrode 350 or the like.

(Interference Waveform Peak Position Measurement Error)

Figure 8:
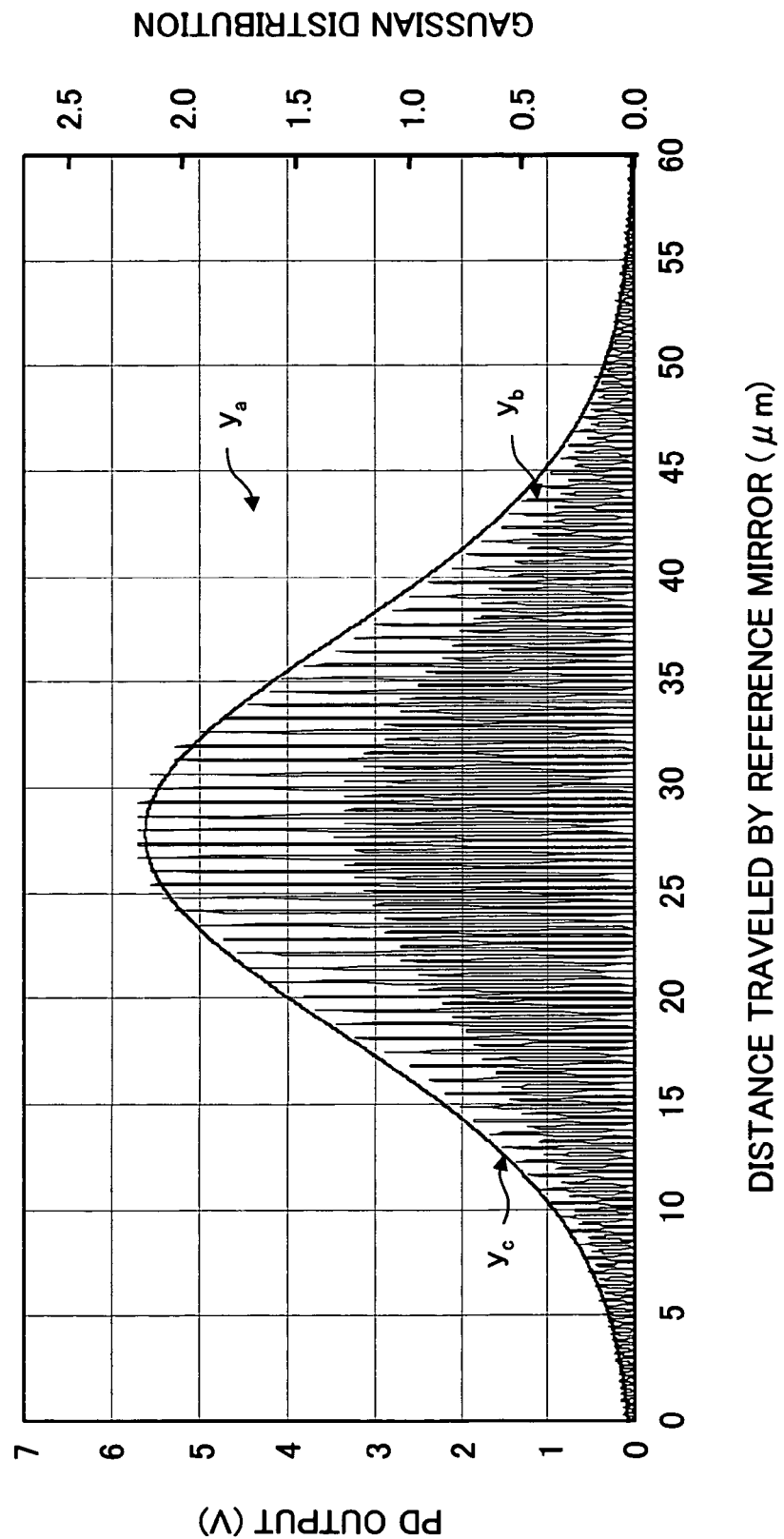
FIG. 8 presents a specific example of an actually measured waveform in an enlargement and processed waveform obtained by executing a specific type of processing on the measured waveform.
Figure 9:
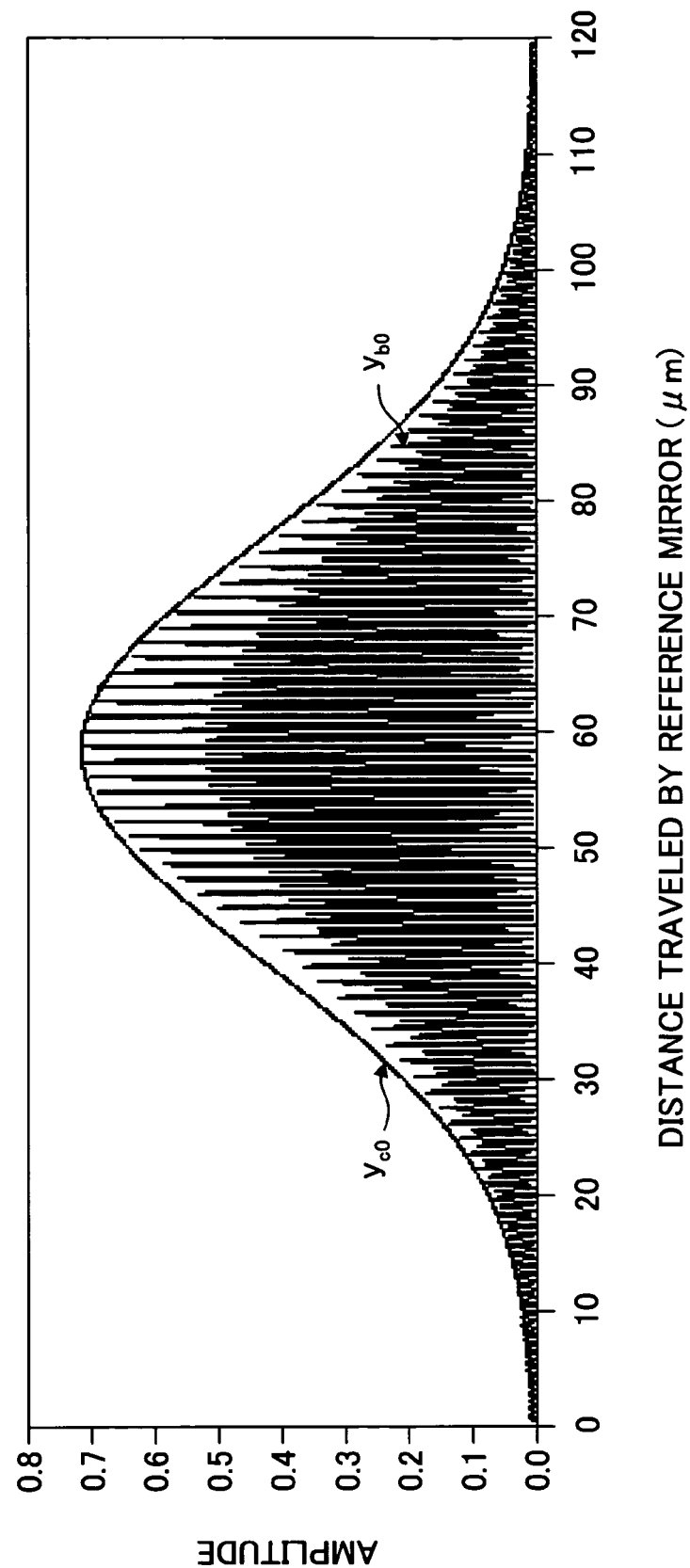
FIG. 9 shows a processed waveform $y_{b0}$ corresponding to the interference waveform $y_{a0}$ in FIG. 6.
Figure 10:
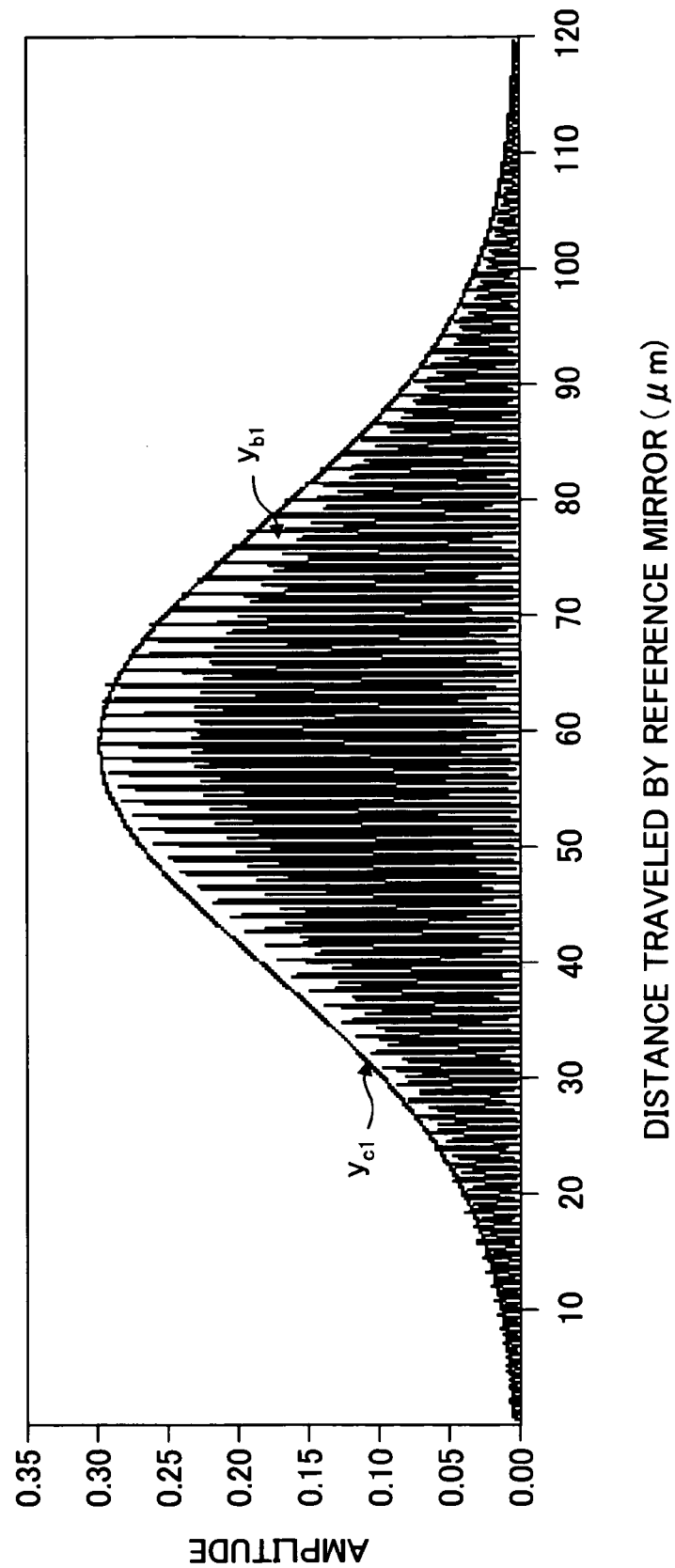
FIG. 10 shows a processed waveform $y_{b1}$ corresponding to the interference waveform $y_{a1}$ in FIG. 6.
Figure 11:
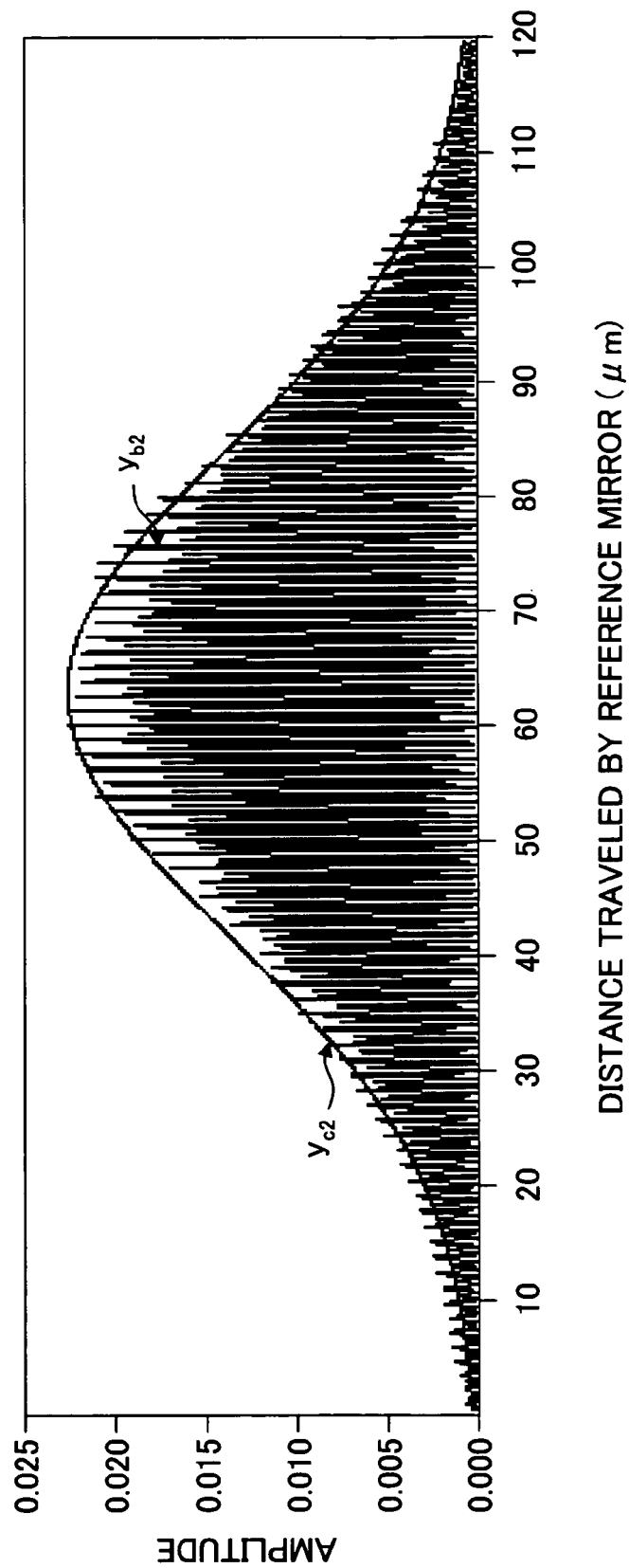
FIG. 11 shows a processed waveform $y_{b2}$ corresponding to the interference waveform $y_{a2}$ in FIG. 6.
Figure 12:
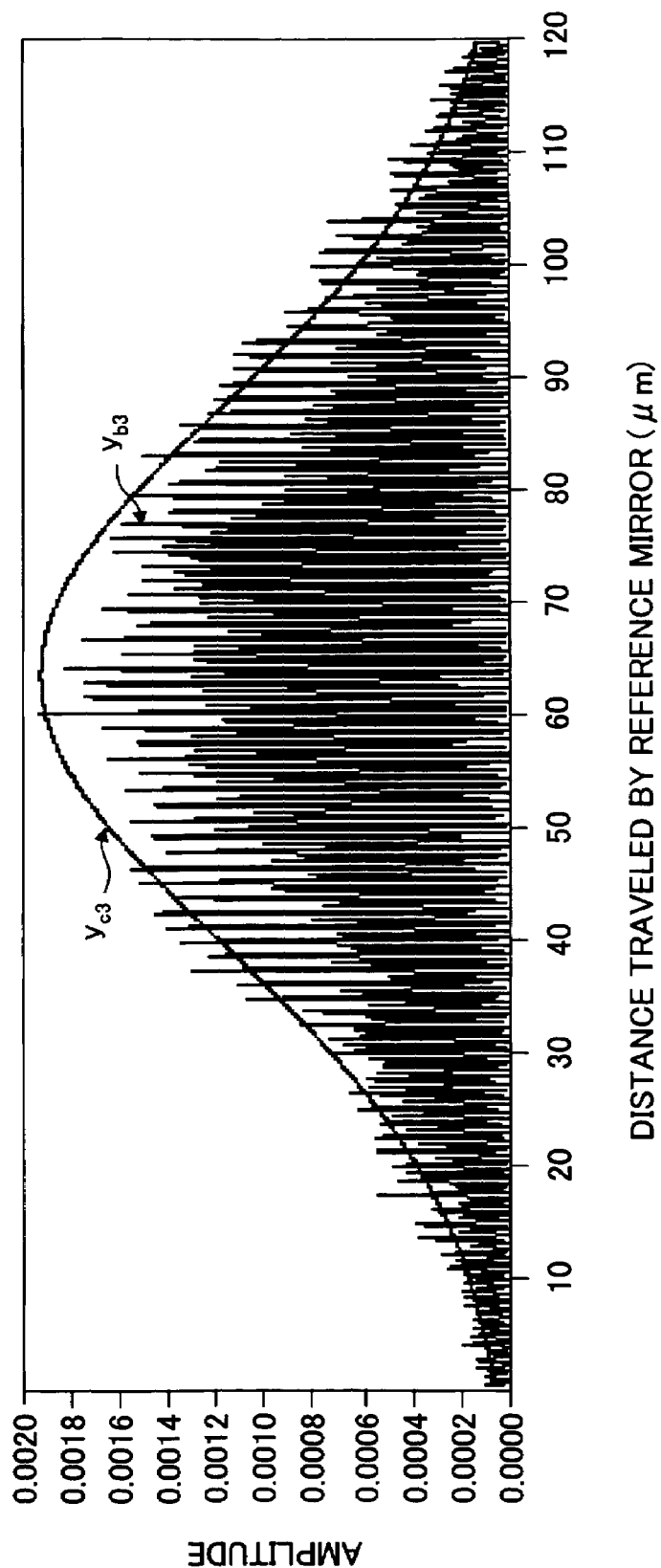
FIG. 12 shows a processed waveform $y_{b3}$ corresponding to the interference waveform $y_{a3}$ in FIG. 6.
Figure 13:
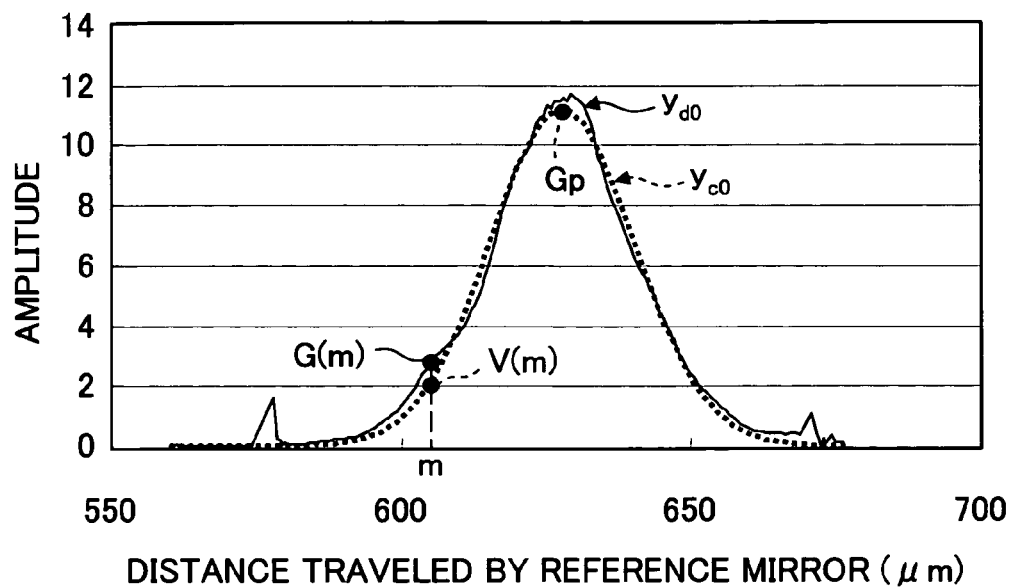
FIG. 13 shows an envelope $y_{d0}$ corresponding to the interference waveform $y_{a0}$.
Figure 14:
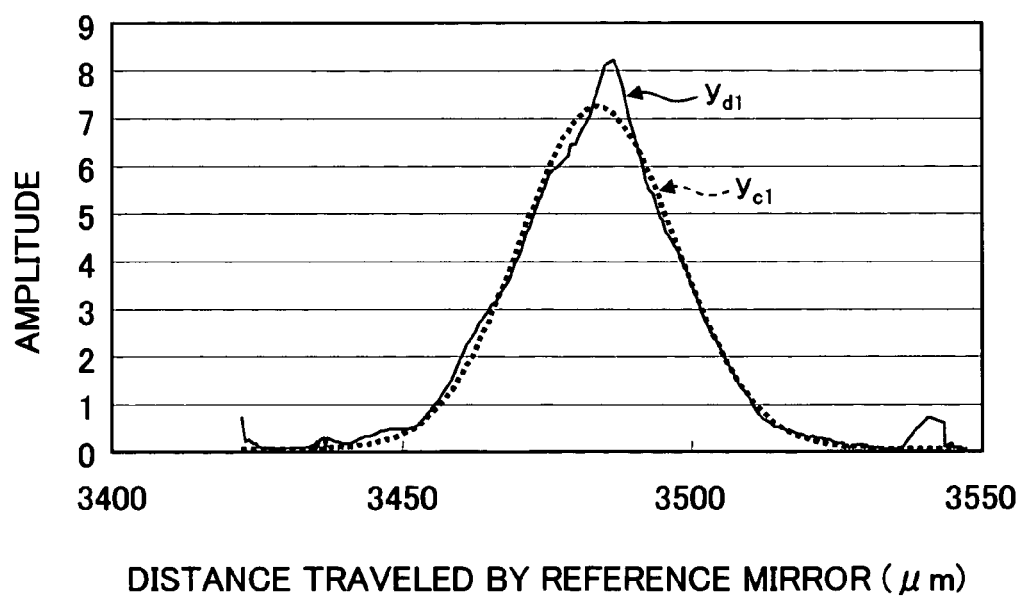
FIG. 14 shows an envelope $y_{d1}$ corresponding to the interference waveform $y_{a1}$.
Figure 15:
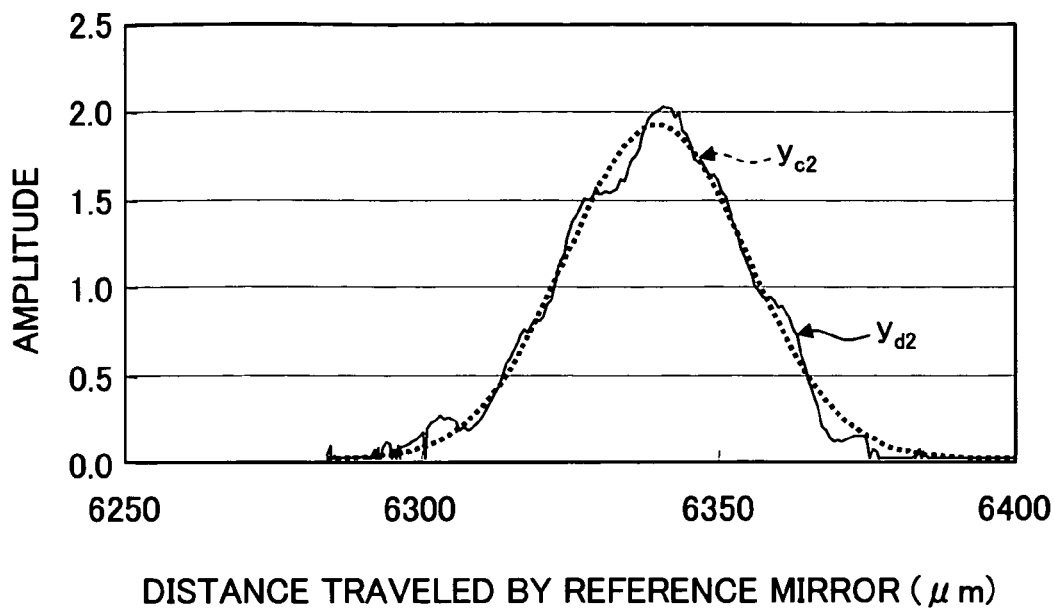
FIG. 15 shows an envelope $y_{d2}$ corresponding to the interference waveform $y_{a2}$.
Figure 16:
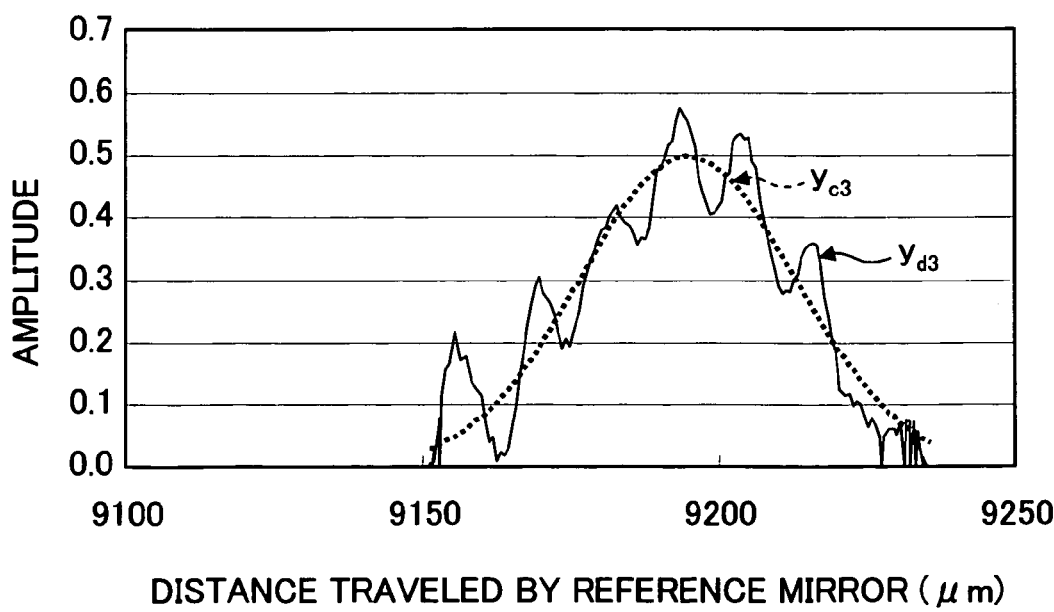
FIG. 16 shows an envelope $y_{d3}$ corresponding to the interference waveform $y_{a3}$.

In reference to a drawing, the measurement error that may occur when measuring the peak position in an interference waveform such as that described above is explained in further detail. FIG. 8 presents a specific example of a measured waveform $y_a$ in an enlargement over a magnified reference mirror traveling distance range and a processed waveform $y_b$ obtained by executing a specific type of processing on the measured waveform $y_a$. In FIG. 8, the horizontal axis represents the distance traveled by the reference mirror, the output voltage (V) output from the PD250 upon detecting the measured waveform is indicated along the vertical axis on one side and the Gaussian distribution (normal distribution) range is indicated along the vertical axis on the other side.

As the measured waveform $y_a$ in FIG. 8 indicates, each interference waveform is actually measured as a so-called wave series that forms gentle peaks. The wave series is constituted with a plurality of reiterated waves, and a wave series constituting each interference waveform is characterized by its own phase and amplitude.

A specific type of processing is executed on such a measured waveform $y_a$ so as to ascertain the peak position in the waveform with greater ease. For instance, after subtracting the offset from the waveform data of the measured waveform $y_a$, the waveform data may be squared to reflect any negative component contained therein as a positive component. The processed waveform resulting from such processing may be the processed waveform $y_b$ in FIG. 8.

Then, the entire wave series constituting the processed waveform $y_b$ thus obtained undergoes the process of curvilinear approximation. Such a curve approximating the wave series may be, for instance, a Gaussian distribution curve (normal distribution curve). When approximating the entire wave series constituting the processed waveform $y_b$ as a Gaussian distribution curve, the Gaussian distribution (normal distribution) is determined through, for instance, the method of least squares in correspondence to all the waveform data of the processed waveform $y_b$. In FIG. 8, the Gaussian distribution curve $y_c$ thus obtained is superimposed over the processed waveform $t_b$. It is to be noted that the entire wave series constituting the processed waveform $y_b$ may be approximated by using a curve other than the Gaussian distribution curve explained above.

The central value (peak position) of the Gaussian distribution curve $y_c$ obtained by approximating the entire wave series of the processed waveform $y_b$ as described above is then designated as the peak position of the interference waveform. If the processed waveform $y_b$ obtained by processing the interference waveform is deformed, an offset manifests between the processed waveform $y_b$ and the Gaussian distribution curve $y_c$, resulting in an offset between the peak positions in the processed waveform $y_b$ and the Gaussian distribution curve $y_c$. This, in turn, is likely to lead to an error in the measurement of the peak position in the interference waveform.

Such an offset that may manifest between the processed waveform $y_b$ obtained by processing the interference waveform and the Gaussian distribution curve $y_c$ is now explained in further detail in reference to the interference waveforms shown in FIG. 6. FIGS. 9 through 12 respectively show processed waveforms $y_{b0}$ to $y_{b3}$ obtained by executing the processing described earlier on the interference waveforms $y_{a0}$ to $y_{a3}$ in FIG. 6. In each of the FIGS. 9 through 12, the distance traveled by the reference mirror is indicated along the horizontal axis and the amplitude of the processed waveform is indicated along the vertical axis. In order to indicate the extents of deformation in the processed waveforms $y_{b0}$ to $y_{b3}$ obtained by processing the corresponding interference waveforms, FIGS. 9 through 12 assume a greater amplitude range along the horizontal axis over a lower interference intensity range in the interference waveforms. Comparison of the processed interference waveforms $y_{b0}$ to $y_{b3}$ with the corresponding Gaussian distribution curves $y_{c0}$ to $y_{c3}$ in FIGS. 9 to 12 indicates that the extent of the processed interference waveform deformation increases in the order of the processed waveform $y_{b0} \rightarrow$ processed waveform $y_{b1} \rightarrow$ processed waveform $y_{b2} \rightarrow$ processed waveform $y_{b3}$, i.e., the processed waveform obtained by processing the interference waveform corresponding to a measurement beam reciprocally reflected at the two end surfaces $S_1$ and $S_2$ of the wafer Tw a greater number of times is deformed to a greater extent and is offset by a greater extent from the corresponding Gaussian distribution curve among the Gaussian distribution curves $y_{c0}$ to $y_{c3}$ obtained through the approximation.

(Judging Extents of Interference Waveform Deformation and Selecting Optimal Interference Waveform Based upon Deformation Extents)

Next, a method through which the extents of offsets of the processed interference waveforms $y_{b0}$ to $y_{b3}$ relative to the corresponding Gaussian distribution curves $y_{c0}$ to $y_{c3}$ in FIGS. 9 through 12 are quantified to indicate the extents of deformation of the processed interference waveforms $y_{b0}$ to $y_{b3}$ and the deformation extents are then judged, is explained. In order to quantify the deformation extents of the processed interference waveforms $y_{b0}$ to $y_{b3}$, each interference waveform is curvilinearly approximated as, for instance, an envelope based upon the individual waveform reiterations constituting the wave series of the interference waveform indicated in the waveform data of the processed interference waveform and the extent of the offset manifesting between the envelope and the corresponding Gaussian distribution curve is calculated. It is to be noted that the interference waveform may be approximated based upon the individual waveform reiterations constituting the interference waveform series as a curve other than the envelope mentioned above. For instance, the interference waveform may be approximated as a curve obtained by integrating the individual waveform reiterations constituting the interference waveform series and smoothly connecting the integral values thus obtained.

FIGS. 13 through 16 respectively show envelopes $y_{d0}$ to $y_{d3}$ approximating the individual processed interference waveforms $y_{b0}$ to $y_{b3}$ in FIGS. 9 through 12, superimposed over the corresponding Gaussian distribution curves $y_{c0}$ to $y_{c3}$. In FIGS. 13 through 16, the interference waveform envelopes $y_{d0}$ to $y_{d3}$ are each indicated by the solid line and the approximate Gaussian distribution curves $y_{c0}$ to $y_{c3}$ are each indicated by the dotted line.

FIGS. 13 to 16 indicate that the extent of deformation in the peak area increases in the order of the envelope $y_{d0} \rightarrow y_{d1} \rightarrow y_{d2} \rightarrow y_{d3}$, resulting in a greater offset between the envelope and the Gaussian distribution curve. This means that the envelope of the interference waveform corresponding to a measurement beam reciprocally reflected at the two end surfaces $S_1$ and $S_2$ of the wafer Tw over a greater number of times is offset from the corresponding Gaussian distribution curve by a greater extent, resulting in a greater offset between the positions of the peaks in the envelope and the Gaussian distribution curve.

The extent of the offset between the processed interference waveform $y_b$ and the corresponding Gaussian distribution curve $y_c$ may be quantified by using the following index. Namely, with V(m) representing the waveform data for the interference waveform envelope $y_d$ sampled at a given position m within the reference mirror movement range, G(m) representing the intensity indicated by the Gaussian distribution curve $y_c$ at the same position m and Gp representing the intensity at the peak position (peak intensity) in the Gaussian distribution curve $y_c$, the absolute value of G(m)–V(m) is calculated and the value obtained by dividing the absolute value by the peak intensity Gp indicated in the Gaussian distribution curve $y_c$ is designated as k(m).

k(m) is calculated in correspondence to all the processed waveform data $y_b$ sampled over the entire range of the reference mirror movement over which the approximate Gaussian distribution curve $y_c$ is available and the average $K_{AVE}$ of these values k(m) is designated as an index K indicating the interference waveform deformation extent.

When the interference waveform deformation extent index K indicates a greater value, the interference waveform envelope $y_d$ and the Gaussian distribution curve $y_c$ are offset from each other to a greater extent and the interference waveform deformation manifests to a greater extent. Accordingly, by calculating the interference waveform deformation extent index K in correspondence to each of the interference waveforms shown in FIGS. 13 through 16, the extents of deformation of the individual interference waveforms can be quantitatively judged.

Figure 17:
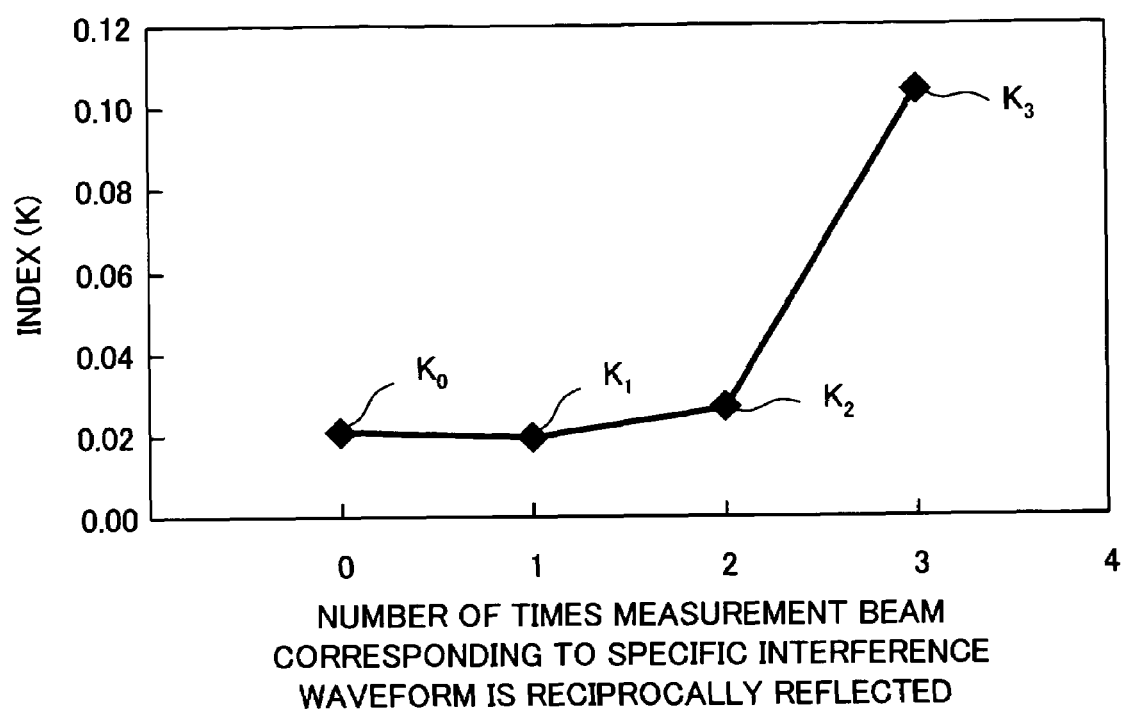
FIG. 17 shows different values of the deformation extent index K determined in correspondence to the envelopes $y_{d0}$ to $y_{d3}$ of the individual interference waveforms $y_{a0}$ to $y_{a3}$ in FIGS. 13 through 16.

FIG. 17 shows the deformation extent indices K calculated in correspondence to the envelopes $y_{d0}$ to $y_{d3}$ of the individual interference waveforms $y_{a0}$ to $y_{a3}$ in FIGS. 13 to 16. In FIG. 17, the number of times the individual measurement beams corresponding to the interference waveforms $y_{a1}$ to $y_{a3}$ used in the temperature measurement were reciprocally reflected are indicated along the horizontal axis and the indices K indicating the interference waveform deformation extents are indicated along the vertical axis. $K_0$ to $K_3$ in FIG. 17 respectively indicate the deformation extent indices for the interference waveform $y_{a0}$ corresponding to the first surface/single reflection measurement beam, the interference waveform $y_{a1}$ corresponding to the second surface/single reflection measurement beam, the interference waveform $y_{a2}$ corresponding to the second surface/double reflection measurement beam and the interference waveform $y_{a3}$ corresponding to the second surface/triple reflection measurement beam.

In FIG. 17, the interference waveform deformation extent indices $K_0$ to $K_2$ indicate low values close to one another and the interference waveform deformation extent index $K_3$ indicates a markedly larger value. Namely, the interference waveform $y_{a0}$ corresponding to the first surface/single reflection measurement beam, the interference waveform $y_{a1}$ corresponding to the second surface/single reflection measurement beam, and the interference waveform $y_{a2}$ corresponding to the second surface/double reflection measurement beam each manifest only a small offset relative to the corresponding Gaussian distribution curve and each show only a minor deformation in the interference waveform, with a fairly insignificant error in the interference waveform peak position measurement. The interference waveform $y_{a3}$ corresponding to the second surface/triple reflection measurement beam, on the other hand, manifests a significant offset relative to the Gaussian distribution curve and a significant deformation in the interference waveform with a considerable error in the interference waveform peak position measurement.

Thus, while the peak interval between the peaks in the reference interference waveform and the selected interference waveform can be lengthened by selecting the interference waveform corresponding to a measurement beam reciprocally reflected at the two end surfaces $S_1$ and $S_2$ of the wafer Tw a greater number of times as the selected interference waveform, such a selected interference waveform manifests a greater extent of waveform deformation to result in a greater measurement error in the selected interference waveform peak position measurement. Accordingly, it is desirable to select the interference waveform to be used as the selected interference waveform when measuring the peak interval between the peaks in the reference interference waveform and the selected interference waveform, based upon the extents of interference waveform deformation.

Based upon the interference waveform deformation extent indices K described earlier, an interference waveform that will set a greater peak interval between the reference interference waveform and the selected interference waveform can be selected with ease within the range over which the extent of the interference waveform deformation is not great enough to adversely affect the temperature measurement accuracy (e.g., within the range over which the extent of the interference waveform deformation is not significant enough to lower the accuracy of the measurement of the peak interval between the peaks in the waveforms). For instance, the interference waveform $y_{a2}$ corresponding to the second surface/double reflection measurement beam reciprocally reflected at the end surfaces the greatest number of times with the corresponding interference waveform deformation extent index K under a predetermined value (e.g., 0.04), i.e., the interference waveform corresponding to the interference waveform deformation extent index $K_2$, among the indices shown in FIG. 17, should be selected as the selected interference waveform. By approximating the selected interference waveform $y_{a2}$ thus selected and the reference interference waveform $y_{a0}$ as Gaussian distribution curves, ascertaining the peak positions in the curves and measuring the peak interval between the peak positions, the peak interval between the peaks in the reference interference waveform and the selected interference waveform can be measured with improved accuracy.

It is to be noted that the various types of processing described above, such as the calculation of the peak positions in the interference waveforms, the measurement of the peak interval between the peaks in the interference waveforms, the calculation of the interference waveform deformation extent indices K and the selection of the interference waveform to be used in the temperature measurement, can be executed by the CPU 410 of the control device 400 based upon a program.

In the temperature measuring system achieved in the second embodiment described above, as the measurement light is radiated from one side of the wafer Tw, a plurality of interference waveforms (light interference) attributable to returning measurement beams having been reflected at the wafer Tw and the reference light are received at the PD 250. One of such interference waveforms, e.g., the interference waveform corresponding to the measurement beam reflected at the first surface $S_1$ of the wafer Tw, is used as the reference interference waveform, the interference waveform corresponding to a measurement beam reciprocally reflected at the two end surfaces $S_1$ and $S_2$ of the wafer Tw at least twice is designated as the selected interference waveform and the peak interval between the peaks in the reference interference waveform and the selected interference waveform is measured. In this case, since there is a significant interval between the peaks in the reference interference waveform and the selected interference waveform, the extent of change occurring in the peak interval as the temperature at the measurement target changes can be detected as a significant value. As a result, the accuracy with which the peak interval between the peaks in the individual interference waveforms is measured is improved.

It is effective to allow a significant interval between the reference interference waveform and the selected interference waveform, particularly when the measurement target has a small thickness and the optical path length of the measurement light indicated by the distance between the two end surfaces of the measurement target is short (e.g., when a semiconductor wafer or the like with a very small thickness is the measurement target), as the accuracy with which the peak interval between the peaks in these interference waveforms is measured is greatly improved. Since this also improves the measurement accuracy with which the optical path length of the measurement light indicated by the distance between the two end surfaces of the measurement target is measured, the temperature/thickness measurement accuracy is ultimately improved.

In addition, by selecting the optimal interference waveform to be used as the selected interference waveform based upon indices K indicating the interference waveform deformation extents, the interval between the peaks the reference interference waveform and the selected interference waveform can be maximized without allowing the deformation of the selected interference waveform to compromise the accuracy of the interference waveform peak interval measurement.

It is to be noted that while an explanation is given above on an example in which the interference waveform corresponding to the measurement beam reflected once at the first surface S1 of the measurement target, e.g., the wafer Tw, is used as the reference interference waveform, the present invention is not limited to this example and any of the plurality of interference waveforms measured at the PD 250 may be used for reference. By using the interference waveform corresponding to a measurement beam reciprocally reflected at the two end surfaces of the wafer Tw a number of times greater than the number of times the measurement beam corresponding to the reference interference waveform is reflected by at least 2 as the selected interference waveform, a peak interval between the peaks between the reference interference waveform and the selected interference waveform can be set at least twice the optical path length of the measurement light indicated by the distance between the two end surfaces at the wafer Tw. Thus, the interference waveform peak interval measurement accuracy can be improved, regardless of which interference waveform is used as the reference interference waveform.

(Temperature Measuring Apparatus Achieved in the Third Embodiment)

In reference to drawings, the temperature measuring system for a substrate processing apparatus achieved in the third embodiment is explained. The temperature measuring system in the third embodiment is an improvement over the temperature measuring system in the second embodiment in that the distance over which the reference mirror is required to move is further reduced.

In the temperature measuring system in the second embodiment explained earlier, the interference waveform corresponding to a measurement beam reciprocally reflected at the two end surfaces of the measurement target T, i.e., a wafer w, at least twice more than the number of times the measurement beam corresponding to the reference interference waveform is reflected is designated as the selected interference waveform and the optical path length L of the wafer Tw is measured based upon the peak interval between the peaks in the selected interference waveform and the reference interference waveform.

However, if the interference waveform corresponding to a measurement beam reciprocally reflected at the two end surfaces of the wafer w at least twice more is selected as the selected interference waveform, the peak interval between the selected interference waveform and the reference interference waveform is lengthened, necessitating the reference mirror 240 to travel over a greater distance. Since the length of time required for the temperature measurement increases in correspondence to the increase in the distance traveled by the reference mirror 240, the distance over which the reference mirror 240 needs to move should be minimized.

The temperature measuring system in the third embodiment is achieved by taking this point into consideration. The improvement over the second embodiment is realized by disposing a detour optical path at a mid point of the measurement light optical path constituting the measurement light transmitting means and connecting it in parallel to the measurement light optical path. In this structure, the measurement beam having passed through the detour optical path and the measurement beam which has not traveled through the detour optical path are both radiated toward the measurement target increasing the interference patterns of the light interference between the measurement light and the reference light. As a result, different interference waveforms, e.g., interference waveforms corresponding to a measurement beam that does not travel via the detour optical path and an interference waveform corresponding to a measurement beam that travels via the detour optical path at least once, can be measured even if both measurement beams are reciprocally reflected at the two end surfaces of the measurement target T equal numbers of times.

Accordingly, by adjusting the extent to which the individual light interference waveforms are offset from each other through an adjustment of the optical path length of the detour optical path, the reference interference waveform, selected from the interference waveforms corresponding to measurement beams traveling through either of the optical paths among the interference waveforms measured as described above, and the selected interference waveform, selected from the interference waveforms corresponding to measurement beams traveling through the other optical path, can be made to manifest in close proximity to each other to facilitate the measurement. In such a case, the reference mirror 240 only needs to travel within a range large enough to allow at least the reference interference waveform and the selected interference waveform to be measured. Since the distance traveled by the reference mirror 240 can be thus reduced, the length of time required for the measurement of the temperature at the wafer Tw, too can be reduced.

Figure 18:
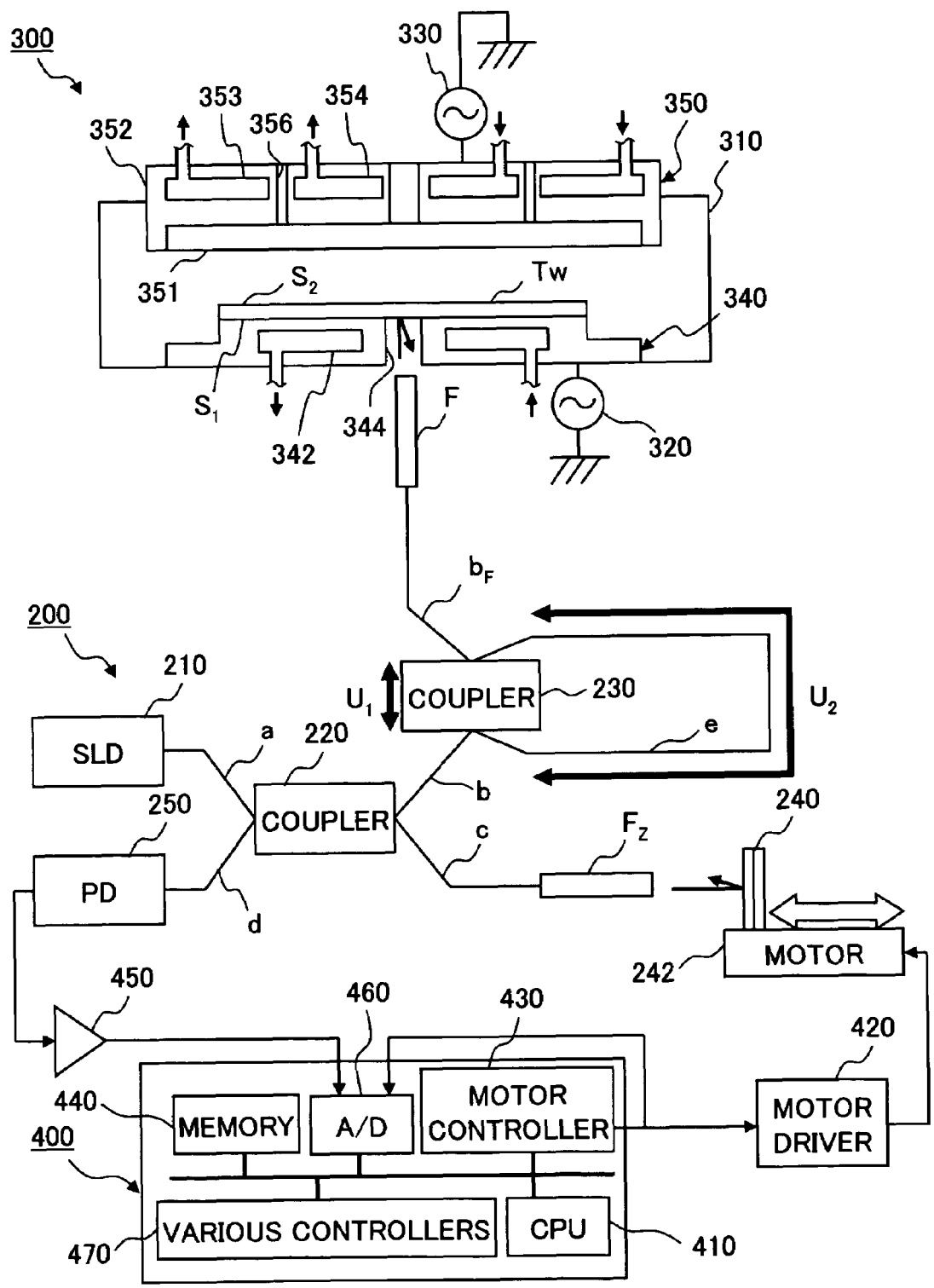
FIG. 18 is a schematic block diagram of the structure adopted in a specific example of the temperature measuring system for a substrate processing apparatus, achieved in a third embodiment of the present invention.

The following is an explanation of a specific structural example that may be adopted in the temperature measuring system in the third embodiment, given in reference to FIG. 18. The measurement light transmitting means in the temperature measuring system shown in FIG. 18 includes a detour optical path connection splitter such as a 2×2 optical fiber coupler 230 to be used to connect in parallel an optical fiber e, which is to constitute the detour optical path at a mid point of the measurement light optical path extending from the optical fiber coupler 220. It is to be noted that the optical fiber coupler 230 has a structure similar to that of the optical fiber coupler 220.

One of the output terminals (output ports) from the optical fiber coupler 220 is connected via an optical fiber b to one of the input terminals (input ports) at the optical fiber coupler 230. One of the output terminals (output ports) at the optical fiber coupler 230 is connected with an optical fiber F equipped with a collimator mounted at the front tip of an optical fiber $b_F$. In addition, the other input terminal (input port) and the other output terminal (output port) at the optical fiber coupler 230, connected with the optical fiber e constituting the detour optical path, forms a loop.

At the measurement light transmitting means structured as shown in FIG. 18, the measurement light exiting one of the output terminals (output ports) from the optical fiber coupler 220 is split into two beams which are then directed to two separate output terminals (output ports) at the optical fiber coupler 230. The measurement beam having been directed to one of the output terminals (output ports) is radiated through the optical fiber $b_F$ toward the wafer Tw from the front tip of the optical fiber F equipped with a collimator.

The measurement beam directed to the other output terminal (output port) at the optical fiber coupler 230 is reverted via the optical fiber e to the other input terminal (input port) at the optical fiber coupler 230 and is further split into two beams which are directed to the two separate output terminals (output ports) at the optical fiber coupler 230. The measurement beam directed to one of the output terminals (output ports) is radiated through the optical fiber $b_F$ toward the wafer Tw from the front tip of the optical fiber F equipped with a collimator.

With the detour optical path disposed at a mid point of the optical path of the measurement light constituting the measurement light transmitting means by connecting the detour optical path in parallel to the measurement light optical path, the measurement light obtained by splitting the light from the SLD 210 travels through the path extending via an optical path $U_1$ within the optical fiber coupler 230 or the path extending via the detour optical path $U_2$ at the optical fiber e, both as outbound measurement light radiated from the optical fiber F equipped with a collimator toward the wafer Tw and as inbound measurement light received as reflected measurement beams from the wafer Tw via the optical fiber F equipped with a collimator. In other words, the measurement light travels through more diverse optical path patterns. Consequently, the types (patterns) of interference to manifest as a plurality of interference waveforms attributable to the measurement light and the reference light are diversified.

An explanation is now given on the optical paths of such measurement light, given in reference to a drawing. FIG. 19 shows the relationship between the measurement light optical path type (pattern) and the corresponding path through which the measurement light travels. The measurement light paths include outbound paths through which the measurement light is output from the optical fiber coupler 220 and is directed toward the wafer Tw and inbound paths through which the measurement beams reflected from the wafer Tw are input to the optical fiber coupler 220.

Four measurement light optical path types (patterns), optical paths A through D, as shown in FIG. 19, are formed in conjunction with the detour optical path shown in FIG. 18 through varying combinations of an outbound path and an inbound path. Both the outbound measurement light and the inbound measurement light travel via the optical path $U_1$ in the optical path pattern A with the smallest optical path length. The outbound measurement light travels via the optical path $U_1$ and the measurement light then returns via the detour optical path $U_2$ in the optical path pattern B. The outbound measurement light travels via the detour optical path $U_2$ and it then returns via the optical path $U_1$ in the optical path pattern C, and in this case, the total optical path length is equal to that of the optical path pattern B. The outbound measurement light travels via the detour optical path $U_2$ and then the measurement light returns via the detour optical path $U_2$ in the optical path pattern D, having the greatest optical path length.

Figure 20:
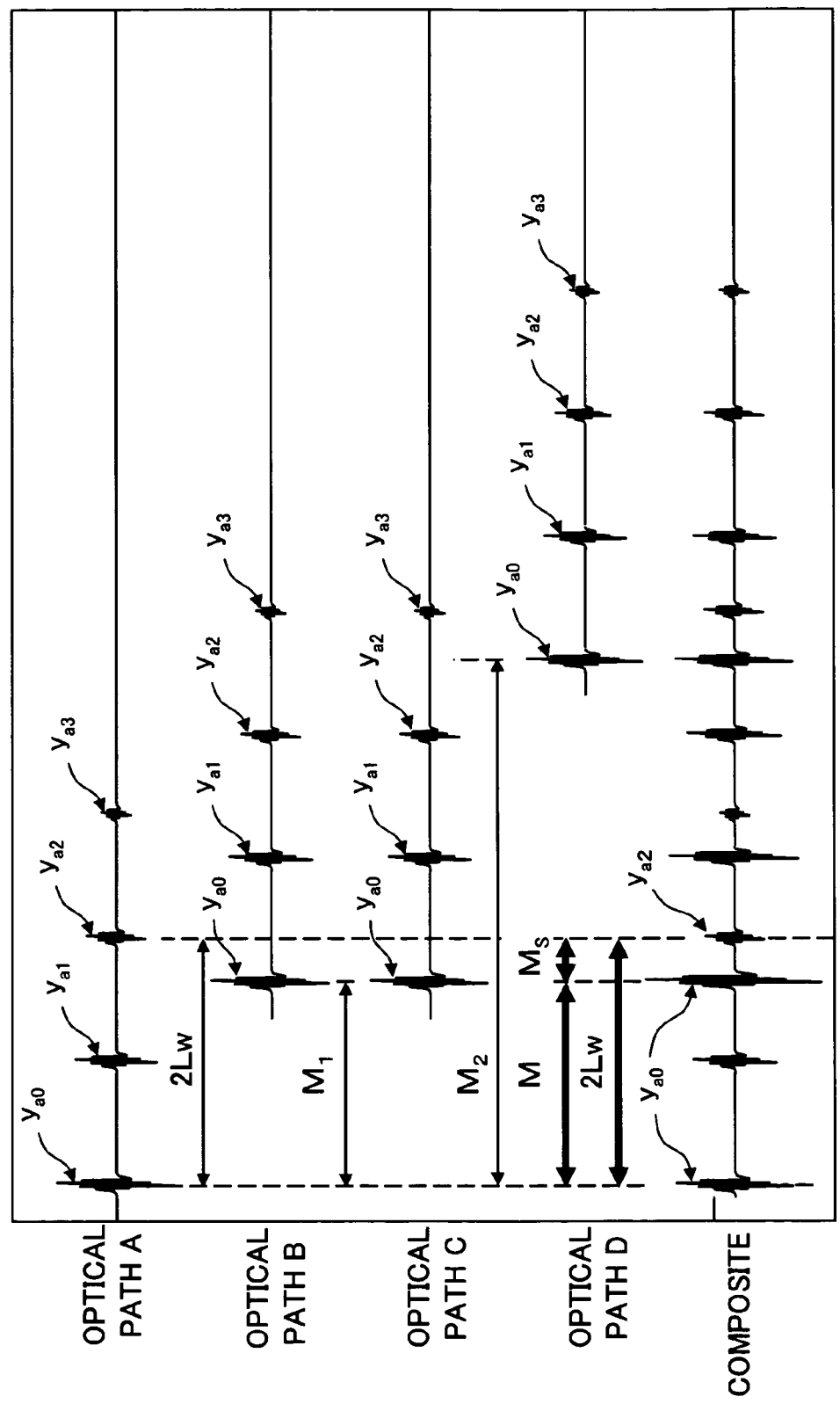
FIG. 20 presents a specific example of interference waves induced by measurement light and reference light in the temperature measuring apparatus achieved in the embodiment.

FIG. 20 shows the interference waveforms of the interference manifested by the measurement beams having traveled through the optical path patterns A through D and the reference light. FIG. 20 shows the interference waveforms obtained by scanning the reference mirror along a single direction just once. The distance over which the reference mirror is made to travel is indicated along the horizontal axis, whereas the interference intensity is indicated along the vertical axis. It is to be noted that while FIG. 20 shows the interference waveforms corresponding to the individual optical paths A~D without overlapping them so as to ensure that the individual instances of interference can easily be distinguished, composite waveforms in which the light interference waveforms corresponding to the optical path patterns A through D are all included are actually measured.

As shown in FIG. 20, the light interference corresponding to measurement beams traveling through each of the optical path patterns A through D all manifests as interference waveforms similar to those shown in FIG. 6, i.e., the interference waveform $y_{a0}$ attributable to the first surface/single reflection measurement beam, the interference waveform $y_{a1}$ attributable to the second surface/single reflection measurement beam, the interference waveform $y_{a2}$ attributable to the second surface/double reflection measurement beam and the interference waveform $y_{a3}$ attributable to the second surface/triple reflection measurement beam over equal intervals. For this reason, the actual light interference occurs as a composite of the individual instances of light interference corresponding to the optical paths A through D, which means that a plurality of reference interference waveforms (e.g., $y_{a0}$) and a plurality of selected interference waveforms (e.g., $y_{a2}$) that can be used to determine the optical path length L at the wafer Tw are included in the composite waveforms, i.e., the combination of the interference waveforms corresponding to the various measurement beams.

In addition, since the optical path lengths of the optical path patterns A through D are different from one another, the offsets attributable to the varying optical path lengths of the optical path patterns A through D manifest in the interference waveforms corresponding to the measurement beams traveling through the optical paths A through D. For instance, after the peak of the interference waveform $y_{a0}$ of the interference corresponding to the light having traveled through the optical path pattern A appears, the peaks of the interference waveform $y_{a0}$ corresponding to the beams having traveled through the optical path pattern B and the optical path pattern C appear with an offset corresponding to the distance $M_1$ traveled by the reference mirror 240. The peak of the interference waveform $y_{a0}$ corresponding to the light having traveled in the optical path pattern D appears with an offset corresponding to the distance $M_2$ traveled by the reference mirror 240 after the peak of the interference waveform $y_{a0}$ manifested by the light having traveled through the optical path pattern A is detected. The interference waveform $y_{a0}$ attributable to the light having traveled in the optical path pattern A appears the earliest since the optical path pattern A has the smallest optical path length, whereas the first interference waves corresponding to the optical path patterns B, C and D with greater optical path lengths than that of the optical path pattern A appear with offsets corresponding to the differences in the optical path length. It is to be noted that the interference waveforms $y_{a0}$ attributable to the beams having traveled through the optical path patterns B and C with optical path lengths equal to each other appear simultaneously.

The extents by which the offsets of the interference of the light having traveled through the optical path patterns A through D can be adjusted by adjusting the optical path lengths of the optical path patterns A through D through an adjustment of the optical path length (e.g., the length of the optical fiber e) at the measurement light detour optical path. Thus, by adjusting the optical path length (e.g., the length of the optical fiber e) of the measurement light detour optical path in a specific manner, the reference interference waveform attributable to the light interference corresponding to a measurement beam traveling through a given optical path and the selected interference waveform attributable to the light interference corresponding to a measurement beam traveling through another optical path can be measured in close proximity to each other. For instance, the reference interference waveform $y_{a0}$ attributable to the light interference corresponding to the measurement beam traveling through the optical path B can be made to manifest near the selected interference waveform $y_{a2}$ attributable to the light interference corresponding to the measurement beam traveling through the optical path A, as indicated in the composite waveform diagram of the light interference corresponding to the different measurement beams shown in FIG. 20.

The sum obtained by adding the value indicating the extent of offset (e.g., M) by which the reference interference waveforms attributable to the light interference corresponding to the individual optical paths are offset from one another to the peak interval (e.g., $M_S$) between the peaks in the reference interference waveform and the selected interference waveform corresponding to the different optical paths is equivalent to the peak interval (e.g., 2Lw) between the peaks in the reference interference waveform and the selected interference waveform attributable to the light interference corresponding to a single optical path.

Furthermore, if the position of the reference interference waveform remains unchanged through a change in the temperature at the wafer Tw, the extent M by which the reference interference waveforms attributable to the light interference corresponding to the individual light paths are offset from one another matches the extent of offset (e.g., $M_1$) by which the individual instances of light interference are offset from one another. This offset extent M remains unchanged even after the temperature at the wafer Tw changes. Since the position of the selected interference waveform changes as the temperature at the wafer Tw changes, the peak interval (e.g. $M_S$) between peaks in the reference interference waveform and the selected interference waveform attributable to different instances of light interference changes as the temperature of the wafer Tw changes.

Accordingly, in the temperature measuring system achieved in the embodiment, the peak interval (e.g., 2Lw) between the peaks in the reference interference waveform and the selected interference waveform attributable to the light interference corresponding to a given optical path can be calculated simply by measuring in advance the offset extent M by which the reference interference waves attributable to the light interference corresponding to the various optical paths are offset from one another and measuring the peak interval $M_S$ between the peaks in the reference interference waveform and the selected interference waveform manifesting in the closest proximity to each other in the interference waveform composite shown in FIG. 20. Then, based upon this peak interval, the optical path length L at the wafer Tw is determined and the optical path length L thus determined can then be converted to a value indicating the temperature of the wafer Tw.

Thus, the reference mirror 240 only needs to travel over a range large enough to allow the measurement of the peak interval ($M_S$) between the reference interference waveform and the selected interference waveform manifesting in the closest proximity to each other in the light interference waveform composite in order to measure the temperature at the wafer Tw. Since the reference mirror does not need travel a distance as large as the distance that it would need to travel to measure the peak interval between the peaks in the reference interference waveform and the selected interference waveform attributable to the light interference corresponding to a single optical path, the length of time required for the measurement of the temperature at the wafer Tw is reduced.

It is to be noted that the extent of offset M of the reference interference waveforms attributable to the light interference corresponding to the various optical paths should be measured in advance prior to the wafer temperature measurement. The measurement results should be stored in, for instance, the memory 440 of the control device 400 and should be retrieved and used when actually measuring the temperature of the wafer Tw.

In addition, it is desirable to designate the interference waveforms corresponding to the individual optical paths that manifest the least change in the offset extent M by which they are offset from one another as the reference interference waveforms used in the embodiment. By selecting such interference waveforms as the reference interference waveforms, it is ensured that the offset extent M by which the reference interference waveforms corresponding to the individual optical paths are offset from one another does not need to be measured frequently. For instance, the first surface $S_1$ which is the rear surface of the wafer Tw is set on the lower electrode 340 and thus, the position of the rear surface of the wafer Tw hardly changes even when the temperature of the wafer Tw changes. The second surface $S_2$, i.e., the front surface of the wafer Tw, on the other hand, which faces the inner space of the chamber, changes its position freely as the temperature of the wafer Tw changes. For this reason, it is desirable to designate the interference waveforms corresponding to measurement beams reflected at the rear surface of the wafer Tw, such as the interference waveforms $y_{a0}$, as the reference interference waveforms.

However, a change in the environment such as a change in the ambient temperature in the atmosphere surrounding the wafer Tw may cause a change in the positions of the interference waveforms $y_{a0}$ corresponding to the measurement beams reflected from the rear surface of the wafer Tw designated as the reference interference waveforms. In such a case, the extent of offset by which the reference interference waveforms attributable to the light interference corresponding to the various optical paths are offset from one another may be measured each time there is a change in the environment of the wafer Tw. Even then, the reference interference waveform offset extent M will not need to be measured nearly as often as the interference waveform peak interval $M_S$ would need to be measured, and thus, the length of time required to measure the temperature of the wafer Tw can be reduced.

The interference waveform in the light interference waveform composite and used as the reference interference waveform in the embodiment should be in the interference waveform in the closest proximity to the selected interference waveform, regardless of whether it manifests before or after the selected interference waveform while the reference mirror is made to travel within its range of movement.

For instance, the peak interval 2Lw between the peaks in the selected interference waveform $y_{a2}$ and the reference interference waveform $y_{a0}$ manifesting on the rear side of the selected interference waveform $y_{a2}$ along the range of the reference mirror movement, as shown in FIG. 20 can be determined by adding the extent of offset M by which the reference interference waveforms $y_{a0}$ attributable to the light interference corresponding to the various optical paths are offset from one another to the peak interval $M_S$ between the selected interference waveform $y_{a2}$ and the closest reference interference waveform $y_{a0}$ taking on a positive value.

In contrast, although not shown, the peak interval 2Lw between the peaks in the selected interference waveform $y_{a2}$ and the reference interference waveform $y_{a0}$ manifesting on the front side of the selected interference waveform $y_{a2}$ along the range of the reference mirror movement can be determined by adding the extent of offset M by which the reference interference waveforms $y_{a0}$ attributable to the light interference corresponding to the various optical paths are offset from one another to the peak interval $M_S$ between the selected interference waveform $y_{a2}$ and the closest reference interference waveform $y_{a0}$ taking on a negative value.

(Variation of Temperature Measuring System Achieved in the Third Embodiment)

Figure 21:
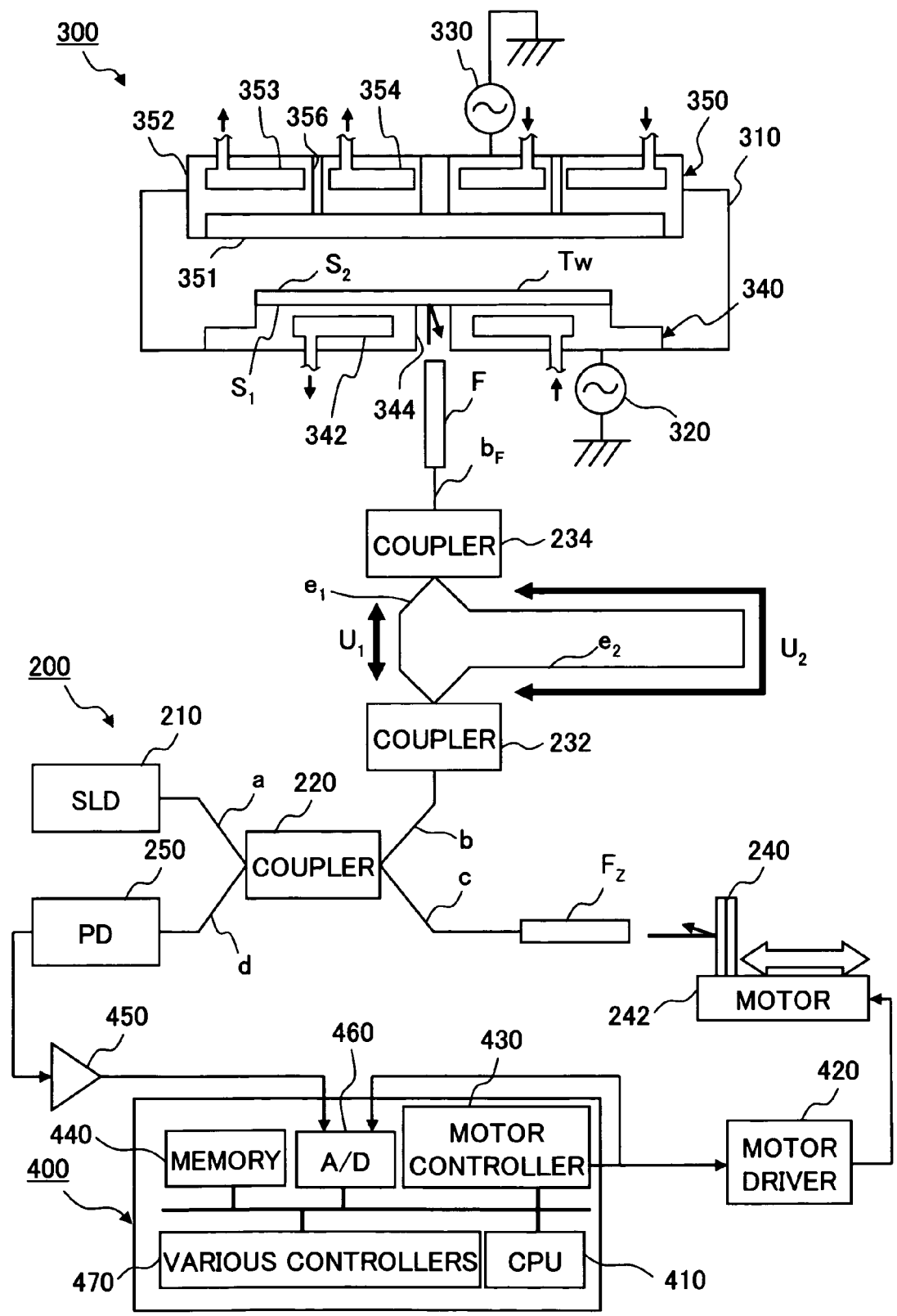
FIG. 21 is a schematic block diagram of the structure adopted in a variation of the temperature measuring system for a substrate processing apparatus achieved in the embodiment.

Next, a variation of the temperature measuring system achieved in the third embodiment is explained in reference to a drawing. FIG. 21 is a schematic block diagram of the structure adopted in a variation of the temperature measuring system in the third embodiment. The temperature measuring system shown in FIG. 21, which is substantially similar to that in FIG. 18, is characterized in that a loop is formed by connecting in parallel an optical fiber $e_1$ constituting the measurement light optical path and an optical fiber $e_2$ constituting a detour optical path with two detour optical path connection splitters (e.g., a 1×2 optical fiber coupler 232 and a 2×1 optical fiber coupler 234) as shown in FIG. 21, instead of forming a loop by connecting in parallel the optical fiber e constituting the detour optical path to the measurement light optical path with a single optical fiber coupler 230 as shown in FIG. 18. Thus, the temperature measuring system in FIG. 21 adopting the alternative structure, too, includes a detour optical path connected in parallel to the middle of the measurement light optical path constituting the measurement light transmitting means, as in the case of the temperature measuring system shown in FIG. 18.

To explain the temperature measuring system in more specific terms, one of the output terminals (output ports) from the optical fiber coupler 220 is connected via an optical fiber b with an input terminal (input port) of the 1×2 optical fiber coupler 232 in FIG. 21. One end of the shorter optical fiber $e_1$ forming a path $U_1$ and one end of the optical fiber $e_2$ longer than the optical fiber $e_1$ and forming a path $U_2$ in the detour optical path are each connected to one of the two output terminals (output ports) of the 1×2 optical fiber coupler 232. The other ends of the optical fiber $e_1$ and the optical fiber $e_2$ are each connected to one of the two input terminals (input ports) of the 2×1 optical fiber coupler 234. The optical fiber F equipped with a collimator mounted at the front tip of an optical fiber $b_F$ is connected to an output terminal (output port) of the 2×1 optical fiber coupler 234.

Through the measurement light transmitting means adopting the structure shown in FIG. 21, the measurement light having exited one of the output terminals (output ports) of the optical fiber coupler 220 is split into two beams at the optical fiber coupler 232 to be directed to the two output terminals (output ports) thereof. The measurement beam directed to one of the output terminals (output ports) then travels through the shorter optical fiber $e_1$ and enters the input terminal (input port) of the optical fiber coupler 234. The measurement beam directed to the other output terminal (output port) at the optical fiber coupler 232 then travels through the optical fiber $e_2$ constituting the detour optical path and enters the input terminal (input port) of the optical fiber coupler 234. At the optical fiber coupler 234, the measurement beams from the optical fiber $e_1$ and the optical fiber $e_2$ are combined and the combined measurement light is radiated from the front tip of the optical fiber F equipped with a collimator toward the wafer Tw.

It is to be noted that the relationships between the various patterns of measurement light optical paths (optical paths A through D) achieved with the measurement light transmitting means structured as shown in FIG. 21 and the corresponding measurement light paths are similar to those shown in FIG. 19 and that the interference of the measurement beams having traveled in the optical path patterns A through D and the reference light occurs in a manner similar to that shown in FIG. 20. Namely, the extent of the offsets manifesting with regard to the interference waves attributable to the measurement beams having traveled through the individual optical path patterns A through D and the reference light can be adjusted in the temperature measuring system structured as shown in FIG. 21 as well by adjusting the optical path length of the optical path patterns A through D through an adjustment of the optical path lengths of the measurement light detour optical path (e.g., the lengths of the optical fibers $e_1$ and $e_2$).

Thus, by adjusting the optical path length of the measurement beam detour optical paths (e.g., the length of the optical fibers $e_1$ and $e_2$), the selected interference waveform (e.g., $y_{a2}$) and the reference interference waveform (e.g., $y_{a0}$) attributable to the light interference corresponding to different optical paths can be made to manifest in close proximity to each other in the light interference waveform composite. As a result, in the variation of the embodiment, too, the temperature of the wafer Tw can be measured simply by moving the reference mirror 240 over a minimum range large enough to enable the measurement of the peak interval (e.g., $M_S$) between the peaks in the reference interference waveform (e.g., $y_{a0}$) and the selected interference waveform (e.g., $y_{a2}$) manifesting in the closest proximity to each other in the light interference waveform composite. Since this minimizes the distance over which the reference mirror needs to travel, the length of time required to measure the temperature of the wafer Tw, too, can be reduced.

With the optical fiber e used to constitute the detour optical path in FIG. 18 explained earlier, a loop is formed by connecting the other input terminal (input port) with the other output terminal (output port) within a single optical fiber coupler 230 and thus, it is necessary to bend the optical fiber e. This means that certain restrictions may apply with regard to the length or the thickness of the optical fiber. For instance, a short or thick optical fiber, which cannot be bent with ease, is not suitable. In contrast, the optical fiber $e_2$ constituting the detour optical path shown in FIG. 21, which is connected between the two optical fiber couplers 232 and 234, does not need to be bent to a significant degree. For this reason, more flexibility is afforded with regard to the length and the thickness of the optical fiber.

In addition, while the measurement light optical path length is adjusted by adjusting the length of the optical fiber e constituting the detour optical path in FIG. 18, the length of the measurement light optical path itself can be adjusted in correspondence to the length of the optical fiber $e_1$ as well as the length of the optical fiber $e_2$ constituting the detour optical path and thus, the optical path lengths of the measurement beam optical path patterns A through D can be fine-adjusted with ease in the structure shown in FIG. 21.

(Temperature Measuring System Achieved in the Fourth Embodiment)

Next, the temperature measuring system for a substrate processing apparatus achieved in the fourth embodiment is explained in reference to drawings. The temperature measuring system in the fourth embodiment, achieved by modifying the temperature measuring system in the second embodiment, allows the traveling distance of the reference mirror to be further reduced. While the optical path length of the measurement light is adjusted in the third embodiment described earlier, the optical path length of the reference light is adjusted in the fourth embodiment.

Figure 22:
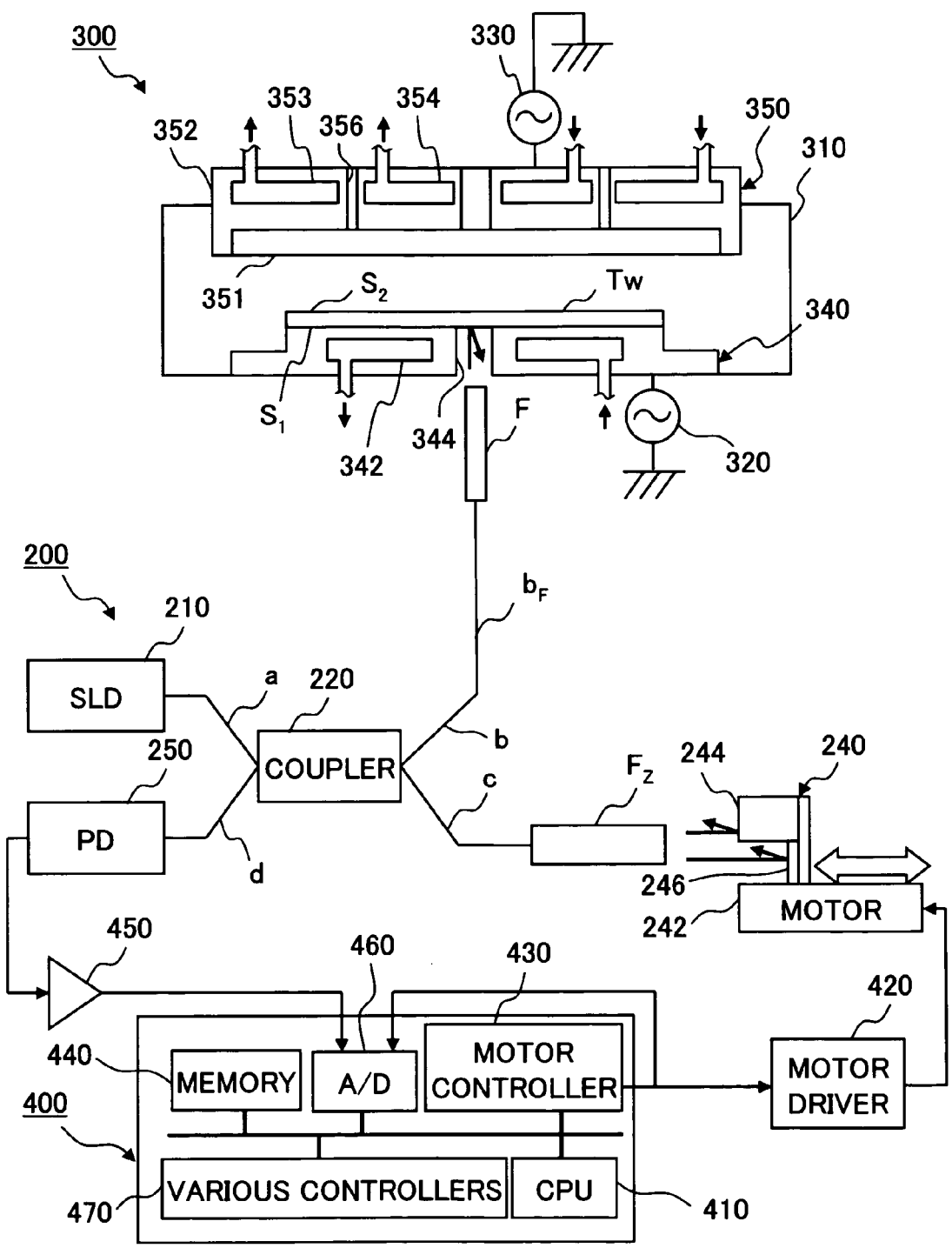
FIG. 22 is a schematic block diagram of the structure adopted in a specific example of the temperature measuring system for a substrate processing apparatus achieved in a fourth embodiment of the present invention.

An example of a structure that may be adopted in the temperature measuring system in the fourth embodiment is presented in FIG. 22. The temperature measuring system in FIG. 22 includes a reference mirror 240 constituted with a first reference mirror 244 and a second reference mirror 246 having reflecting surfaces set at different positions. An optical fiber $F_Z$ equipped with a collimator is disposed at a reference light radiation position at which the reference light from the reference light transmitting means such as the optical fiber $F_Z$ equipped with a collimator is radiated toward both the first reference mirror 244 and the second reference mirror 246, and reference beams reflected from the individual reference mirrors 244 and 246 are received at the same optical fiber $F_Z$ equipped with a collimator.

In the temperature measuring system structured as described above, as the first and second reference mirrors 244 and 246 are driven together by the stepping motor 242, the reference light having been obtained by splitting the light originating from the SLD 210 and radiated from the optical fiber $F_Z$ equipped with a collimator is reflected at the reference mirror 240 as separate reference beams, i.e., the first reference beam reflected at the first reference mirror 244 to travel through an optical path E and the second reference beam reflected at the second reference mirror 246 to travel through an optical path F. Thus, interference waves attributable to the measurement light and two different reference beams can be measured.

Figure 23:
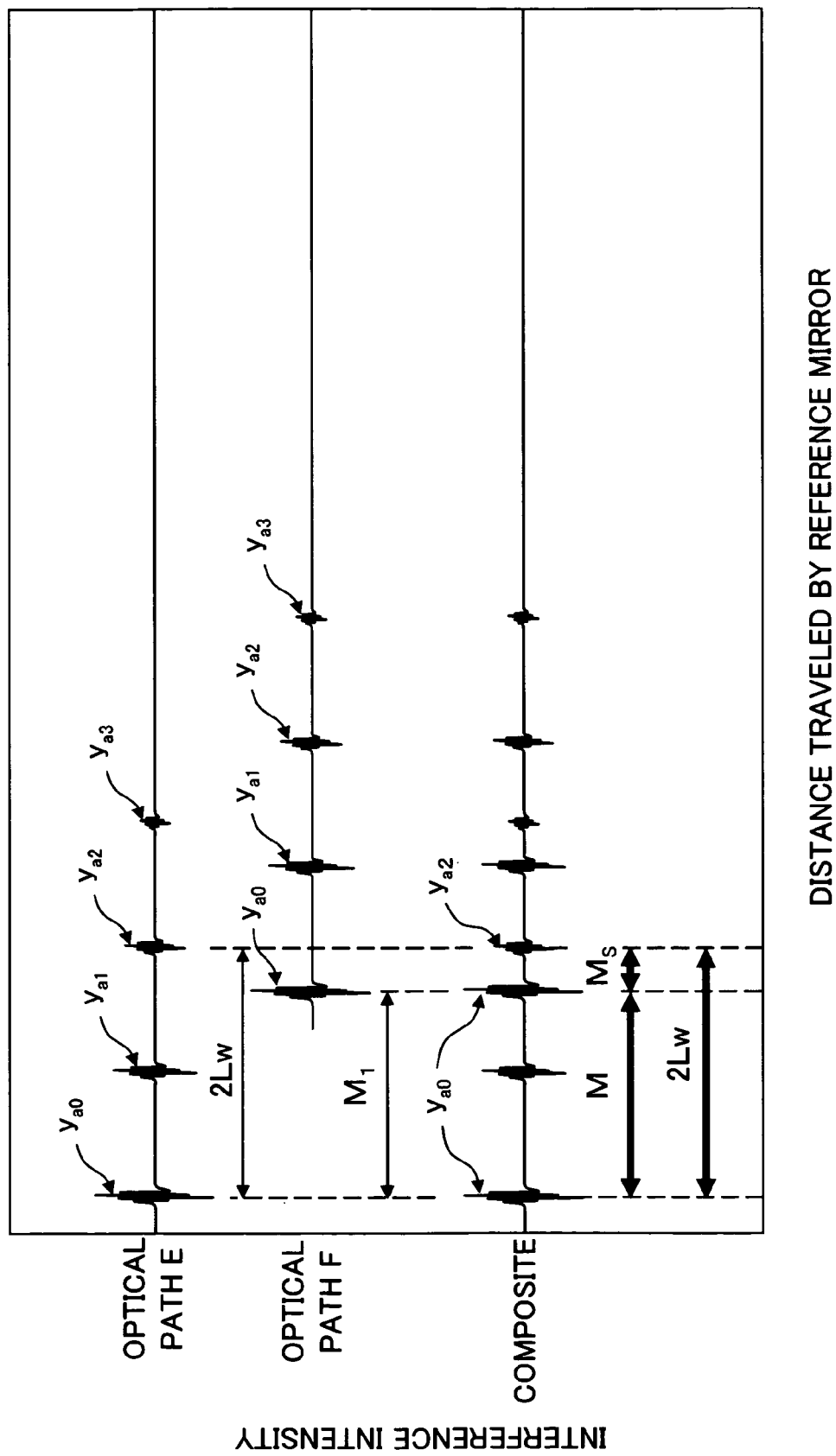
FIG. 23 presents a specific example of interference waves induced by measurement light and reference light in the temperature measuring apparatus, achieved in the embodiment.

FIG. 23 shows the interference waveforms of the light interference attributable to the measurement light and the reference beams having traveled through the optical paths E and F. FIG. 23 shows the interference waveforms obtained by scanning the reference mirror 240 provided as an integrated unit of the first and second reference mirrors 244 and 246 along a single direction just once. The distance over which the reference mirror 240 is made to travel is indicated along the horizontal axis whereas the interference intensity is indicated along the vertical axis. It is to be noted that while FIG. 23 shows the interference waveforms corresponding to the individual optical paths E and F without overlapping them so as to ensure that the individual instances of interference can easily be distinguished, composite waveforms in which the light interference waveforms corresponding to the optical paths E and F measured by the PD 250, as indicated at the bottom of the FIG., are all included are actually measured.

As shown in FIG. 23, the light interference corresponding to each optical path, i.e., the optical path E or F, manifests an interference waveform $y_{a0}$ attributable to the first surface/single reflection measurement beam, an interference waveform $y_{a1}$ attributable to the second surface/single reflection measurement beam, an interference waveform $y_{a2}$ attributable to the second surface/double reflection measurement beam and an interference waveform $y_{a3}$ attributable to the second surface/triple reflection measurement beam, which are similar to those shown in FIG. 6 and are detected over equal intervals. Since the light interference that is actually detected is a composite of the light interference corresponding to the optical path E and the light interference corresponding to the optical path F, the composite light interference waveforms include a plurality of reference interference waveforms (e.g., $y_{a0}$) and a plurality of selected interference waveforms (e.g., $y_{a2}$) to be used to determine the optical path length L at the wafer Tw.

The extent of the offset of the interference waves corresponding to the different optical path patterns E and F can be adjusted by adjusting the optical path lengths of the optical paths E and F corresponding to the first and second reference beams through an adjustment of the extent to which the reflecting surfaces of the reference mirrors 244 and 246 are offset from each other. Accordingly, by adjusting the optical path lengths of the first and second reference beams at the optical paths E and F, a reference interference waveform corresponding to the reference beam reflected at one of the reflecting surfaces and the measurement light and a selected interference waveform corresponding to the reference beam reflected from the other reflecting surface and the measurement light can be made to appear in close proximity to each other to facilitate measurement. Thus, the reference mirror 240 only needs to travel within a range large enough to enable the measurement of at least these interference waveforms and the length of time required for temperature measurement of the wafer Tw is reduced.

For instance, the reference interference waveform $y_{a0}$ attributable to the light interference of the light traveling through the optical path F can be made to appear in the light interference waveform composite in FIG. 23 in close proximity to the selected interference waveform $y_{a2}$ attributable to the light interference of the light traveling through the optical path E. By measuring the peak interval (e.g., $M_S$) between the peaks in these interference waveforms and simply adding the offset extent M of the offset manifesting between the individual reference interference waveforms attributable to the individual instances of light interference to the peak interval $M_S$, the peak interval 2Lw between the peaks in the reference interference waveform $y_{a0}$ and the selected interference waveform $y_{a2}$ attributable to the light interference corresponding to a single optical path can be determined. Then, the optical path length L at the wafer Tw can be calculated based upon the peak interval 2Lw and the optical path length L thus determined can then be converted to a value indicating the temperature. The temperature of the wafer Tw is measured as a result.

(Variation of Temperature Measuring System Achieved in the Fourth Embodiment)

Figure 24:
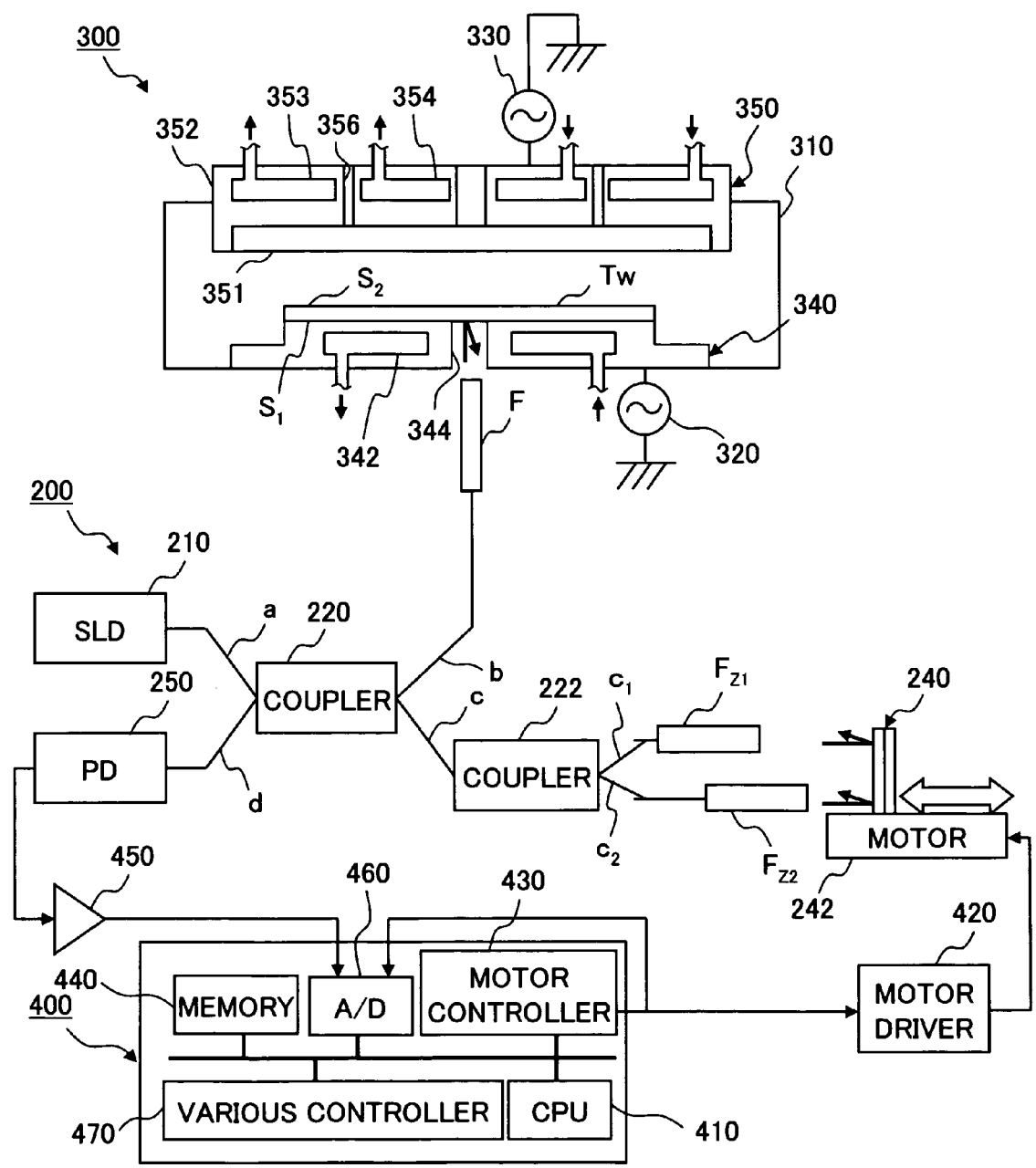
FIG. 24 is a schematic block diagram of the structure adopted in a variation of the temperature measuring system for a substrate processing apparatus achieved in the embodiment.

Next, a variation of the temperature measuring system achieved in the fourth embodiment is explained in reference to a drawing. FIG. 24 is a schematic block diagram of the structure adopted in a variation of the temperature measuring system in the fourth embodiment. The temperature measuring system shown in FIG. 24, which is substantially similar to that in FIG. 21, is characterized in that after the light originating from the SLD 210 is first split into measurement light and reference light at the light source-side splitter such as a 2×2 optical fiber coupler 220, the reference light is further split into a first reference beam and a second reference beam at a reference light splitter which may be constituted with a 1×2 optical fiber coupler 222 and that the optical path lengths of the first and second reference beams are adjusted by adopting a structure in which the first and second reference beams are radiated onto the reference mirror 240 and the reflected reference beams from the reference mirror 240 are detected, instead of adjusting the optical path lengths of the first and second reference beams by offsetting the reflecting surfaces of the reference mirrors, as shown in FIG. 21.

To explain the temperature measuring system in more specific terms, the other output terminal (output port) from the optical fiber coupler 220 is connected via an optical fiber c with an input terminal (input port) of the 1×2 optical fiber coupler 222 in FIG. 24. An optical fiber $F_{Z1}$ equipped with a collimator mounted at the front tip of an optical fiber $c_{Z1}$ and an optical fiber $F_{Z2}$ equipped with a collimator mounted at the front tip of an optical fiber $c_{Z2}$ are each connected to one of the two output terminals (output ports) at the 1×2 optical fiber coupler 222.

Through the reference light transmitting means adopting the structure shown in FIG. 24, the reference light having exited the other output terminal (output port) of the optical fiber coupler 220 is split into two beams at the optical fiber coupler 222 to be directed to the two output terminals (output ports) thereof. The first reference beam directed to one of the output terminals (output ports) is radiated toward the reference mirror 240 through the optical path G which extends via the optical fiber $F_{Z1}$ equipped with a collimator, whereas the second reference beam directed to the other output terminal (output port) is radiated toward the reference mirror 240 through the optical path H which extends via the optical fiber $F_{Z2}$ equipped with a collimator.

It is to be noted that interference waves attributable to the reference beams transmitted through the reference light transmitting means structured as shown in FIG. 24 and the measurement light are similar to those shown in FIG. 23. Namely, the extent of the offset M1 of the interference waves corresponding to the different optical paths E and F can be adjusted by adjusting the optical path lengths of the optical paths E and F corresponding to the first and second reference beams through an adjustment of, for instance, the lengths of the optical fibers $c_{Z1}$ and $c_{Z2}$ constituting the optical fibers $F_{Z1}$ and $FZ_2$ each equipped with a collimator in the temperature measuring system structured as shown in FIG. 24, as well.

Accordingly, by adjusting the optical path lengths (e.g., the lengths of optical fibers $c_{Z1}$ and $c_{Z2}$) of the first and second reference beams, a reference interference waveform selected from the interference waveforms attributable to a given reference beam and the measurement light and then a selected interference waveform selected from the interference waveforms attributable to another reference beam and the measurement light can be made to appear in close proximity to each other to facilitate measurement. Thus, the reference mirror 240 only needs to travel within a range large enough to enable the measurement of at least these interference waveforms. Consequently, the length of time required for temperature measurement of the wafer Tw is reduced.

(Other Variations of the Temperature Measuring System Achieved in the Fourth Embodiment)

Next, in reference to drawings, other variations of the temperature measuring system achieved in the fourth embodiment are explained. While a detour optical path connected in parallel to the measurement light optical path constituting the measurement light transmitting means is disposed at a mid point of the measurement light optical path in the third embodiment explained earlier, a detour optical path is connected in parallel at a mid point of the reference light optical path constituting the reference light transmitting means in the other variations of the fourth embodiment.

In such an alternative structure, too, both the reference beam having traveled through the detour optical path and the reference beam that has not passed through the detour optical path are both radiated toward the reference mirror 240 and, as a result, a greater number of interference patterns attributable to the measurement light and the reference light are achieved, as in the third embodiment. By adjusting the extent of the offset manifesting between the interference waves through an adjustment of the optical path length of the detour optical path, the reference interference waveform and the selected interference waveform to be used to measure the temperature of the wafer Tw can be made to appear in close proximity to each other. As a result, the distance over which the reference mirror is required to travel can be further reduced.

Figure 25:
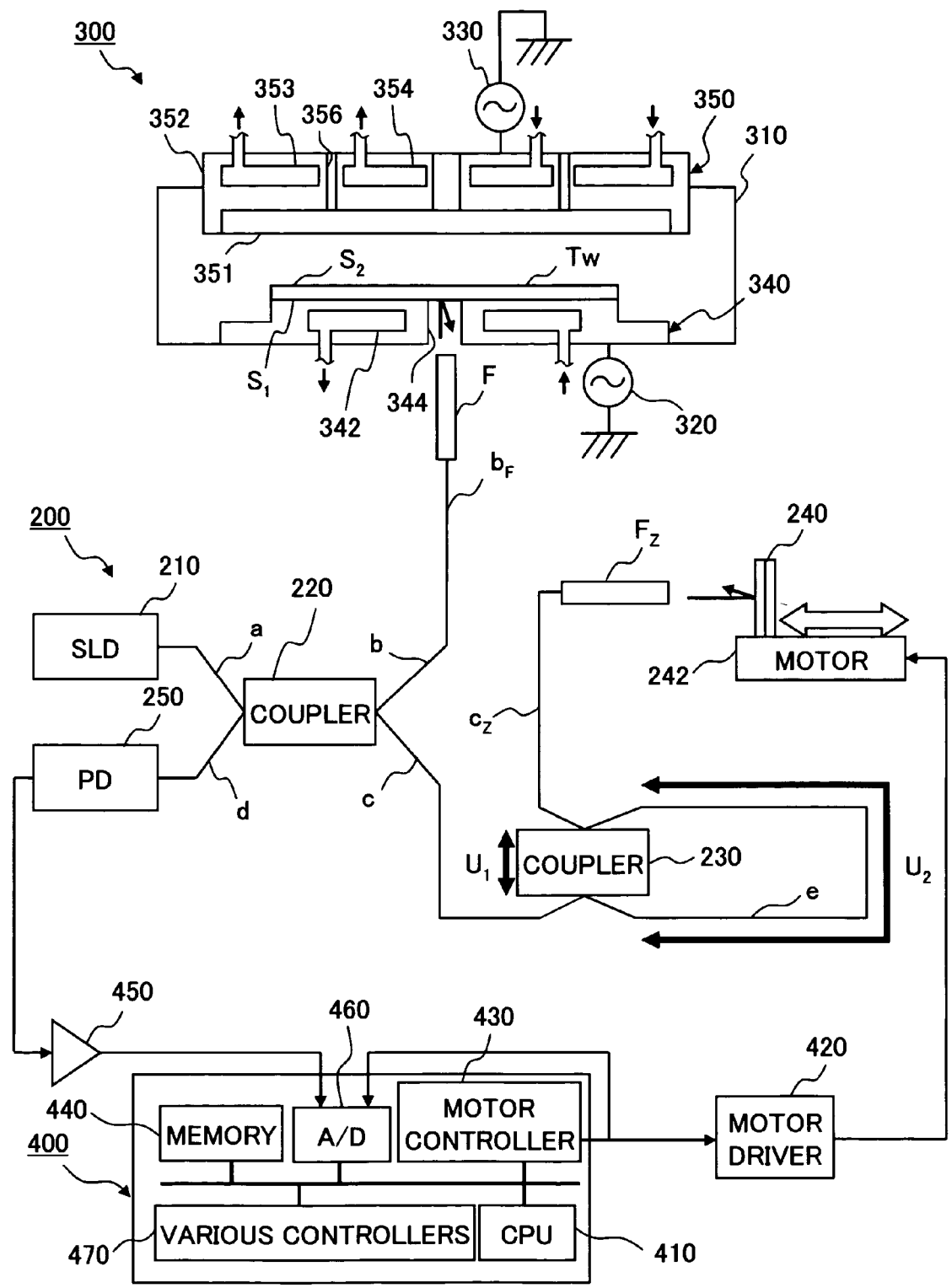
FIG. 25 is a schematic block diagram of the structure adopted in another variation of the temperature measuring system for a substrate processing apparatus achieved in the embodiment.
Figure 26:
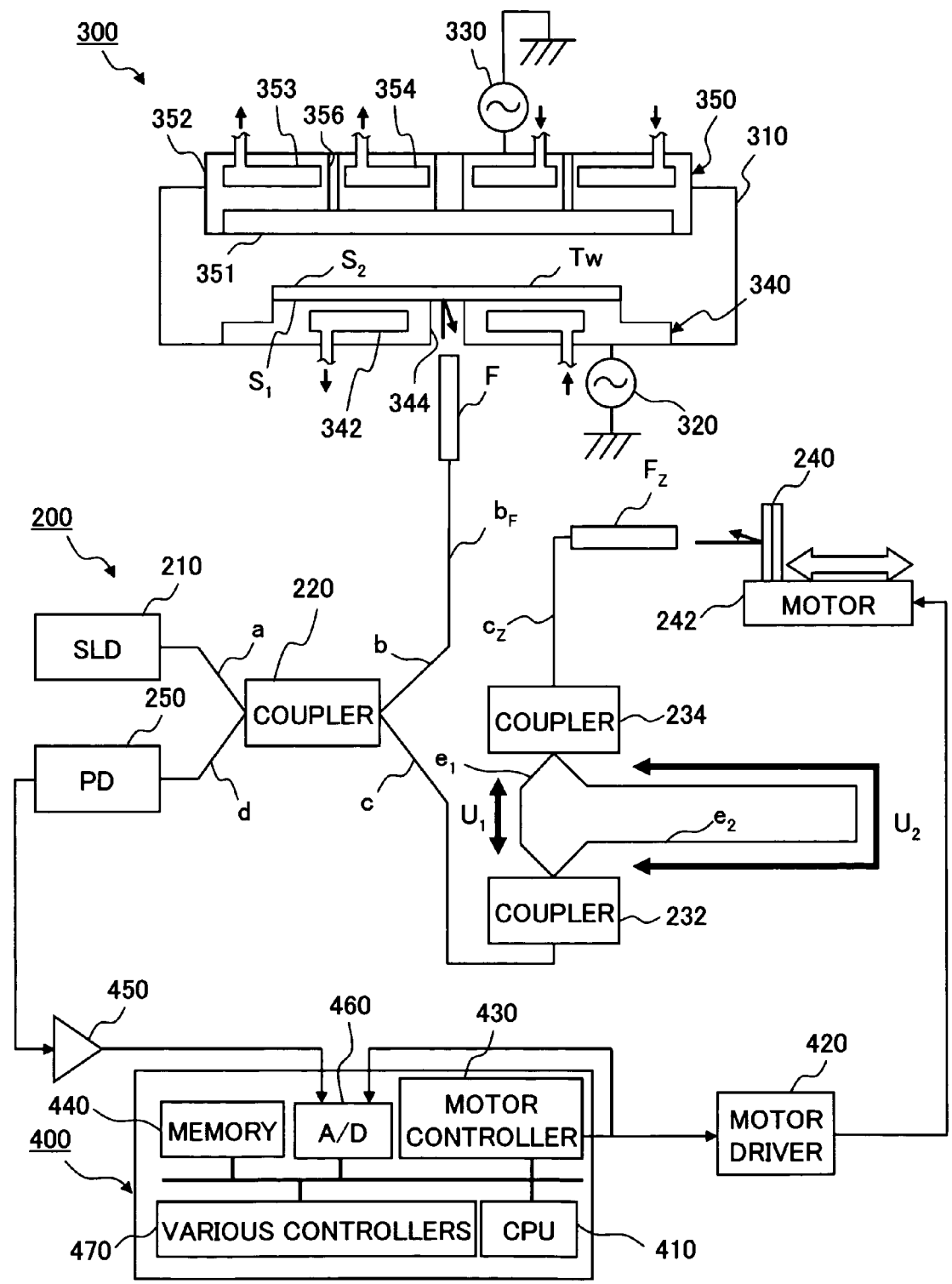
FIG. 26 is a schematic block diagram of the structure adopted in yet another variation of the temperature measuring system for a substrate processing apparatus achieved in the embodiment.

Specific examples of structures that may be adopted in the variations of the temperature measuring system achieved in the fourth embodiment are presented in FIGS. 25 and 26. In the temperature measuring system shown in FIG. 25, a detour optical path is connected in a manner similar to that shown in FIG. 18. Namely, the reference light transmitting means of the temperature measuring system in FIG. 25 includes a detour optical path connection splitter such as a 2×2 optical fiber coupler 230 to be used to connect in parallel an optical fiber e to constitute a detour optical path at a mid point of the reference light optical path extending from the optical fiber coupler 220.

To explain the structure adopted in the temperature measuring system in FIG. 25 in further detail, the other output terminal (output port) from the optical fiber coupler 220 is connected via the optical fiber c to one of the input terminals (input ports) at the optical fiber coupler 230. One of the output terminals (output ports) at the optical fiber coupler 230 is connected with an optical fiber $F_Z$ equipped with a collimator mounted at the front tip of an optical fiber $c_Z$. In addition, the other input terminal (input port) and the other output terminal (output port) at the optical fiber coupler 230, connected with the optical fiber e constituting the detour optical path, forms a loop.

At the reference light transmitting means structured as shown in FIG. 25, the reference light exiting the other output terminal (output port) from the optical fiber coupler 220 is split into two beams which are then directed to two separate output terminals (output ports) at the optical fiber coupler 230. The reference beam directed to one of the output terminals (output ports) is radiated through the optical fiber $c_Z$ toward the reference mirror 240 from the front tip of the optical fiber $F_Z$ equipped with a collimator. The reference beam directed to the other output terminal (output port) at the optical fiber coupler 230 is reverted via the optical fiber e to the other input terminal (input port) at the optical fiber coupler 230 and is further split into two beams which are directed to the two separate output terminals (output ports) at the optical fiber coupler 230. The reference beam directed to one of the output terminals (output ports) is radiated through the optical fiber $c_Z$ toward the reference mirror 240 from the front tip of the optical fiber $F_Z$ equipped with a collimator.

The temperature measuring system shown in FIG. 26 represents an example in which a detour optical path is connected in a manner similar to that shown in FIG. 21. Namely, a loop is formed by connecting in parallel an optical fiber $e_1$ to constitute a reference light optical path and an optical fiber $e_2$ to constitute a detour optical path with two detour optical path connection splitters (e.g., a 1×2 optical fiber coupler 232 and a 2×1 optical fiber coupler 234. In the temperature measuring system shown in FIG. 26, too, a detour optical path connected in parallel at a mid point of the reference light optical path constituting the reference light transmitting means can be formed as in the structure shown in FIG. 21.

To explain the temperature measuring system in more specific terms, the other output terminal (output port) from the optical fiber coupler 220 is connected via the optical fiber c with an input terminal (input port) of the 1×2 optical fiber coupler 232 in FIG. 26. One end of the shorter optical fiber $e_1$ forming a path $U_1$ and one end of the optical fiber $e_2$ longer than the optical fiber $e_1$ and forming a path $U_2$ in the detour optical path are each connected to one of the two output terminals (output ports) of the 1×2 optical fiber coupler 232. The other ends of the optical fiber $e_1$ and the optical fiber $e_2$ are each connected to one of the two input terminals (input ports) at the 2×1 optical fiber coupler 234. An optical fiber $F_Z$ equipped with a collimator mounted at the front tip of an optical fiber $c_Z$ is connected to an output terminal (output port) of the 2×1 optical fiber coupler 234.

Through the reference light transmitting means adopting the structure shown in FIG. 26, the reference light having exited the other output terminal (output port) of the optical fiber coupler 220 is split into two beams at the optical fiber coupler 232 to be directed to the two output terminals (output ports) thereof. The reference beam directed to one of the output terminals (output ports) then travels through the shorter optical fiber $e_1$ and enters the input terminal (input port) of the optical fiber coupler 234. The reference beam directed to the other output terminal (output port) at the optical fiber coupler 232 then travels through the optical fiber $e_2$ constituting the detour optical path and enters the input terminal (input port) of the optical fiber coupler 234. At the optical fiber coupler 234, the reference beams from the optical fiber $e_1$ and the optical fiber $e_2$ are combined and the combined reference light is radiated from the front tip of the optical fiber $F_Z$ equipped with a collimator toward the reference mirror 240.

The relationships between the various patterns of reference light optical paths (optical paths A through D) achieved with the reference light transmitting means structured as shown in FIG. 25 or FIG. 26 and the corresponding reference light paths are similar to those shown in FIG. 8 and the interference of the reference beams having traveled in the optical path patterns A through D and the measurement light occurs in a manner similar to that shown in FIG. 19. Namely, the extent of the offset manifesting with regard to the interference waves attributable to the measurement light and the reference beams having traveled through the individual optical path patterns A through D can be adjusted in the temperature measuring system structured as shown in FIG. 25 or FIG. 26 as well by adjusting the optical path lengths of the optical path patterns A through D through an adjustment of the optical path length of the reference light detour optical path (e.g., the length of the optical fiber e or the lengths of the optical fibers $e_1$ and $e_2$).

Accordingly, by adjusting the reference light optical path length (e.g., the length of optical fibers $c_{Z1}$ and $c_{Z2}$), a reference interference waveform (e.g. $y_{a0}$) selected from the interference waveforms attributable to the reference light traveling through either optical path (e.g., the optical path B) and the measurement light among the interference waveforms attributable to the measurement light and the reference beams traveling through the optical path (e.g., the optical path A) that does not include the detour optical path and the interference waveforms attributable to the measurement light and the reference beams traveling through a detour optical path (e.g., the optical path B) at least once and a selected interference waveform selected from the interference waveforms ($y_{a2}$) attributable to the measurement light and the reference light traveling through the other optical path (e.g., the optical path A) can be measured in close proximity to each other. Thus, the reference mirror 240 only needs to travel within a range large enough to enable the measurement of at least these interference waveforms and, as a result, the length of time required for temperature measurement of the wafer Tw is reduced.

(Temperature Measuring Apparatus is Achieved in the Fifth Embodiment)

Next, the temperature measuring apparatus achieved in the fifth embodiment is explained in reference to drawings. While the measurement beams reflected from the measurement target T as the measurement light is radiated from one side of the measurement target T are received on the same side of the measurement target T in the first through fourth embodiments explained earlier, measurement beams transmitted through the measurement target T as the measurement light is radiated from one side of the measurement target T are received on the other side of the measurement target T in the fifth embodiment.

Figure 27:
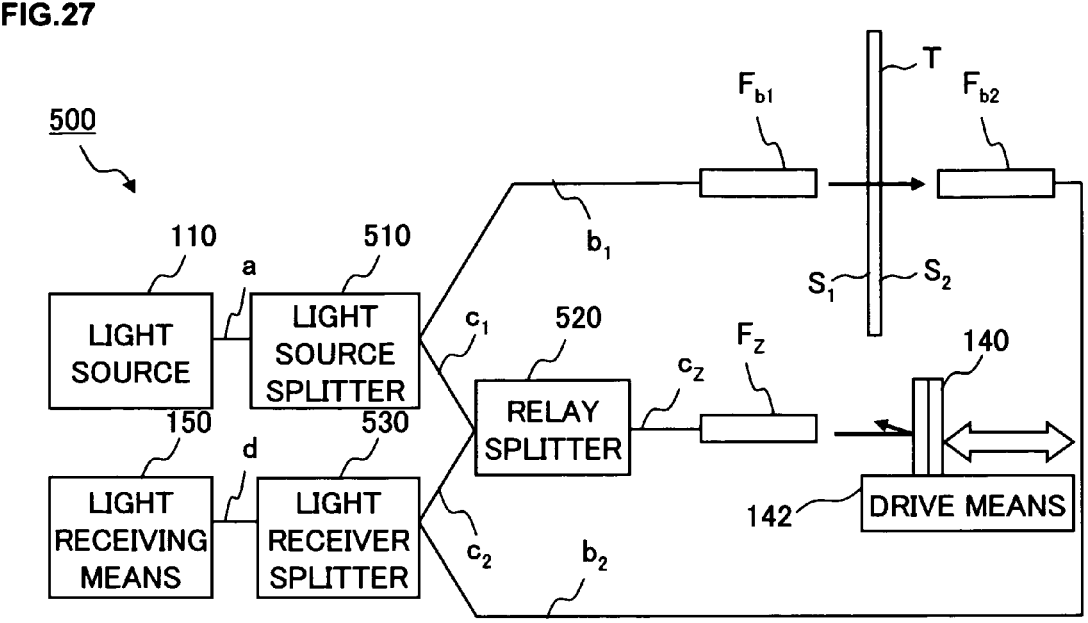
FIG. 27 is a schematic block diagram of the structure adopted in the temperature measuring system for a substrate processing apparatus achieved in a fifth embodiment of the present invention.

FIG. 27 schematically illustrates the structure adopted in the temperature measuring apparatus in the fifth embodiment. As shown in FIG. 27, the temperature measuring apparatus 200 includes a light source splitter 510 that splits the light from the light source 110 to measurement light radiated toward one side of the measurement target T and reference light, a relay splitter 520 that relays the reference light from the light source splitter 510 to the reference light reflecting means 140 and also relays the reference light reflected from the reference light reflecting means 140 toward the light receiving means 150 and a light receiver splitter 530 that outputs a combined light obtained by combining the reference light from the relay splitter 520 and the measurement light transmitted through the measurement target T to the light receiving means.

(Operation of the Temperature Measuring Apparatus) Achieved in the Fifth Embodiment In the temperature measuring apparatus 200 structured as described above, the light originating from the light source 110 enters an input terminal (input port) at the light source splitter 510 via, for instance, an optical fiber a and the light having entered the input terminal is split at the light source splitter 510 into two beams each directed to one of the two output terminals (output ports), as shown in FIG. 27. The light directed to one of the output terminals (output ports) is radiated as measurement light onto one side of the measurement targets T via the measurement light transmitting means which may be an optical fiber $F_{b1}$ equipped with a collimator disposed at the front tip of the optical fiber $b_1$. In the embodiment, the measurement light radiated toward one side of the measurement target T is transmitted through the measurement target T, travels through to the other side and is received at the light receiving means 150.

The light directed to the other output terminal (output port) after the light from the light source is split at the light source splitter 510 is output as the reference light which then enters one of the two input terminals (input ports) of the relay splitter 520 via, for instance, an optical fiber cl and exits the relay splitter 520 through its output terminal (output port). The reference light from the relay splitter 520 is radiated from the reference light transmitting means such as an optical fiber $F_z$ equipped with a collimator achieved by mounting a collimator at the front tip of an optical fiber $c_z$ and is reflected at the reference light reflecting means (e.g., a reference mirror) 140.

The measurement light having been transmitted through the measurement target T travels via a light receiver-side light transmitting means such as an optical fiber $F_{b2}$ equipped with a collimator mounted at the front tip of an optical fiber b2 and enters one of the two input terminals (input ports) at the light-receiver splitter 530. Also, the reference light reflected at the reference light reflecting means (e.g., a reference mirror) 140, too, enters the light-receiver splitter 530 through the other input terminal (input port) via the optical fiber $F_z$ equipped with a collimator. The measurement light and the reference light are combined at the light-receiver splitter 530, and the combined light exits through its output terminal (output port). It then enters the light receiving means 150 constituted with a PD such as an $S_1$ photodiode, an InGaAs photodiode or a Ge photodiode via, for instance, an optical fiber d. The interference waveform attributable to the measurement light and the reference light is thus detected at the light receiving means 150.

(Different Measurement Beams used in the Temperature Measuring Apparatus in the Fifth Embodiment)

Primary examples of measurement beams transmitted through the measurement target T as the measurement light from the light source 110 is radiated toward the measurement target T in the temperature measuring apparatus 500 structured as described above are now explained in reference to a drawing. FIG. 28 is a conceptual diagram of different measurement beams, with the arrows in FIG. 28 indicating measurement beams transmitted through the measurement target T. It is to be noted that while FIG. 28 shows measurement beams reflected at the two end surfaces of the measurement target T at positions offset from one another to clearly indicate the number of times each beam is reciprocally reflected at the two end surfaces, the angle of reflection changes in correspondence to the angle at which the measurement light is radiated onto the measurement target T, in reality. For instance, if the measurement light is radiated along a direction substantially perpendicular to the measurement target T, the reflecting positions at the end surfaces $S_1$ and $S_2$, too, are set substantially on the optical axis of the measurement light.

Figure 28A:
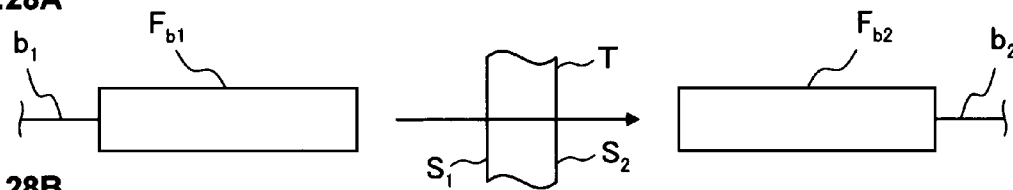
FIG. 28 is a conceptual diagram showing different path patterns of the measurement light radiated onto the measurement target, which may be observed in the embodiment.
Figure 28B:
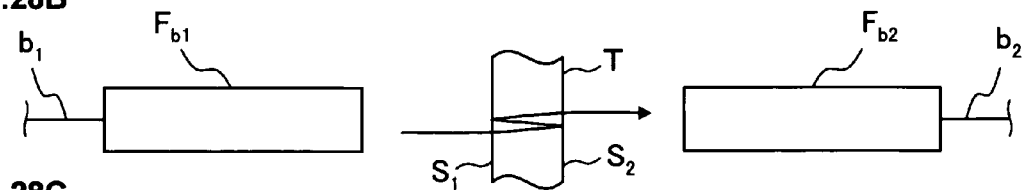

The measurement beams transmitted through the measurement target T include a measurement beam (a two-end surface transmission measurement beam or a 0.5 reciprocal reflection measurement beam) that is transmitted through the two end surfaces (the first surface $S_1$ constituting the front surface of the wafer Tw and the second surface $S_2$ constituting the rear surface of the wafer Tw) of the measurement target T and is thus transmitted through the measurement target T one-way (travels through the measurement target T 0.5 times reciprocally) without being reciprocally reflected inside the measurement target T even once, as shown in FIG. 28A and a measurement beam (a second surface/single reflection measurement beam or a 1.5 reciprocal reflection measurement beam) such as that shown in FIG. 28B that is transmitted through the first surface $S_1$ of the measurement target T, reflected once at the second surface $S_2$ and then reflected once at the first surface $S_1$, i.e., is reciprocally reflected 1.5 times at the two end surfaces $S_1$ and $S_2$ of the measurement target T.

Figure 28C:
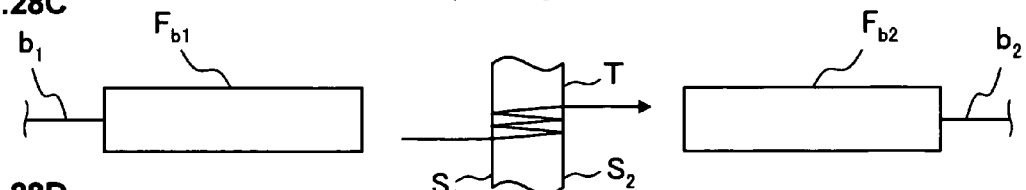
Figure 28D:
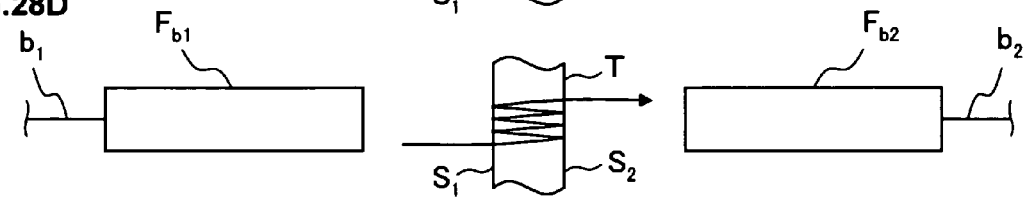

There are also measurement beams such as that shown in FIG. 28C that is first transmitted through the first surface $S_1$ of the measurement target T and is then reflected at the second surface $S_2$ and the first surface $S_1$ twice each, i.e., a measurement beam that is reciprocally reflected at the two end surfaces $S_1$ and $S_2$ of the measurement target T 2.5 times, (a second surface/double reflection measurement beam or a 2.5 reciprocal reflection measurement beam) and a measurement beam (a second surface/triple reflection measurement beam or a 3.5 reciprocal reflection measurement beam) shown in FIG. 28D that is transmitted through the first surface $S_1$ of the measurement target T and is then reflected at the second surface $S_2$ and the first surface $S_1$ three times each, i.e., a measurement beam that is reciprocally reflected at the two end surfaces $S_1$ and $S_2$ of the measurement target T 3.5 times. In other words, some measurement beams are reflected at each of the two surfaces $S_1$ and $S_2$ of the measurement target T multiple times and thus reciprocally travel inside the measurement target T a plurality of times (second surface/multiple reflection measurement beams or multiple reciprocal reflection measurement beams). Thus, the interference waveforms corresponding to these measurement beams and the reference light can be individually measured at the light receiving means 150.

(Specific Examples of Interference Waveforms Attributable to Measurement Beams and Reference Light)

Figure 29:
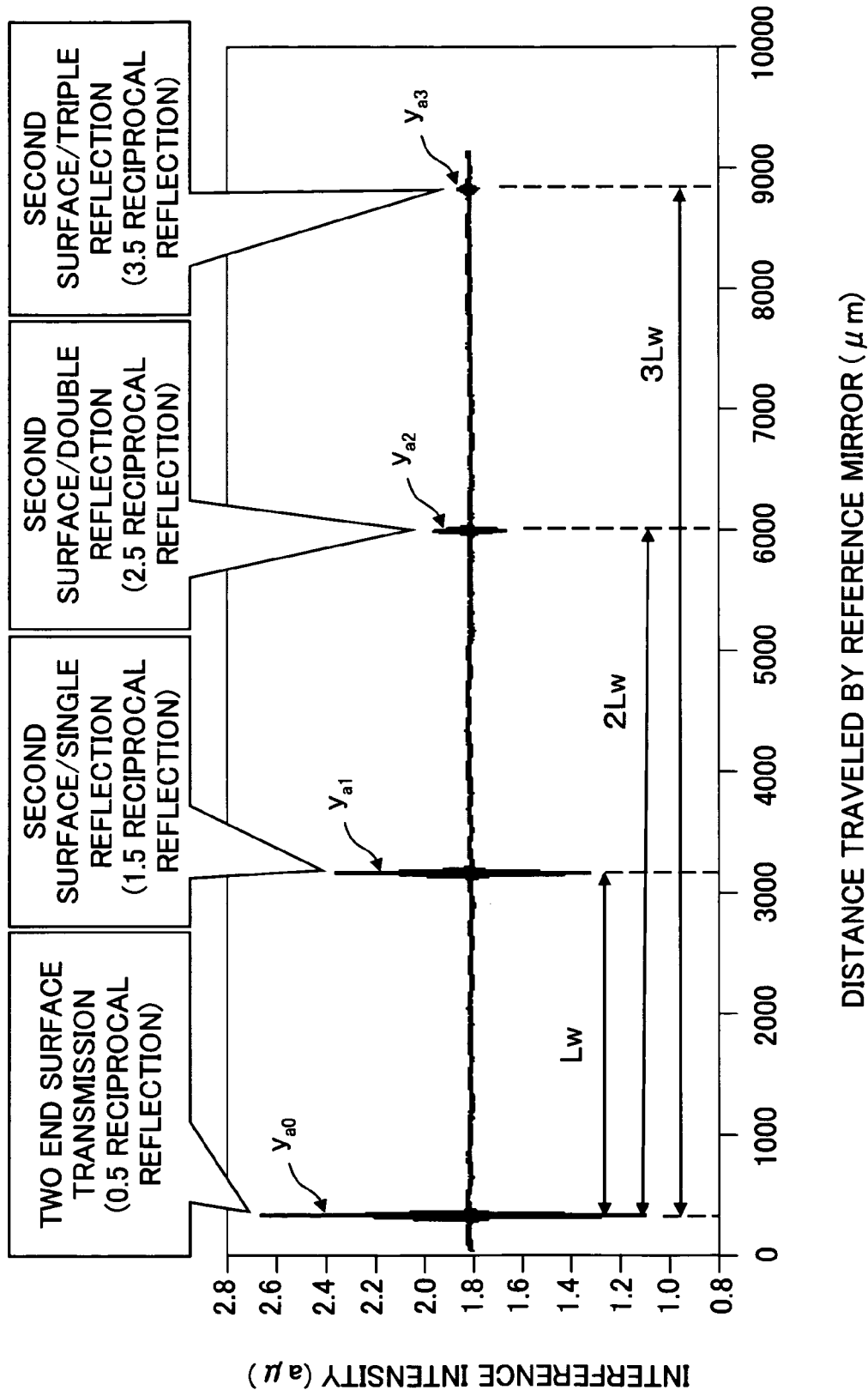
FIG. 29 presents a specific example of interference waves induced by measurement light and reference light in the temperature measuring apparatus achieved in the embodiment.

FIG. 29 shows interference waveforms attributable to the measurement light and the reference light that may be obtained with the temperature measuring apparatus 500. FIG. 29 shows the waveforms of the interference of various measurement beams, such as those shown in FIG. 28 transmitted through the measurement target T, with the reference light. The vertical axis in FIG. 29 represents the interference intensity and the horizontal axis represents the distance by which the reference mirror is moved. In addition, the light source 110 is a low coherence light source capable of emitting light that can be transmitted through and reflected at the measurement target T, e.g., a wafer Tw.

As FIG. 29 indicates, an interference waveform $y_{a0}$ of the interference between a two-end surface transmission measurement light (0.5 reciprocal reflection measurement beam) such as that shown in FIG. 28A and the reference light manifests and then an interference waveform $y_{a1}$ of the interference between a second surface/single reflection measurement beam (1.5 reciprocal reflection measurement beam) such as that shown in FIG. 28B and the reference light manifests, as the reference light reflecting means (such as a reference mirror) 140 is scanned along the specific direction. As the reference light reflecting means 140 is further scanned, an interference waveform $y_{a2}$ of the interference between a second surface/double reflection measurement beam (2.5 reciprocal reflection measurement beam) such as that shown in FIG. 28C and the reference light manifests and then an interference waveform $y_{a3}$ of the interference between a second surface/triple reflection measurement beam (3.5 reciprocal reflection measurement beam) such as that shown in FIG. 28D and the reference light manifests. Subsequently, as the reference light reflecting means 140 is scanned further, interference waveforms corresponding to various measurement beams such as a second surface/quadruple reflection measurement beam (4.5 reciprocal reflection measurement beam) and the second surface/quintuple reflection measurement beam (5.5 reciprocal reflection measurement beam) and the like appears continuously over equal intervals (not shown).

The interference waveforms $y_{a0}$ to $y_{a3}$ manifested by the interference of the reference light and the measurement beams shown in FIG. 29 have a relationship similar to that among the individual interference waveforms $y_{a0}$ to $y_{a3}$ attributable to the interference of the reference light and the measurement beams shown in FIG. 6. Thus, the accuracy with which the peak interval between the peaks in the reference interference waveform and the selected interference waveform is measured can be improved with regard to the interference of the measurement beams shown in FIG. 29 and the reference light as well, by selecting the reference interference waveform and the selected interference waveform to be used to determine the optical path length L at the measurement target T so as to maximize the peak interval between the reference interference waveform and the selected interference waveform.

For instance, by designating the interference waveform $y_{a0}$ in FIG. 29 as the reference interference waveform and designating the interference waveform $y_{a2}$ in FIG. 29 as the selected interference waveform, the peak interval between the reference interference waveform and the selected interference waveform is lengthened compared to the peak interval achieved by designating the interference waveform $y_{a0}$ as the reference interference waveform and the interference waveform $y_{a1}$ as the selected interference waveform, and ultimately, the measurement accuracy is improved. Then, the optical path length L at the measurement target T, e.g., the wafer Tw, can be determined based upon the peak interval between the reference interference waveform and the selected interference waveform, which can then be converted to a value indicating the temperature through a method similar to that explained earlier.

It is to be noted that the optimal selected interference waveform may be selected from the interference waveforms in FIG. 29 based upon indices K indicating the extents of interference waveform deformation similar to those explained earlier. Based upon such deformation extent indices K, the interference waveform that would maximize the peak interval between the reference interference waveform and the selected interference waveform without the extent of its deformation adversely affecting the interference waveform peak interval measurement accuracy can be selected with ease.

(Temperature Measuring System Achieved in the Sixth Embodiment)

Figure 30:
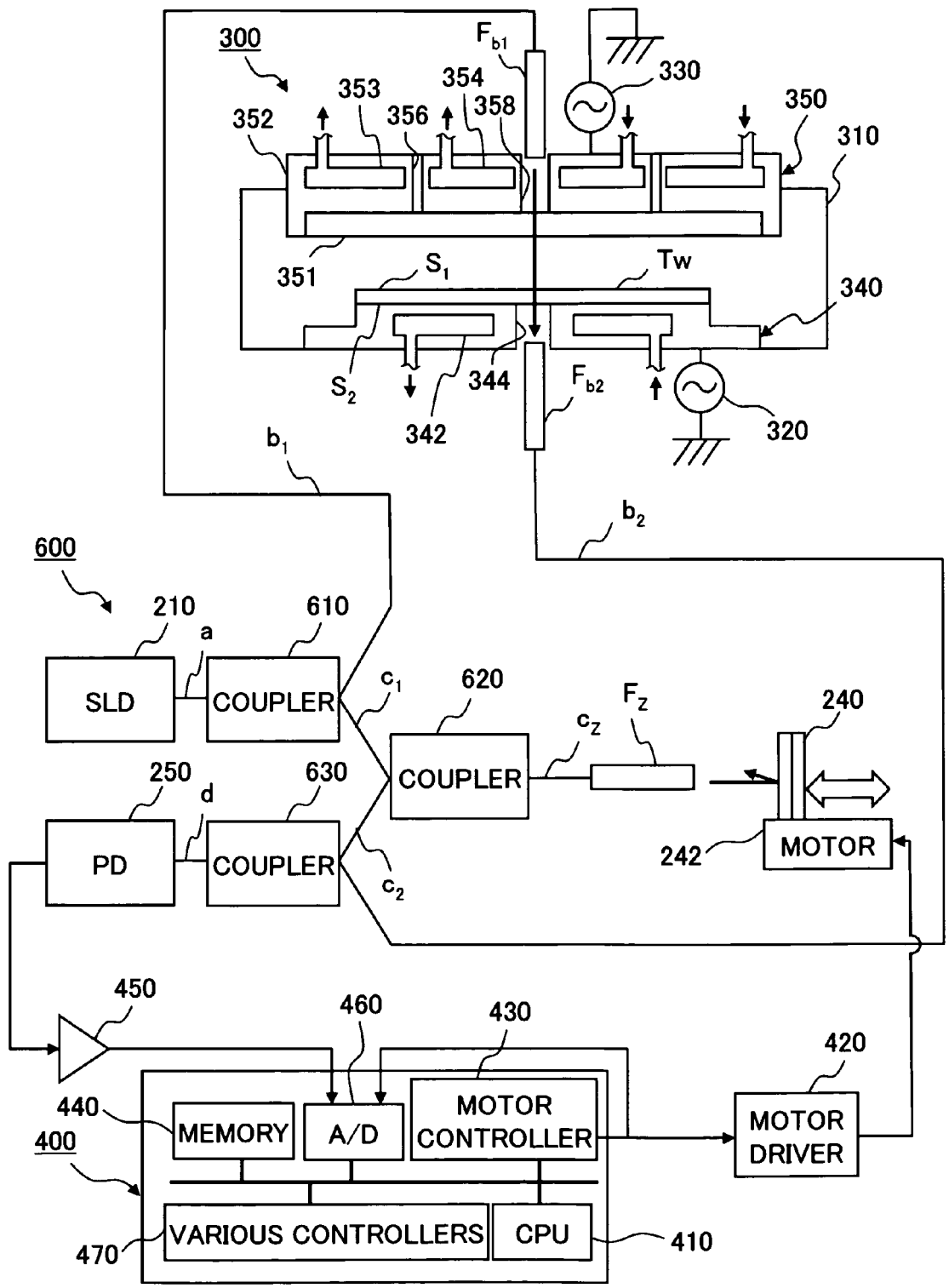
FIG. 30 is a schematic block diagram of the structure adopted in the temperature measuring system for a substrate processing apparatus, achieved in a sixth embodiment of the present invention.

Next, the temperature measuring system for a substrate processing apparatus achieved in the sixth embodiment is explained in reference to drawings. The temperature measuring system for a substrate processing apparatus achieved in the sixth embodiment represents a specific example in which the temperature measuring apparatus in the fifth embodiment is adopted in conjunction with a substrate processing apparatus. FIG. 30 schematically shows the structure of the temperature measuring system achieved in the sixth embodiment. In reference to the second embodiment, the present invention adopted in the measurement of the temperature at a wafer Tw representing the temperature measurement target T in a substrate processing apparatus such as a plasma etching apparatus is explained.

The temperature measuring system in FIG. 30 is primarily constituted with a temperature measuring apparatus 600, a substrate processing apparatus 300 and a control device 400. A light source of the temperature measuring apparatus 600 in FIG. 30, corresponding to the light source 110 in FIG. 27, is a low coherence light source constituted with a low coherence SLD 210 capable of emitting low coherence light. The light receiving means 150 is constituted with a PD 250 achieved by using, for instance, a Ge photodiode, the reference light reflecting means 140 is constituted with, for instance, a reference mirror 240 and the drive means 142 is constituted with a stepping motor 242 which drives the reference mirror 240. The light source splitter 510, the relay splitter 520 and the light-receiver splitter 530 are respectively constituted with a 1×2 optical fiber coupler 610, a 2×1 optical fiber coupler 620 and a 1×2 optical fiber counter 630.

While the substrate processing apparatus 300 and the control device 400 adopt structures similar to those shown in FIG. 2, the substrate processing apparatus 300 in FIG. 8 includes an optical fiber $F_{b1}$ equipped with a collimator, which is used to radiate the measurement light to the first surface $S_1$ constituting the first surface of the wafer Tw and is disposed at the upper electrode 350, and an optical fiber $F_{b2}$ equipped with a collimator, which is used to receive the measurement light from the second surface $S_2$ of the wafer Tw constituting the rear surface thereof, disposed at the lower electrode 340, instead of an optical fiber F equipped with a collimator, which is used to receive light reflected from the wafer Tw as the measurement light is radiated towards the rear surface of the wafer Tw and is disposed at the lower electrode 340 in the substrate processing apparatus 300 shown in FIG. 2.

More specifically, the optical fiber $F_{b1}$ equipped with a collimator is disposed at the upper electrode 350 so as to allow the measurement light to be radiated toward the wafer Tw via a through hole 358 formed at, for instance, the center of the electrode support member 352, whereas the optical fiber $F_{b2}$ is equipped with a collimator is disposed at the lower electrode 340 so as to receive the measurement light from the wafer Tw via a through hole 344 formed at, for instance, the center of the lower electrode 340. It is to be noted that the positions at which the optical fibers $F_{b1}$ and $F_{b2}$ each equipped with a collimator are disposed along the direction of the plane of the wafer Tw are not limited to the positions shown in FIG. 30, i.e., positions corresponding to the center of the wafer Tw, as long as the measurement light radiated from the optical fiber $F_{b1}$ equipped with a collimator can be received at the optical fiber $F_{b2}$ equipped with a collimator via the wafer Tw. For instance, the optical fibers $F_{b1}$ and $F_{b2}$ each equipped with a collimator may be disposed so that the measurement light is radiated onto the edge of the wafer Tw.

In the temperature measuring system adopting the structure shown in FIG. 30, interference waveforms of interference of measurement light and reference light similar to those shown in FIG. 29 can be obtained by driving the reference mirror 240 along one direction via the control device 400. Thus, the accuracy with which the peak interval between the reference interference waveform and the selected interference waveform is measured can be improved in the temperature measuring system in FIG. 30, as well, by selecting the reference interference waveform and the selected interference waveform from the plurality of interference waveforms detected with the PD 250 so as to maximize the peak interval between them and, as a result, the temperature of the wafer Tw can be measured with better accuracy.

It is to be noted that the optimal selected interference waveform may be selected from the interference waveforms in the temperature measuring system achieved in the embodiment, based upon indices K indicating the extents of interference waveform deformation similar to those explained earlier. Based upon such deformation extent indices K, the interference waveform that would maximize the peak interval between the reference interference waveform and the selected interference waveform without the extent of its deformation adversely affecting the interference waveform peak interval measurement accuracy can be selected with ease.

(Temperature Measuring System that does not Include Optical Fibers or the Like)

Figure 31:
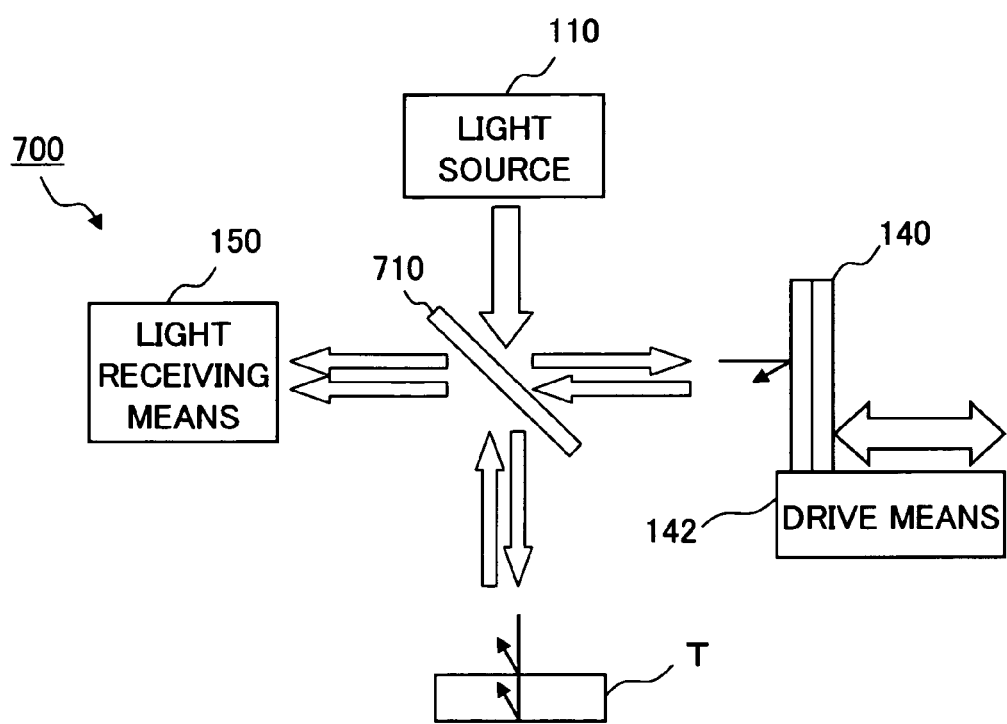
FIG. 31 illustrates the principle adopted in a temperature measuring apparatus in which light beams including measurement light and reference light are transmitted through the air.

It is to be noted that while an explanation is given above in reference to the temperature measuring systems achieved in the second through sixth embodiments on examples in which optical fibers are utilized as the measurement light transmitting means and the reference light transmitting means and the measurement light and the reference light used for the temperature measurement are transmitted through these optical fibers, the present invention is not limited to these examples and beams such as the measurement light and the reference light to be used for the temperature measurement may instead be transmitted through the air based upon the principle illustrated in FIG. 31, without using any optical fibers or collimate fibers.

FIG. 31 illustrates the principle adopted in a temperature measuring apparatus 700 in which light is transmitted through the air without using any optical fibers or collimate fibers. In the temperature measuring apparatus 700, light originating from a light source (e.g., an SLD) 110 is transmitted through the air and is radiated onto a splitter (e.g., a half mirror) 710 where it is split into reference light and measurement light. The measurement light is transmitted through the air and is radiated toward a measurement target T placed on the receiving end. The measurement light is then reflected at the front surface and the rear surface of the measurement target T. The reference light is transmitted through the air, is radiated toward a reference light reflecting means (e.g., a reference mirror) 140 and is reflected at the front surface of the mirror constituting the reference light reflecting means. The reflected measurement light and the reflected reference light are transmitted through the air, reenter the splitter 710 and are received at a light receiving means 150. During this process, depending upon the optical path length of the reference light, the measurement light and the reference light become overlapped on each other, thereby inducing interference and the interference waves attributable to this interference are detected at the light receiving means 150. By adopting this principle, light can be transmitted without using any optical fibers or collimate fibers. In this case, a light source 110 that emits light with a wavelength (e.g., a wavelength equal to or greater than 2.5 μm), which does not allow the light to pass through optical fibers or collimate fibers, can be utilized as the source of the measurement light and the reference light.

(Control System for the Substrate Processing Apparatus)

In addition, by adding various controllers 470 including a controller that controls the temperatures at, for instance, the electrode plate 351 of the upper electrode 350 and the wafer Tw in any of the temperature measuring systems in the second through sixth embodiments described above, a control system for a substrate processing apparatus that controls the temperatures of the electrode plate 351 of the upper electrode 350 and the wafer Tw with the various controllers 470 based upon the results of the temperature measurement executed by the temperature measuring apparatus, can be achieved.

In such a case, the various controllers may include, for instance, an inner coolant controller and an outer coolant controller that control the temperature of the electrode plate 351 of the upper electrode 350. The inner coolant controller controls the temperature at the inner side of the upper electrode 350 by controlling the temperature or the flow rate of the coolant circulated through the inner coolant passage 354. The outer coolant controller controls the temperature at the outer side of the upper electrode 350 by controlling the temperature or the flow rate of the coolant circulated through the outer coolant passage 353.

In addition, the various controllers 470 may include an ESC (electrostatic chuck) parameter controller and an FR (focus ring) parameter controller that control the temperature at the wafer Tw. The ESC parameter controller controls the voltage applied to the electrostatic chuck (ESC) (not shown) which electrostatically holds the wafer at the lower electrode 340, the gas flow rate or the gas pressure of the backside gas supplied to the wafer Tw via the electrostatic chuck, the temperature of the coolant circulated through the coolant passage formed within the lower electrode 340 and the like. The FR parameter controller controls the voltage applied to a circumferential ring (not shown) such as a focus ring disposed so as to surround the wafer, the gas flow rate or the gas pressure of the backside gas supplied to the wafer Tw via the focus ring and the like.

By providing any of the temperature measuring systems achieved in the second through sixth embodiments as a control system for a substrate processing apparatus as described above, the temperature at the upper electrode 350 and the temperature at the wafer Tw can be controlled, which enables accurate control of the process characteristics of the wafer Tw and improves the stability of the substrate processing apparatus.

(Thickness Measuring Apparatus and Thickness Measuring System)

In addition, while an explanation is given above in reference to the first through sixth embodiments on an example in which the temperature of the measurement target is measured, the present invention is not limited to this example and it may instead be adopted when measuring the thickness of a measurement target. Namely, in the first through fifth embodiments, based upon the principle that the interval between the peaks in the interference waveforms attributable to the measurement beams each transmitted through or reflected at the measurement target as the measurement light is radiated onto the measurement target T and the reference light, is equivalent to the optical path length at the measurement target, the peak interval between the interference waveforms is measured as the distance traveled by the reference light reflecting means (e.g., a reference mirror) and the optical path length thus determined is converted to a value representing the temperature at the measurement target.

At the same time, the optical path length L is expressed as the product, thickness d×refractive index n. Since the refractive index n is dependent upon the temperature, once the refractive index n at the temperature at which the optical path length L is measured is ascertained, the thickness d of the measurement target can be calculated by dividing the measured optical path length L by the refractive index n. Thus, the relationship between the temperature and the refractive index n at the measurement target may be stored in advance as thickness reference conversion data in the memory 440 or the like at the control device 400 and the thickness d of the measurement target may be calculated by measuring the temperature at which the optical path length L at the measurement target is measured with a separate temperature measuring means (such as a resistance thermometer or a fluorescence thermometer), determining the refractive index n corresponding to the temperature based upon the thickness reference conversion data and then dividing the optical path length L by the refractive index n.

Since the thickness of a measurement target can be calculated by using the interference waveforms attributable to the measurement light and the reference light as described above, the principle may be applied to provide the temperature measuring apparatus or the temperature measuring system for a substrate processing apparatus achieved in any of the first through fifth embodiments as a thickness measuring apparatus or a thickness measuring system for a substrate processing apparatus. By measuring the thickness of a consumable part such as the electrode plate 351 of the upper electrode 350 in the substrate processing apparatus 300 on a regular basis, the extent of loss of the consumable part such as the electrode plate 351 can be measured. This, in turn, makes it possible to assess the correct timing with which the electrode plate 351 should be replaced.

It is to be noted that the thickness measurement may be always executed at a given temperature, such as when the power to the substrate processing apparatus 300 is turned on or after maintenance work on the substrate processing apparatus 300 is completed and the refractive index n corresponding to the temperature may be stored into the memory 440 at the control device 400 or the like. In such case, it is not necessary to measure the temperature of the measurement target each time the thickness needs to be calculated, which eliminates the need for the separate temperature measuring means and minimizes the labor and the length of time required for the thickness measurement. It is to be noted that by allowing the controlled device 400 to function as a thickness calculating means or a control means, the thickness of the measurement target T can be determined by the control device 400 based upon the results of the measurement of interference attributable to the measurement light and the reference light.

(Intensity of Light from the Light Source)

The temperature measuring apparatus achieved in any of the first through sixth embodiments may include a light intensity adjusting means capable of adjusting the light intensity at the light source 110 such as the SLD 210 to alter the intensity of the light originating from the light source 110 while measuring the interference of the measurement light and the reference light by controlling the light intensity adjusting means with the control device 400 via, for instance, a light intensity controller included as one of the various controllers.

With these measures, the intensity of the measurement light transmitted through the measurement target T and reflected a plurality of times inside the measurement target T can be sustained at a desired level while measuring the interference of the measurement light and the reference light, so as to ensure that the interference waveforms attributable to the measurement light and the reference light can be kept intact without allowing the S/N ratio of the interference waveforms to become lowered and thus, without allowing the interference waveforms to become distorted. Consequently, an improvement is achieved in the accuracy with which the peak positions in the interference waveforms are detected, which, in turn, improves the accuracy of temperature or thickness measurement executed based upon the peak interval between the peaks in the interference waveforms.

More specifically, the intensity of the light from the light source may be adjusted by, for instance, gradually increasing the light intensity at the light source in correspondence to the distance traveled by the reference light reflecting means (e.g., a reference mirror) 140 while measuring the interference of the measurement light and the reference light. In this case, the light intensity of a the measurement beam that is reciprocally reflected at the two end surfaces $S_1$ and $S_2$ of the measurement target T a greater number of times can be increased to a greater extent so as to prevent a reduction in the S/N ratio in the interference waveform attributable to such measurement light and reference light.

In addition, while measuring the interference of the measurement light and the reference light, the intensity of the light at the light source may be adjusted in correspondence to the number of times the measurement light is reciprocally reflected at the two end surfaces $S_1$ and $S_2$ of the measurement target T. Since the intensity of the measurement light decreases as it is reciprocally reflected at the two end surfaces $S_1$ and $S_2$ of the measurement target T a greater number of times, the intensity of the light at the light source may be raised to a greater degree when the measurement light is reflected reciprocally at the two end surfaces $S_1$ and $S_2$ of the measurement target T a greater number of times so as to ensure that the intensity of the measurement light is not lowered. This ultimately ensures that the S/N ratio of the interference waveform corresponding to the measurement light and the reference light does not become lowered.

In addition, the levels of the intensity of the measurement light reflected from a given measurement target T may be measured in advance and the light intensity at the light source may be altered in correspondence to the level of the intensity of the measurement light reflection (e.g., the level of interference intensity manifesting in the interference waveforms attributable to the measurement light and the reference light) measured in advance when measuring the interference of the measurement light and the reference light for the measurement target T. In this case, the light intensity at the light source can be increased to a greater extent if the level of the intensity of the reflected measurement light is lower, so as to effectively prevent the S/N ratio in the interference waveforms attributable to the measurement light and the reference light from becoming lowered.

By adjusting the intensity of the light emitted from the light source as described above, the level of the S/N ratio in the interference waveform corresponding to a specific measurement beam and the reference light is sustained at a desirable level, which, in turn, assures a high level of accuracy in the measurement of the peak position in the interference waveform. Since this makes it possible to select an optimal selected interference waveform that will maximize the peak interval between the reference interference waveform and the selected interference waveform, a further improvement in the temperature measurement accuracy is achieved.

It is to be noted that the indices K indicating the extents of deformation of the interference waveforms corresponding to specific measurement beams and the reference light, which are used as described earlier to select an optimal selected interference waveform by ensuring that the corresponding index K does not exceed a predetermined value may be incorporated with the adjustment of the intensity of the light from the light source explained above. In this case, as the intensity of the light from the light source is adjusted while measuring the interference of the measurement light and the reference light, an interference waveform with an improved S/N ratio is received and the index K calculated to indicate the deformation of the interference waveform is bound to indicate a more favorable value. Thus, by adjusting the intensity of the light emitted from the light source, the number of interference waveforms, the interference waveform deformation extent indices K of which do not exceed the predetermined value, can be increased. As a result, an optimal interference wave, which will further lengthen the peak interval between the reference interference waveform and the selected interference waveform and is deformed to the least extent, can be selected to be used as the selected interference waveform. This, ultimately, further improves the temperature measurement accuracy.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

For instance, while an explanation is given above in reference to the embodiments on an example in which the substrate undergoing measurement is a wafer Tw processed inside the processing chamber 310 of the substrate processing apparatus 300, the present invention is not limited to this example and the substrate undergoing the measurement may be a liquid crystal substrate such as a glass substrate, instead. In addition, any of various components or parts inside the substrate processing apparatus, including an electrode plate disposed inside the processing chamber 310 of the substrate processing apparatus 300 (e.g., an electrode plate of the lower electrode 340 or the upper electrode 350) and a circumferential ring (e.g., a focus ring) disposed around the wafer, may be designated as the measurement target T to undergo the temperature/thickness measurement.

Also, while the explanation above is given on an example in which the measurement is executed on a single measurement target T such as a wafer Tw, the present invention is not limited to this example and it may be adopted to measure the temperatures/thicknesses of a plurality of measurement targets T or to measure the temperatures/thicknesses at a plurality of measurement points set at a single object such as a wafer Tw.

In conjunction with multiple measurement targets/points, the measurement light from the light source may be further split to a plurality of measurement beams to be radiated onto the individual measurement targets T or measurement points. In such a case, the interference waveforms corresponding to the measurement beams radiated at the various measurement targets or points and the reference light can be measured all at once, making it possible to measure their temperatures or thicknesses all at once. As a result, a great reduction in the length of time required to measure the temperatures or thicknesses at various measurement targets or measurement points is achieved.

Furthermore, by radiating the measurement light toward a plurality of measurement targets set so as to face opposite each other, the light having been transmitted through the measurement target disposed at the forward stage can be used as the measurement light at the measurement target disposed at the next stage, and measurement beams reflected from the individual measurement targets may then be received at the light receiving means. Since this makes it possible to measure the temperatures or thicknesses of the plurality of measurement targets all at once by radiating a single measurement light beam, thus the length of time required for the temperature/thickness measurement is reduced. At the same time, since the measurement light transmitting means such as an optical fiber can be installed with greater ease, the process of mounting the temperature measuring apparatus at, for instance, a substrate processing apparatus is simplified.

The measurement target undergoing the measurement according to the present invention may be an object such as a wafer Tw or it may be a measurement target layer such as an inner layer of the wafer Tw, constituting part of an object.

Moreover, while an explanation is given above in reference to the embodiments on an example in which the present invention is adopted in conjunction with a substrate processing apparatus which may be, for instance, a plasma processing apparatus, the present invention is not limited to this example and may be adopted with equal effectiveness in conjunction with various types of substrate processing apparatuses including a film forming apparatus that does not use plasma and a film conditioning apparatus such as a heat treatment apparatus. In addition, the temperature/thickness measuring apparatus according to the present invention may be adopted in conjunction with any of various types of processing apparatuses as well as a substrate processing apparatus.

What is claimed is:

1. A temperature/thickness measuring apparatus comprising:

a light source that emits light to be transmitted through and reflected at two end surfaces of a measurement target, which is reflected reciprocally at least twice at the two end surfaces of said measurement target;

a splitter that splits said light from said light source into measurement light and reference light;

a reference light reflecting means for reflecting said reference light from said splitter;

an optical path length altering means for altering the optical path length of said reference light reflected at said reference light reflecting means;

a reference light transmitting means for transmitting said reference light from said splitter to a reference light radiation position at which said reference light is radiated toward said reference light reflecting means;

a measurement light transmitting means for transmitting said measurement light from said splitter to a measurement light radiation position at which said measurement light is radiated toward said measurement target;

a light receiving means for measuring a plurality of measurement light interference waveforms obtained as interference of measurement beams each transmitted through or reflected at said measurement target and said reference light reflected from said reference light reflecting means occurs; and a measuring means for measuring the optical path length of said measurement light indicated by the distance between the two end surfaces of said measurement target based upon a reference interference waveform which is one of said plurality of measurement light interference waveforms measured by said light receiving means and a selected interference waveform selected from said plurality of measurement light interference waveforms, which corresponds to a measurement beam reciprocally reflected at the two end surfaces of said measurement target at least twice more than the number of times the measurement beam corresponding to said reference interference waveform is reciprocally reflected at the two end surfaces and measuring the temperature/thickness of said measurement target based upon the optical path length thus measured.

2. A temperature/thickness measuring apparatus according to claim 1, wherein:

said measuring means selects said selected interference waveform based upon extents of deformation of measurement light interference waveforms received at said light receiving means.

3. A temperature/thickness measuring apparatus according to claim 2, wherein:
said extents of deformation of said measurement light interference waveforms each indicate an extent of offset between an approximate curve obtained through curvilinear approximation of an entire wave series constituting a given interference waveform and an approximate curve obtained by curvilinearly approximating said interference waveform based upon individual waveform reiterations constituting the interference wave series.

4. A temperature/thickness measuring apparatus according to claim 3, wherein:
a reference approximate curve approximating the entire wave series constituting said interference waveform is a normal distribution curve and the approximate curve obtained based upon the individual waveform reiterations constituting the interference wave series is an envelope obtained based upon the waveform reiterations.

5. A temperature/thickness measuring apparatus according to claim 1, wherein:
said measurement light transmitting means includes a detour optical path connected at a mid point of a measurement light optical path in parallel to said measurement light optical path.

6. A temperature/thickness measuring apparatus according to claim 5, wherein:
the optical path length of said measurement light detour optical path is adjusted so as to allow said reference interference waveform and said selected interference waveform corresponding to specific measurement beams to be measured in close proximity to each other at said light receiving means.

7. A temperature/thickness measuring apparatus according to claim 1, wherein:
said reference light reflecting means includes a plurality of reflecting surfaces and reflects said reference light originating from said splitter at said plurality of reflecting surfaces as a plurality of reference beams with varying optical path lengths.

8. A temperature/thickness measuring apparatus according to claim 7, wherein:
the positions of said plurality of reflecting surfaces at said reference light reflecting means are adjusted so as to allow said reference interference waveform and said selected interference waveform corresponding to specific measurement beams to be measured in close proximity to each other at said light receiving means.

9. A temperature/thickness measuring apparatus according to claim 1, further comprising:
a reference light splitter that splits said reference light from said splitter into a plurality of reference beams, wherein:
said plurality of reference beams from said reference light splitter are radiated onto said reference light reflecting means with varying optical path lengths.

10. A temperature/thickness measuring apparatus according to claim 9, wherein:
the optical path lengths of said plurality of reference beams from said reference light splitter are adjusted so as to allow said reference interference waveform and said selected interference waveform corresponding to the specific measurement beams to be measured in close proximity to each other at said light receiving means.

11. A temperature/thickness measuring apparatus according to claim 1, wherein:
said reference light transmitting means includes a detour optical path connected at a mid point of a reference light optical path in parallel to said reference light optical path.

12. A temperature/thickness measuring apparatus according to claim 11, wherein:
the optical path length of said reference light detour optical path is adjusted so as to allow said reference interference waveform and said selected interference waveform corresponding to specific measurement beams to be measured in close proximity to each other at said light receiving means.

13. A temperature/thickness measuring apparatus according to claim 1, wherein:
said measurement light transmitting means is disposed on one side of said measurement target, and transmits and radiates said measurement light from said light source toward an end surface of said measurement target on one side; and
said measurement light transmitting means also receives a returning measurement beam having been reciprocally reflected at two end surfaces of said measurement target or having been reflected only at the end surface on the one side and transmits the received measurement beam toward said light receiving means.

14. A temperature/thickness measuring apparatus according to claim 1, wherein:
said measurement light transmitting means, a radiating light transmitting means disposed on one side of said measurement target to transmit and radiate said measurement light from said light source toward an end surface of said measurement target on one side and a received light transmitting means disposed on the other side of said measurement target to receive measurement light transmitted through an end surface of said measurement target on the other side after having been reciprocally reflected at the two end surfaces of the measurement target or having been transmitted through the end surface on the one side without being reciprocally reflected and transmit the received measurement light toward said light receiving means with said radiating light transmitting means and said received light transmitting means achieved as separate means.

15. A temperature/thickness measuring apparatus according to claim 1, wherein:
said measurement light and said reference light are individually transmitted through atmosphere.

16. A temperature/thickness measuring apparatus according to claim 1, wherein:
said measurement target is constituted of silicon or a silicon oxide film; and
said light source is capable of emitting light with a wavelength within a range of 1.0 to 2.5 μm.

17. A temperature/thickness measuring apparatus according to claim 16, wherein:
said measurement target is a substrate undergoing processing inside a substrate processing apparatus or an electrode plate disposed so as to face opposite said substrate inside said substrate processing apparatus.

18. A temperature/thickness measuring method, comprising:

a step for radiating measurement light and reference light obtained by splitting light emitted from a light source, which emits light to be transmitted through and reflected at two end surfaces of a measurement target, respectively toward said measurement target and toward a reference light reflecting means;

a step for measuring a plurality of measurement light interference waveforms obtained as interference of measurement beams each transmitted through or reflected at said measurement target and said reference light reflected from said reference light reflecting means occurs while the optical path length of said reference light reflected from said reference light reflecting means is altered by scanning said reference light reflecting means along a specific direction; and a step for measuring the optical path length of said measurement light indicated by the distance between the two end surfaces of said measurement target based upon a reference interference waveform selected from said plurality of measurement light interference waveforms measured at said light receiving means and a selected interference waveform selected from said plurality of measurement light interference waveforms, which corresponds to a measurement beam reciprocally reflected at the two end surfaces at least twice more than the number of times the measurement beam corresponding to said reference interference waveform is reciprocally reflected at the two end surfaces and measuring the temperature/thickness of said measurement target based upon the optical path length thus measured.

19. A temperature/thickness measuring method according to claim 18, wherein:

during said step for measuring the temperature or the thickness, said selected interference waveform is selected based upon extents of deformation of interference waveforms corresponding to individual measurement beams, which are received at said light receiving means.

20. A temperature/thickness measuring method according to claim 18, wherein:

said extents of deformation of said interference waveforms each indicate an extent of offset between an approximate curve obtained through curvilinear approximation of an entire wave series constituting a given interference waveform and an approximate curve obtained by curvilinearly approximating said interference waveform based upon individual waveform reiterations constituting the interference wave series.

21. A temperature/thickness measuring method according to claim 20, wherein:

a reference approximate curve approximating the entire wave series constituting said interference waveform is a normal distribution curve and the approximate curve obtained based upon the individual waveform reiterations constituting the interference wave series is an envelope obtained based upon the waveform reiterations.

22. A temperature/thickness measuring method according to claim 18, wherein:

a detour optical path is connected in parallel to a measurement light optical path at a mid point of said measurement light optical path; and in said step for measuring the temperature/thickness, the optical path length of said measurement light indicated by the distance between two end surfaces of said measurement target is measured based upon said reference interference waveform selected from interference waveforms corresponding to measurement beams traveling through either an optical path that does not include said detour optical path or an optical path through which said measurement light travels via said detour optical path at least once and said selected interference waveform selected from interference waveforms corresponding to measurement beams traveling through the optical path other than the optical path corresponding to said reference interference waveform.

23. A temperature/thickness measuring method according to claim 18, wherein:

said reference light reflecting means includes a plurality of reflecting surfaces; and in said step for measuring the temperature/thickness, the optical path length of said measurement light indicated by the distance between two end surfaces of said measurement target is measured based upon said reference interference waveform, selected from interference waveforms corresponding to said measurement light and a reference beam reflected from one of said reflecting surfaces as said reference light obtained by splitting said light from said light source is reflected at said plurality of reflecting surfaces as a plurality of reference beams and said selected interference waveform, selected from interference waveforms corresponding to said measurement light and a reference beam reflected from another reflecting surface.

24. A temperature/thickness measuring method according to claim 18, wherein:

a reference light splinter that splits said reference light from said splitter into a plurality of reference beams with varying optical path lengths is provided; and during said step for measuring the interference, the optical path length of said measurement light indicated by the distance between two end surfaces of said measurement target is measured based upon said reference interference waveform selected from interference waveforms corresponding to said measurement light and one of the reference beams obtained by splitting the reference light into said plurality of reference beams at said reference light splitter, and said selected interference waveform selected from interference waveforms corresponding to said measurement light and another reference beam.

25. A temperature/thickness measuring method according to claim 18, wherein:

a detour optical path is connected in parallel to a reference light optical path at a mid point of said reference light optical path; and in said step for measuring the temperature/thickness, the optical path length of said measurement light indicated by the distance between two end surfaces of said measurement target is measured based upon said reference interference waveform, selected from interference waveforms corresponding to said measurement light and reference beams traveling through an optical path that does not include said detour optical path or an optical path through which said reference light travels via said detour optical path at least once and said selected interference waveform selected from interference waveforms corresponding to said measurement light and said reference light traveling through the optical path other than the optical path corresponding to said reference interference waveform.

26. A temperature/thickness measuring method according to claim 18, wherein:
said measurement light and said reference light are individually transmitted through atmosphere.

27. A temperature/thickness measuring method according to claim 18, wherein:
said measurement target is constituted of silicon or a silicon oxide film; and
said light source is capable of emitting light with a wavelength within a range of 1.0 to 2.5 μm.

28. A temperature/thickness measuring method according to claim 27, wherein:
said measurement target is a substrate undergoing processing inside a substrate processing apparatus or an electrode plate disposed so as to face opposite said substrate inside said substrate processing apparatus.

29. A temperature/thickness measuring method according to claim 18, wherein:
the intensity of said light from said light source is adjusted while measuring interference waveforms attributable to said measurement light and said reference light.

30. A temperature/thickness measuring method according to claim 29, wherein:
the intensity of said light from said light source is gradually increased in correspondence to the distance traveled by said reference light reflecting means.

31. A temperature/thickness measuring method according to claim 29, wherein:
the intensity of said light from said light source is increased to a greater extent for an interference waveform corresponding to a measurement beam reciprocally reflected at the two end surfaces of said measurement target a greater number of times.

32. A temperature/thickness measuring method according to claim 29, wherein:
the reflection intensity of said measurement light received at said light receiving means is measured in advance and the intensity of said light from said light source is adjusted in correspondence to the reflection intensity.

33. A temperature/thickness measuring system, comprising:
a substrate processing apparatus that executes a specific type of processing on a substrate placed inside a processing chamber;
a temperature/thickness measuring apparatus mounted at said substrate processing apparatus; and
a control device that controls the temperature/thickness measuring apparatus, wherein:
said temperature/thickness measuring apparatus comprises:
a light source that emits light to be transmitted through and reflected at two end surfaces of said substrate designated as a measurement target, which is reflected reciprocally at least twice at the two end surfaces of said measurement target;
a splitter that splits said light from said light source into measurement light and reference light;
a reference light reflecting means for reflecting said reference light originating from said splitter;
an optical path length altering means for altering the optical path length of said reference light reflected at said reference light reflecting means;
a reference light transmitting means for transmitting said reference light from said splitter to a reference light radiation position at which said reference light is radiated toward said reference light reflecting means;
a measurement light transmitting means for transmitting said measurement light from said splitter to a measurement light radiation position at which said measurement light is radiated toward said substrate; and
a light receiving means for measuring a plurality of measurement light interference waveforms obtained as interference of measurement beams each transmitted through or reflected at said substrate and said reference light reflected from said reference light reflecting means occurs; and
said control device measures the optical path length of said measurement light indicated by the distance between the two end surfaces of said substrate based upon a reference interference waveform which is one of said plurality of measurement light interference waveforms measured by said light receiving means and a selected interference waveform selected from said plurality of measurement light interference waveforms, which corresponds to a measurement beam reciprocally reflected at the two end surfaces of said substrate at least twice more than the number of times the measurement beam corresponding to said reference interference waveform is reciprocally reflected at the two end surfaces and measures the temperature/thickness of said substrate based upon the optical path length thus measured.

34. A control system comprising:
a substrate processing apparatus that executes a specific type of processing on a substrate placed inside a processing chamber;
a temperature/thickness measuring apparatus mounted at the substrate processing apparatus; and
a control device that controls said temperature/thickness measuring apparatus and the substrate processing apparatus, and also executes at least either substrate temperature control or substrate process control, wherein:
said temperature/thickness measuring apparatus comprises a light source that emits light to be transmitted through and reflected at two end surfaces said substrate designated as a measurement target, which is reflected reciprocally at least twice at the two end surfaces of said measurement target;
a splitter that splits said light from said light source into measurement light and reference light;
a reference light reflecting means for reflecting said reference light originating from said splitter;
an optical path length altering means for altering the optical path length of said reference light reflected at said reference light reflecting means;
a reference light transmitting means for transmitting said reference light originating from said splitter to a reference light radiation position at which said reference light is radiated toward said reference light reflecting means;
a measurement light transmitting means for transmitting said measurement light from said splitter to a measurement light radiation position at which said measurement light is radiated toward said substrate; and
a light receiving means for measuring a plurality of measurement light interference waveforms obtained as interference of measurement beams each transmitted through or reflected at said substrate and said reference light reflected from said reference light reflecting means occurs; and
said control device measures the optical path length of said measurement light indicated by the distance between the two end surfaces of said substrate based upon a reference interference waveform which is one of said plurality of measurement light interference waveforms measured by said light receiving means and a selected interference waveform selected from said plurality of measurement light interference waveforms, which corresponds to a measurement beam reciprocally reflected at the two end surfaces of said substrate at least twice more than the number of times said measurement beam corresponding to said reference interference waveform is reciprocally reflected at the two end surfaces, measures the temperature/thickness of said substrate based upon the optical path length thus measured, and executes at least either said substrate temperature control or said substrate process control for said substrate placed inside said processing chamber of the substrate processing apparatus based upon the temperature or the thickness.

35. A control method to be adopted in a control system for a substrate processing apparatus that executes a specific type of processing on a substrate placed inside a processing chamber, comprising:

a step for radiating measurement light and reference light obtained by splitting light emitted from a light source, which emits light to be transmitted through and reflected at two end surfaces of a measurement target, respectively toward said measurement target and toward a reference light reflecting means;

a step for measuring a plurality of measurement light interference waveforms obtained as interference of measurement beams each transmitted through or reflected at said measurement target and said reference light reflected from said reference light reflecting means occurs while the optical path length of said reference light reflected from said reference light reflecting means is altered by scanning said reference light reflecting means along a specific direction; and a step for measuring the optical path length of said measurement light indicated by the distance between the two end surfaces of said measurement target based upon a reference interference waveform selected from said plurality of measurement light interference waveforms measured at said light receiving means and a selected interference waveform selected from said plurality of measurement light interference waveforms, which corresponds to a measurement beam reciprocally reflected at the two end surfaces of said measurement target at least twice more than the number of times the measurement beam corresponding to said reference interference waveform is reciprocally reflected at the two end surfaces and measuring the temperature/thickness of said measurement target based upon the optical path length thus measured; and a step for executing at least either substrate temperature control or substrate process control for said substrate in said substrate processing apparatus based upon the temperature or the thickness of said measurement target having been measured.

* * * * *